(12) United States Patent
Homma

(10) Patent No.: US 12,541,834 B2
(45) Date of Patent: Feb. 3, 2026

(54) DISPLAY TERMINAL, DISPLAY METHOD, AND RECORDING MEDIUM

(71) Applicant: Takeshi Homma, Hyogo (JP)

(72) Inventor: Takeshi Homma, Hyogo (JP)

(73) Assignee: RICOH COMPANY, LTD., Tokyo (JP)

( * ) Notice: Subject to any disclaimer, the term of this patent is extended or adjusted under 35 U.S.C. 154(b) by 350 days.

(21) Appl. No.: 18/117,475

(22) Filed: Mar. 6, 2023

(65) Prior Publication Data

US 2023/0326001 A1    Oct. 12, 2023

(30) Foreign Application Priority Data

Mar. 17, 2022 (JP) ................................. 2022-043090

(51) Int. Cl.
*G06T 7/00* (2017.01)
*G06F 3/14* (2006.01)
(Continued)

(52) U.S. Cl.
CPC .............. *G06T 7/0002* (2013.01); *G06F 3/14* (2013.01); *H04N 23/67* (2023.01);
(Continued)

(58) Field of Classification Search
CPC ......... G06T 7/0002; G06T 2207/20208; G06T 2207/30168; G06T 3/4038; G06T 3/12; G06T 5/50; G06T 5/80; G06T 2207/20221; G06T 3/047; G06T 5/70; G06T 5/73; G06F 3/14; G06F 3/1454; H04N 23/67; H04N 23/698; H04N 23/73; H04N 23/741; H04N 23/50; H04N 23/6812; H04N 23/683; H04N 23/90; H04N 23/45; H04N 23/62; H04N 23/63; H04N 23/695; H04N 23/61;
(Continued)

(56) References Cited

U.S. PATENT DOCUMENTS

| 8,773,567 B2 * | 7/2014 | Hitosuga ............ H04N 23/611 |
| | | 348/222.1 |
| 10,469,744 B2 * | 11/2019 | Yim .................... H04N 5/2628 |

(Continued)

FOREIGN PATENT DOCUMENTS

| JP | 2005-333552 | 12/2005 |
| JP | 2018-006996 A | 1/2018 |

(Continued)

OTHER PUBLICATIONS

Office Action issued Jan. 23, 2024 in Japanese Patent Application No. 2022-043090, 7 pages.

*Primary Examiner* — Michael S Osinski
(74) *Attorney, Agent, or Firm* — XSENSUS LLP

(57) ABSTRACT

A display terminal, a displaying method, and a program stored in a recording medium, each of which: acquires a wide-view image captured by an image capturing apparatus and having a wide angle of view; displays, on a display, a predetermined-area image representing a predetermined area of the wide-view image; and transmits an image capturing parameter to be received by the image capturing apparatus, the image capturing parameter being determined such that the quality of the predetermined-area image being displayed is adequate.

6 Claims, 31 Drawing Sheets

(51) Int. Cl.
*H04N 23/67* (2023.01)
*H04N 23/698* (2023.01)
*H04N 23/73* (2023.01)
*H04N 23/741* (2023.01)

(52) U.S. Cl.
CPC .......... *H04N 23/698* (2023.01); *H04N 23/73* (2023.01); *H04N 23/741* (2023.01); *G06T 2207/20208* (2013.01); *G06T 2207/30168* (2013.01)

(58) Field of Classification Search
CPC .. H04N 5/2628; H04N 23/631; H04N 23/667; H04N 23/661; H04N 21/4854; H04N 23/66
See application file for complete search history.

(56) References Cited

U.S. PATENT DOCUMENTS

| | | | |
|---|---|---|---|
| 10,999,527 B1* | 5/2021 | Guérin | H04N 23/73 |
| 11,951,394 B2* | 4/2024 | Jang | A63F 13/5252 |
| 12,159,372 B2* | 12/2024 | Dahlquist | H04N 13/156 |
| 2008/0193042 A1* | 8/2008 | Masuda | G06T 3/12 |
| | | | 382/275 |
| 2012/0075415 A1* | 3/2012 | Kim | G06T 3/4038 |
| | | | 348/E7.001 |
| 2012/0288204 A1* | 11/2012 | Igarashi | H04N 19/124 |
| | | | 382/195 |
| 2013/0222612 A1* | 8/2013 | Sako | H04N 23/661 |
| | | | 348/207.1 |
| 2016/0205308 A1* | 7/2016 | Maeda | H04N 23/6842 |
| | | | 348/207.11 |
| 2016/0234438 A1* | 8/2016 | Satoh | H04N 23/667 |
| 2017/0195579 A1* | 7/2017 | Desai | H04N 23/698 |
| 2017/0236249 A1* | 8/2017 | Roulet | G06T 5/70 |
| | | | 382/275 |
| 2018/0025478 A1* | 1/2018 | Lee | H04N 23/90 |
| | | | 382/284 |
| 2018/0152636 A1* | 5/2018 | Yim | H04N 23/631 |
| 2018/0365803 A1* | 12/2018 | Xie | G06T 5/50 |
| 2018/0365814 A1* | 12/2018 | Yokomizo | H04N 23/81 |
| 2019/0098211 A1 | 3/2019 | Ohmura et al. | |
| 2019/0098253 A1 | 3/2019 | Soneda et al. | |
| 2019/0147657 A1* | 5/2019 | Kumar | G02B 27/0101 |
| | | | 345/419 |
| 2020/0045234 A1* | 2/2020 | Wei | H04N 23/698 |
| 2020/0273149 A1* | 8/2020 | Qin | H04N 13/207 |
| 2020/0304751 A1* | 9/2020 | Katoh | H04N 23/667 |
| 2021/0065331 A1 | 3/2021 | Fujiki | |
| 2021/0144295 A1* | 5/2021 | Meng | H04N 23/667 |
| 2021/0256941 A1* | 8/2021 | Ishii | H04N 9/3147 |
| 2021/0289118 A1* | 9/2021 | Guérin | H04N 23/698 |
| 2021/0309149 A1* | 10/2021 | Inagaki | G06T 11/203 |
| 2022/0086334 A1* | 3/2022 | Ariyama | H04N 23/88 |
| 2022/0163802 A1* | 5/2022 | Mima | G02B 27/0172 |
| 2022/0253988 A1* | 8/2022 | Miles | G06T 3/12 |
| 2022/0279131 A1* | 9/2022 | Gong | H04N 23/675 |
| 2022/0329727 A1* | 10/2022 | Bryan | H04N 23/64 |
| 2022/0335703 A1* | 10/2022 | Valluru | G06V 10/25 |
| 2022/0385810 A1* | 12/2022 | Pan | H04N 23/698 |
| 2023/0009661 A1* | 1/2023 | Sarti | G06T 3/10 |
| 2023/0058472 A1* | 2/2023 | Leroy | H04N 23/71 |
| 2023/0069440 A1* | 3/2023 | Kamba | H04N 23/661 |
| 2023/0095173 A1* | 3/2023 | Khosravan | G06T 5/73 |
| 2023/0269475 A1* | 8/2023 | Du | G06T 3/4007 |
| 2023/0325994 A1* | 10/2023 | Ma | G06T 5/70 |
| | | | 348/222.1 |
| 2023/0367187 A1* | 11/2023 | Chen | H04N 23/695 |
| 2024/0054625 A1* | 2/2024 | Ma | H04N 9/64 |
| 2024/0098224 A1* | 3/2024 | Sasaki | H04N 23/90 |

FOREIGN PATENT DOCUMENTS

| | | |
|---|---|---|
| JP | 2019-062320 | 4/2019 |
| JP | 2019-062534 | 4/2019 |
| JP | 2019-080273 | 5/2019 |
| JP | 2021-034897 | 3/2021 |
| WO | 2020/004013 A1 | 1/2020 |

* cited by examiner

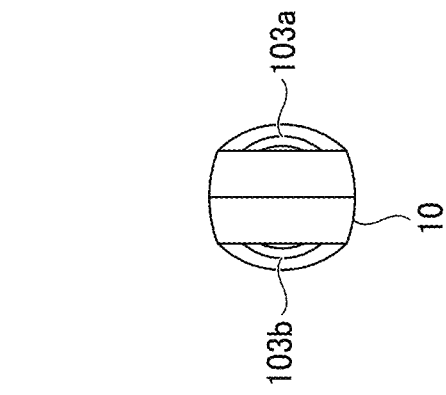
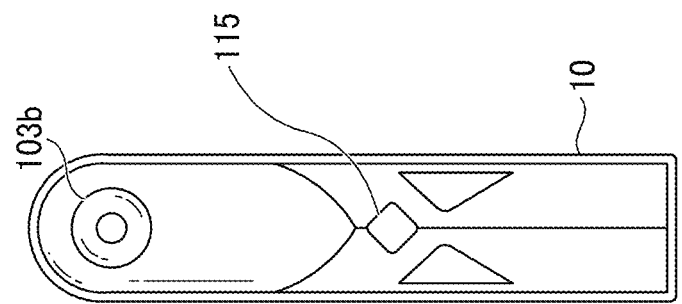
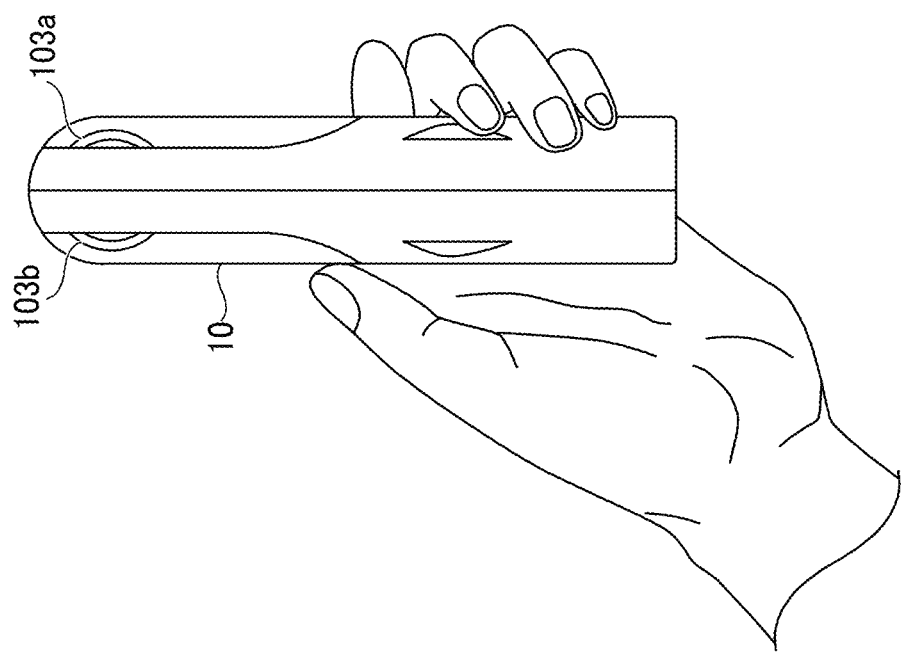
FIG. 5C
FIG. 5B
FIG. 5A

FIG. 8A
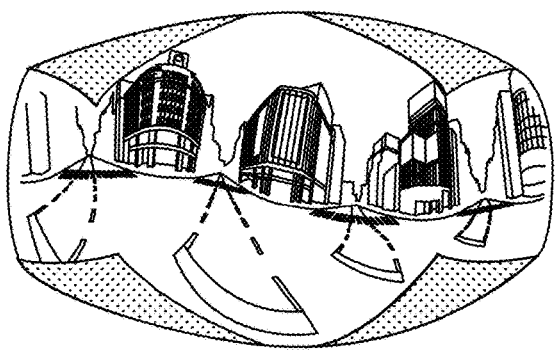
EQUIRECTANGULAR PROJECTION IMAGE EC
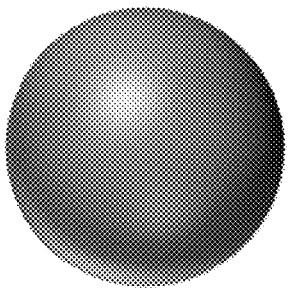
FIG. 8B
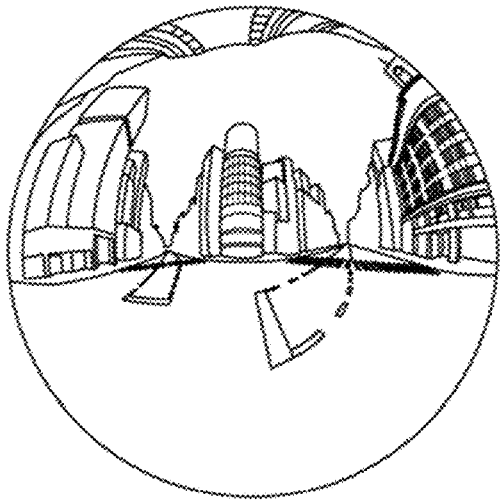
SPHERICAL IMAGE CE

FIG. 14A

| DATA ID | DATA NAME | IMAGING DATE AND TIME INFORMATION | IMAGING OPERATOR INFORMATION | IMAGE CAPTURING APPARATUS INFORMATION | IMAGING OPERATOR'S POINT-OF-VIEW INFORMATION | | | IMAGING-TIME VIRTUAL ROOM ID | DATA STORAGE LOCATION INFORMATION |
|---|---|---|---|---|---|---|---|---|---|
| | | | | | RADIUS VECTOR | POLAR ANGLE | AZIMUTH ANGLE | | |
| 111 | BUILDING X UNDER CONSTRUCTION | 2021/10/12 9:00 | User111 | T111 | 10 | 20 | 30 | AAA | http://··· |
| 222 | GROUP PHOTOGRAPH AT EVENT Y | 2021/10/12 10:00 | User222 | T222 | 10 | 30 | 40 | BBB | http://··· |
| 333 | SURGERY Z | 2021/10/15 11:00 | User333 | T333 | 20 | 30 | 60 | CCC | http://··· |
| 444 | ··· | | | | ··· | ··· | ··· | ··· | ··· |
| 555 | ··· | | | | ··· | ··· | ··· | ··· | ··· |

FIG. 14B

| DATA ID | DATA NAME | IMAGING DATE AND TIME INFORMATION | IMAGING OPERATOR INFORMATION | IMAGE CAPTURING APPARATUS INFORMATION | IMAGING OPERATOR'S POINT-OF-VIEW INFORMATION | | | IMAGING-TIME VIRTUAL ROOM ID | DATA STORAGE LOCATION INFORMATION |
|---|---|---|---|---|---|---|---|---|---|
| | | | | | RADIUS VECTOR | POLAR ANGLE | AZIMUTH ANGLE | | |
| 111 | BUILDING X (1) | 2021/10/12 9:00 | User111 | T111 | 10 | 20 | 30 | AAA | http://··· |
| 222 | BUILDING X (2) | 2021/10/12 10:00 | User222 | T222 | 20 | 30 | 40 | AAA | http://··· |
| 333 | SURGERY Z | 2021/10/15 11:00 | User333 | T333 | 20 | 30 | 60 | BBB | http://··· |
| 444 | ··· | | | | ··· | ··· | ··· | ··· | ··· |
| 555 | ··· | | | | ··· | ··· | ··· | ··· | ··· |

FIG. 15A

VIRTUAL ROOM INFORMATION

| ITEM NAME | DEFINITION | EXAMPLE OF VALUE |
|---|---|---|
| VIRTUAL ROOM ID | IDENTIFICATION INFORMATION FOR IDENTIFYING VIRTUAL ROOM | AAA |
| VIRTUAL ROOM NAME | NAME FOR USER TO IDENTIFY VIRTUAL ROOM | CONSTRUCTION SITE A |
| DEVICE INFORMATION | IDENTIFICATION INFORMATION OF DEVICE ASSOCIATED WITH VIRTUAL ROOM | T111 |
| USER IN VIRTUAL ROOM | USER WHO IS CURRENTLY IN VIRTUAL ROOM AND AUTHORIZED TO VIEW WIDE-VIEW IMAGE | User111 (IP ADDRESS OF COMMUNICATION TERMINAL) User222 (IP ADDRESS OF COMMUNICATION TERMINAL) User333 (IP ADDRESS OF COMMUNICATION TERMINAL) |
| STORAGE | INFORMATION ON STORAGE ASSOCIATED WITH VIRTUAL ROOM | ADDRESS INFORMATION OF STORAGE X INFORMATION ON FOLDER IN STORAGE X |

FIG. 15B

TENANT INFORMATION

| ITEM NAME | DEFINITION | EXAMPLE OF VALUE |
|---|---|---|
| TENANT ID | IDENTIFICATION INFORMATION FOR IDENTIFYING TENANT | T001 |
| TENANT NAME | NAME FOR USER TO IDENTIFY TENANT | COMPANY X |
| TENANT-REGISTERED VIRTUAL ROOM ID | IDENTIFICATION INFORMATION OF VIRTUAL ROOM REGISTERED IN TENANT | R001 (CONSTRUCTION SITE A) R002 (CONSTRUCTION SITE B) R003 (CONSTRUCTION SITE C) |
| TENANT-REGISTERED DEVICE | DEVICE REGISTERED IN TENANT | - IMAGE CAPTURING APPARATUS ID NAME, DESCRIPTION, VIRTUAL ROOM ID<br>- VR GOGGLES ID<br>......<br>- SMART GLASSES ID<br>...... |

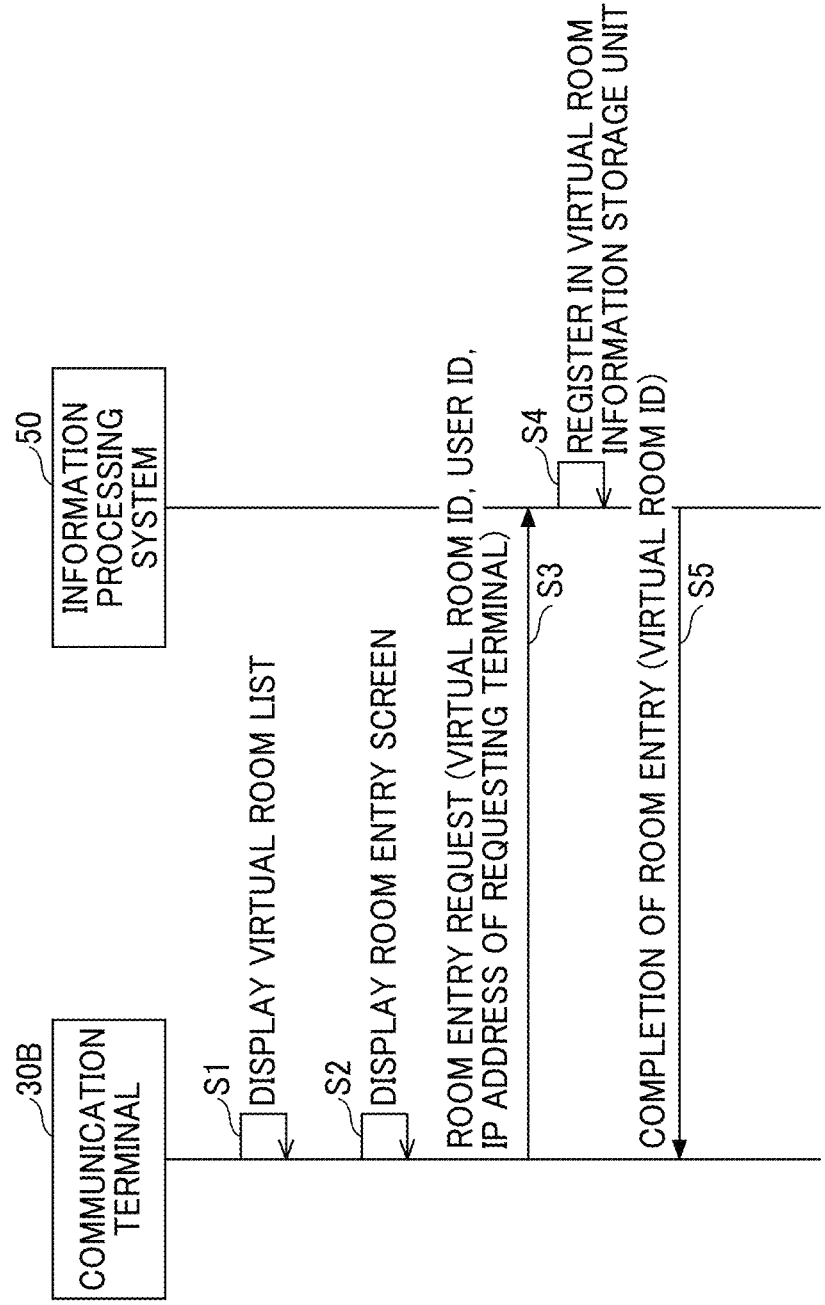

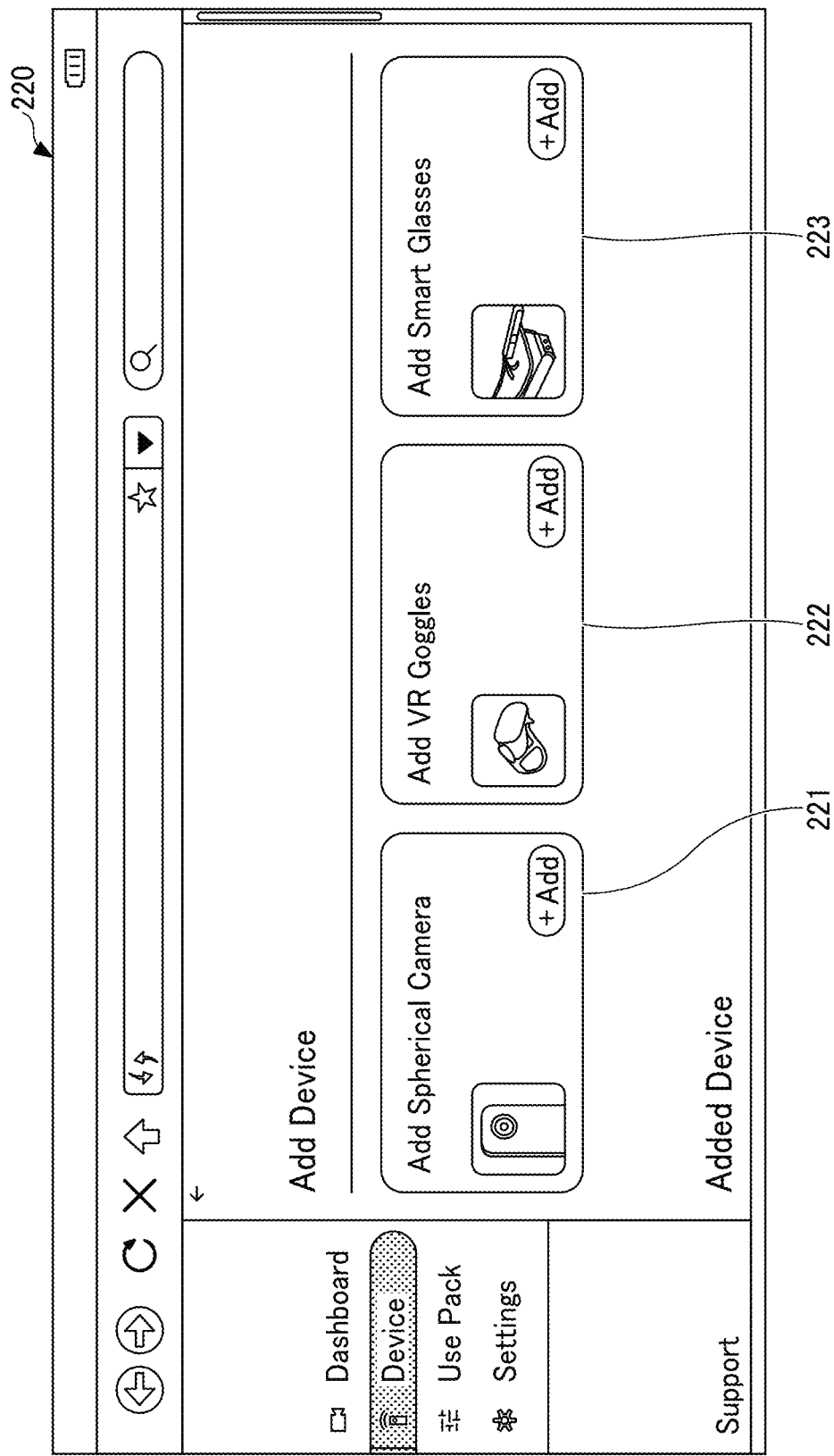

FIG. 19A
FIG. 19B
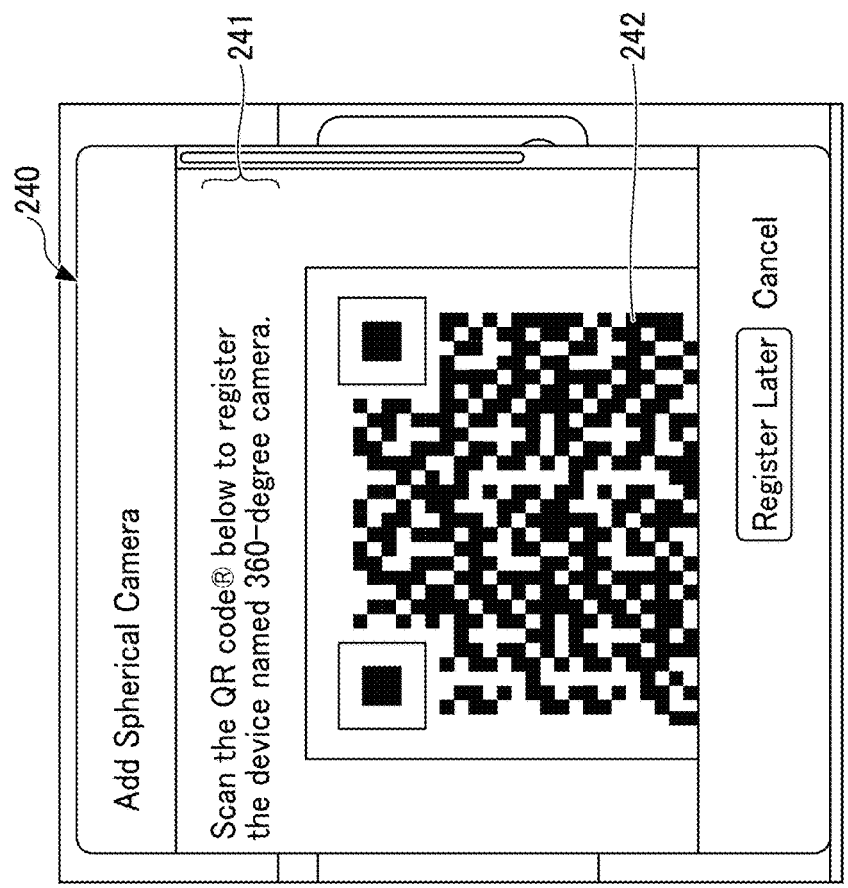
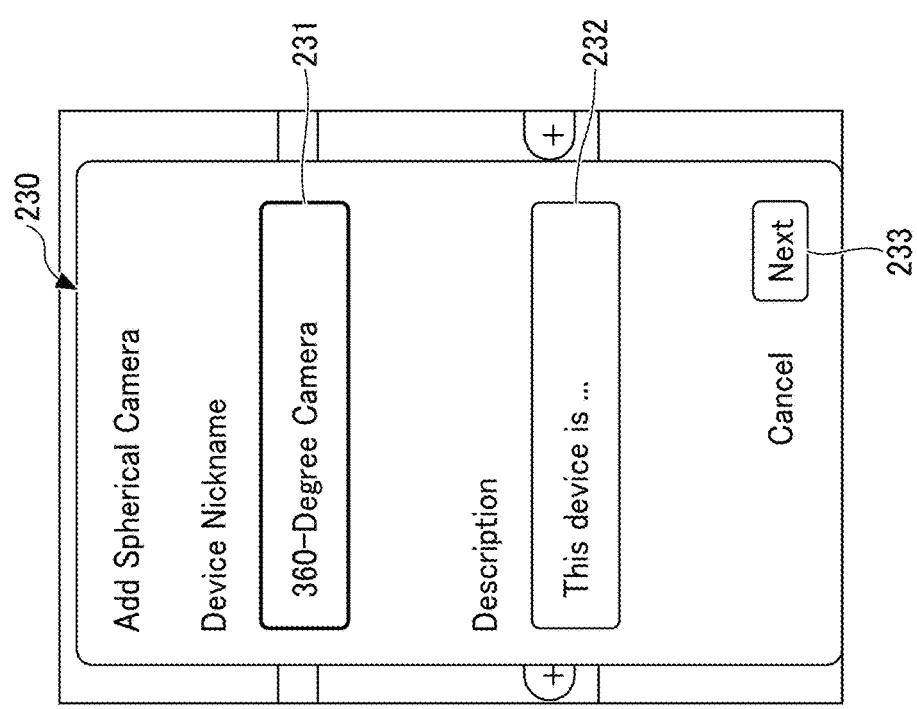

FIG. 20

Add VR Goggles

Fill the fields below to register the device named xxx.

Temporary Code

251 — 1234567

Secret

252 — XYZabc

Register Later    Cancel

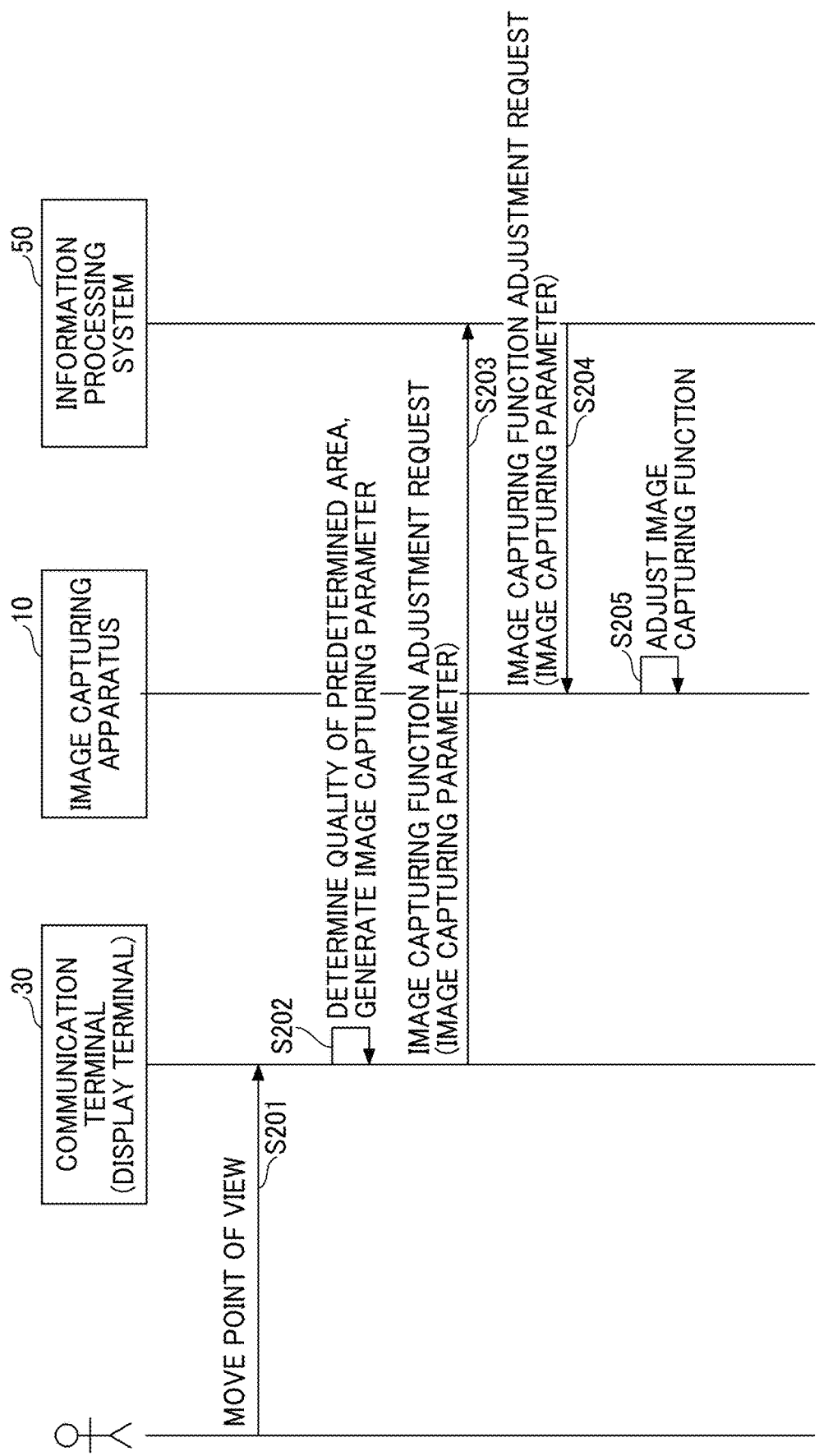

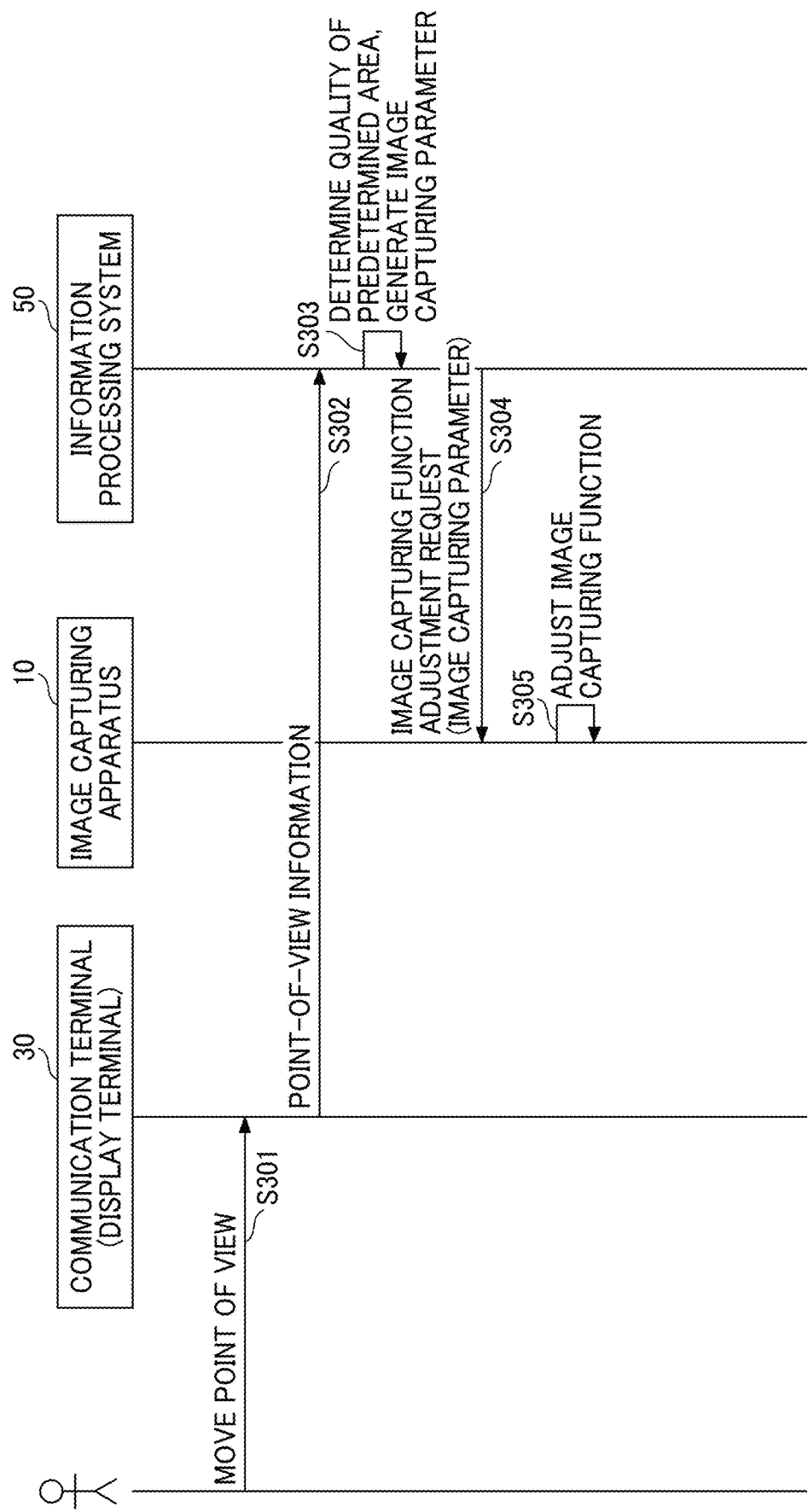

DISPLAY TERMINAL, DISPLAY METHOD, AND RECORDING MEDIUM

CROSS-REFERENCE TO RELATED APPLICATIONS

This patent application is based on and claims priority pursuant to 35 U.S.C. § 119 (a) to Japanese Patent Application No. 2022-043090, filed on Mar. 17, 2022, in the Japan Patent Office, the entire disclosure of which is hereby incorporated by reference herein.

BACKGROUND

Technical Field

The present disclosure relates to a display terminal, a display method, and a recording medium.

Related Art

A wide-field-of-view image having a wide viewing angle and captured in a wide imaging range as an imaging range including even an area that is difficult for a normal angle of view to cover is known. The wide-field-of-view image is hereinafter referred to as a "wide-view image". Examples of the wide-view image include a 360-degree image that is a captured image of an entire 360-degree view. The 360-degree image is also referred to as a spherical image, an omnidirectional image, or an "all-around" image. The wide-view image is generated by capturing an image of an object or surroundings such as scenery with a spherical imaging camera.

The wide-view image looks entirely distorted to a user who views the wide-view image. A predetermined area, which is a portion of the wide-view image, may be displayed on a display for viewing.

SUMMARY

Example embodiments include a display terminal, a displaying method, and a program stored in a recording medium, each of which: acquires a wide-view image captured by an image capturing apparatus and having a wide angle of view; displays, on a display, a predetermined-area image representing a predetermined area of the wide-view image; and transmits an image capturing parameter to be received by the image capturing apparatus, the image capturing parameter being determined such that the quality of the predetermined-area image being displayed is adequate.

BRIEF DESCRIPTION OF THE DRAWINGS

A more complete appreciation of embodiments of the present disclosure and many of the attendant advantages and features thereof can be readily obtained and understood from the following detailed description with reference to the accompanying drawings, wherein:

FIGS. 5A, 5B, and 5C are a left side view, a front view, and a plan view of the image capturing apparatus according to an embodiment of the present disclosure, respectively;

FIG. 8A is a conceptual diagram illustrating an example of how the image in equirectangular projection is mapped to a surface of a sphere;

FIG. 8B is a view illustrating a spherical image, according to an embodiment of the present disclosure;

FIGS. 14A and 14B are tables illustrating an example of image management information stored in an image management information storage unit;

FIGS. 15A and 15B are tables illustrating an example of virtual room information stored in a virtual room information storage unit and an example of tenant information stored in a tenant information storage unit, respectively;

FIG. 17 is a sequence diagram illustrating an example process in which the user (or the communication terminal) enters the virtual room;

FIG. 18 is a view illustrating an example of a device registration screen displayed on the communication terminal;

FIG. 19A is a view illustrating an example of an image capturing apparatus registration dialog;

FIG. 19B is a view illustrating an example of a two-dimensional code screen;

FIG. 20 is a view illustrating an example of a virtual reality (VR) goggles registration screen displayed in response to the pressing of a VR goggles registration button;

FIG. 28 is a sequence diagram illustrating a first process for adjusting an image capturing function according to an embodiment of the present disclosure;

FIG. 30 is a sequence diagram illustrating a second process for adjusting an image capturing function according to an embodiment of the present disclosure;

Figure 1:
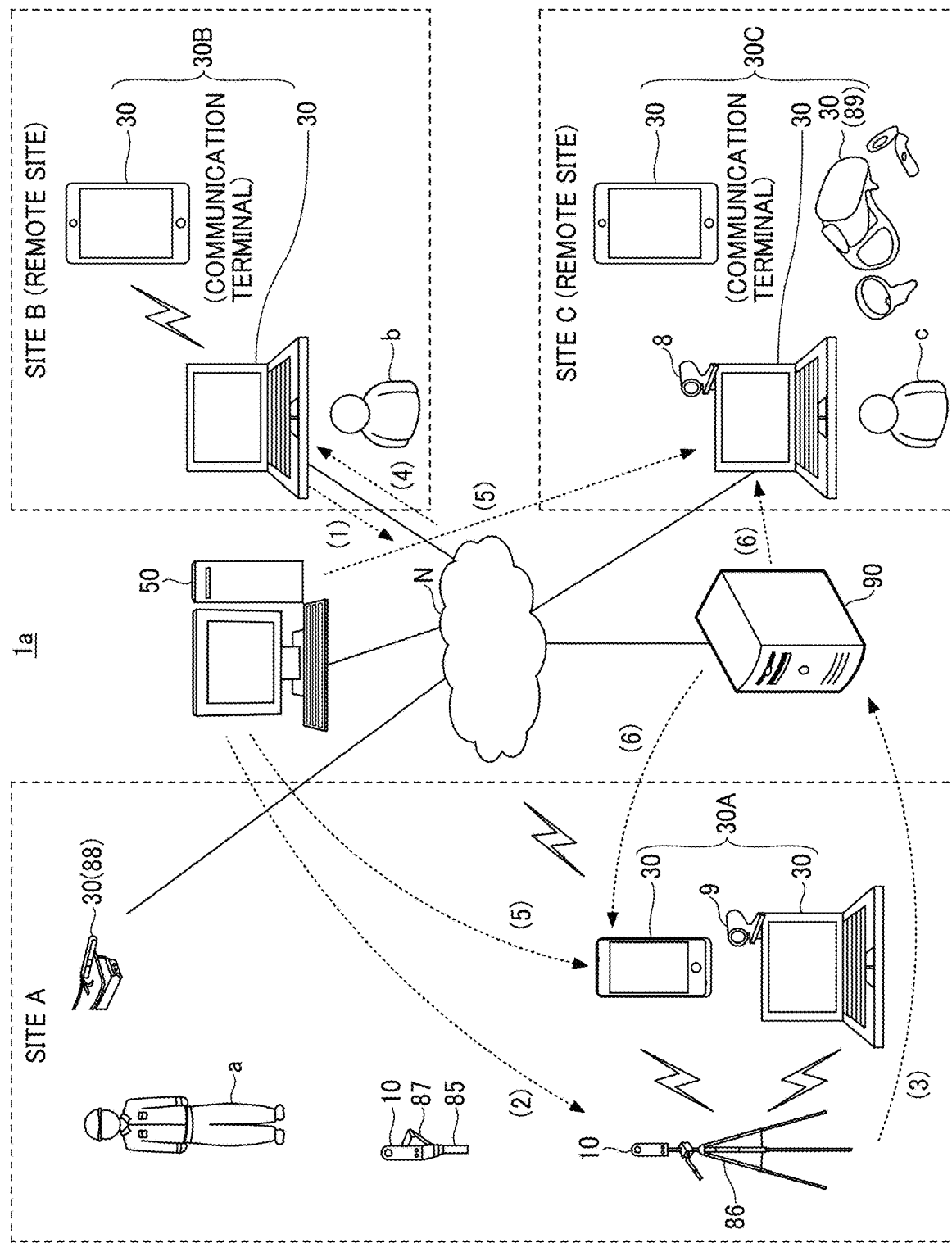
FIG. 1 is a diagram illustrating an example of remote communication using a wide-view image.

The accompanying drawings are intended to depict embodiments of the present disclosure and should not be interpreted to limit the scope thereof. The accompanying drawings are not to be considered as drawn to scale unless explicitly noted. Also, identical or similar reference numerals designate identical or similar components throughout the several views.

DETAILED DESCRIPTION

In describing embodiments illustrated in the drawings, specific terminology is employed for the sake of clarity. However, the disclosure of this specification is not intended to be limited to the specific terminology so selected and it is to be understood that each specific element includes all technical equivalents that have a similar function, operate in a similar manner, and achieve a similar result.

Referring now to the drawings, embodiments of the present disclosure are described below. As used herein, the singular forms "a," "an," and "the" are intended to include the plural forms as well, unless the context clearly indicates otherwise.

A display terminal, a system including the display terminal, and a method performed by the display terminal and the system, according to one or more embodiments will be described hereinafter.

As described above, the wide-view image may be distorted when viewed by a user. In view of this, an image capturing apparatus may capture an image with a wide field of view while uniformly adjusting conditions such as exposure, white balance, and International Standards Organization (ISO) sensitivity over the entire wide field of view. This, however, may cause a predetermined-area image, which is a predetermined area in the wide-view image, to have degraded quality. In the following, the display terminal, system, and method for adjusting quality of an image of the predetermined area are described.

Example of Remote Communication

FIG. 1 is a diagram illustrating an example of remote communication using a wide-view image. In FIG. 1, communication takes place across three sites, namely, a site A, a site B, and a site C, via an information processing system 50. Three sites are merely an example, and communication may be performed across two sites or four or more sites.

In an example, the site A is a construction site. The sites B and C are any sites across which a wide-view image can be communicated. In an example, the sites B and C are offices. An image capturing apparatus 10 is placed at the site A. In an example, the image capturing apparatus 10 can capture an image of an object and surroundings to generate a wide-view image. Examples of the wide-view image include a wide-view image called a spherical image, and a wide-view image with a wide angle of view ranging from, for example, 180 degrees to 360 degrees in the vertical or horizontal direction. Such an image with a wide angle of view is hereinafter simply referred to as a "wide-view image". Communication terminals 30A to 30C for viewing a wide-view image are placed at the sites A to C, respectively. Any communication terminal or communication terminals among the communication terminals 30A to 30C are hereinafter referred to as a "communication terminal 30" or "communication terminals 30".

In the construction site, workers are involved in various constructions at various places. An image capturing apparatus captures an image of the entire construction site to generate a wide-view image in which the entire construction site appears. A user a at the site A, a user b at the site B, and a user c at the site C can check any construction or work of interest to be viewed by the users a to c at the sites A to C by changing a virtual point of view as appropriate. The term "point of view", as used here, refers to the center position or range of a predetermined area to be displayed on a display screen such as a display. The predetermined area is in the entire wide-view image.

In an example, the image capturing apparatus 10 is attached to a tripod 86. In another example, the image capturing apparatus 10 is attached to an arm 85 through a gimbal 87. A relay device is installed at the construction site. In FIG. 1, the communication terminal 30A also functions as the relay device. The communication terminal 30A receives a wide-view image from the image capturing apparatus 10 via a wire or wirelessly and transmits the received wide-view image to the information processing system 50. The communication terminal 30A may also function as a terminal for viewing the wide-view image. In an example, a camera 9 connected to (or incorporated in) the communication terminal 30A captures an image having a normal angle of view (or a spherical image), and the captured image is transmitted to the information processing system 50. In another example, smart glasses 88 worn by the user a generates an image having a normal angle of view (or a spherical image) by imaging an object, and the generated image is transmitted to the information processing system 50. The user a may be a worker. The smart glasses 88 are an information terminal having a display on which information acquired via the Internet is displayed with a field of view maintained. The smart glasses 88 may be placed at any site.

The communication terminal 30B, such as a personal computer (PC) or a smartphone, is placed at the site B. The communication terminal 30B is any device that can communicate with the information processing system 50. Other examples of the communication terminal 30B include a tablet terminal, a personal digital assistant (PDA), an electronic whiteboard, and a projector. A camera may be incorporated in or connected to the communication terminal 30B.

The communication terminal 30C, such as a PC, a smartphone, or virtual reality (VR) goggles 89, is placed at the site C. In FIG. 1, a camera 8 is incorporated in or connected to the communication terminal 30C. The VR goggles 89 are an information terminal for displaying a computer-based artificial world or a spherical image in accordance with the direction of movement of the neck or the body of the user wearing the VR goggles 89. The VR goggles 89 may be goggles attached to a smartphone for VR application. Examples of such goggles include HACOSCO®, which is a VR scope that allows a user to easily enjoy VR by plugging a smartphone into an assembled cardboard headset with a plastic lens. The camera 8 may be for a wide angle of view or a normal angle of view. The communication terminal 30C is any device that can communicate with the information processing system 50. Other examples of the communication terminal 30C include a tablet terminal, a PDA, an electronic whiteboard, and a projector. The VR goggles 89 may be placed in any site.

In this embodiment, communication between the image capturing apparatus 10 and the communication terminals 30 is managed using a communication group called a virtual room. The image capturing apparatus 10 is associated with the virtual room. Each of the communication terminals 30 (the user who operates each of the communication terminals 30) enters the virtual room and receives a wide-view image transmitted from the image capturing apparatus 10. As a result, the user can view the wide-view image. The smart glasses 88 and the VR goggles 89 can also be associated with the virtual room. Like the communication terminals 30, the cameras 8 and 9 also enter the virtual room.

The users a to c at the sites A to C can each change the point of view for the wide-view image, as desired, using the communication terminals 30A to 30C, respectively. Thus, the users a to c viewing the wide-view image in real time are likely to view images with different points of view. It may be difficult for the users a to c to mutually understand each other. In this embodiment, accordingly, information on a virtual point of view set for the communication terminal 30 at any one of the sites is shareable by the communication terminals 30 at the other sites. An overview of the sharing of information will be described. In the following description, in an example, a point of view designated by the user b at the site B is shared by the users a and c at the sites A and C.

(1) The communication terminals 30A to 30C share a wide-view image (an example of a first wide-view image). The wide-view image is generated by imaging an object with the image capturing apparatus 10. In response to the user b making a request to capture a wide-view image while viewing the wide-view image from any point of view on the communication terminal 30B, the communication terminal 30B (an example of a first communication terminal) transmits point-of-view information and the request to the information processing system 50.

(2) In response to the request, the information processing system 50 designates the point-of-view information and transmits a request to the image capturing apparatus 10 to capture a wide-view image (either still image or moving image).

(3) In response to the request, the image capturing apparatus 10 captures a wide-view image (an example of a second wide-view image), and stores the wide-view image (an example of a second wide-view image) and the point-of-view information in association with a uniform resource locator (URL) transmitted from the information processing system 50. The URL is an example of storage location information. In FIG. 1, the URL indicates a storage location in a storage 90. The wide-view image stored in the storage 90 can be downloaded and displayed by any communication terminal 30.

(4) The information processing system 50 transmits the URL to the communication terminal 30B.

(5) The information processing system 50 further transmits the URL to the communication terminals 30A and 30C (examples of a second communication terminal), which are in the same virtual room as that associated with the image capturing apparatus 10 and the communication terminal 30B, automatically or in response to a request from the user b.

(6) The communication terminals 30A and 30C access the URL and receive the point-of-view information and the wide-view image. Each of the communication terminals 30A and 30C sets and displays the point of view identified by the point-of-view information such that point of view matches the center of an image field. It should be noted that the point of view is not necessarily made to completely match the center of the image field. In an example, the point of view may be set and displayed so as to be included in a range near the center of the image field.

The same applies when the point of view of the user a at the site A is shared by the users b and c at the sites B and C and when the point of view of the user c at the site C is shared by the users a and b at the sites A and B.

As described above, in a communication system 1a according to this embodiment, even after a wide-view image is distributed, point-of-view information is shared without an instruction being given to shift a point of view for a wide-view image generated by capturing an image such that a predetermined area of interest at each site is displayed. This facilitates understanding among users at the respective sites.

In (3), the image capturing apparatus 10 may transmit the wide-view image itself to the information processing system 50. In (4), the information processing system 50 may transmit the wide-view image to the communication terminals 30A to 30C.

In the example illustrated in FIG. 1, the image capturing apparatus 10 is placed at a construction site. This embodiment is also applicable to VR education, event distribution, remote customer services, telemedicine services, and other suitable situations. In VR education, the image capturing apparatus 10 is placed at a site such as a study room or a laboratory. Students can view a blackboard, an instrument, a sample, an experimental result, or the like from remote sites while changing the points of view as appropriate. In event distribution, the image capturing apparatus 10 is placed in a venue of an event to be held on-site. Event participants such as an audience can view the details in the venue online from remote sites while changing the points of view as appropriate. The details in the venue include images of event performers, event participants, and event presenters, images of objects involved in the event, such as products and exhibits, images of materials involved in the event, and images of the venue. The event may be held indoor or outdoor, and examples of the venue of the event include venues such as sports stadiums, concert halls, and theaters. In remote customer services, for example, in customer services for a travel agency, the image capturing apparatus 10 is placed at each of travel destination sites. A customer can plan their itinerary from a remote site while changing the point of view as appropriate. In telemedicine services, in an example, the image capturing apparatus 10 is placed in a medical setting such as an operating room. Medical people such as doctors, medical students, and persons related to medical instruments can view the performance of a doctor(s) and a nurse(s) during on-site medical treatment, the arrangement of medical instruments, the state of a patient, vitals, and the like from remote sites while changing the points of view as appropriate.

The site at which an image is captured is not limited to any of the sites described above. An image may be captured in any space that a user (or viewer) at a viewing site desires to remotely grasp. Examples of such a space include a school, a factory, a warehouse, a building site, a server room, and a store.

The term "tenant" refers to a group of users associated with a unit contract for receiving an image distribution service from a service provider (information processing system in this embodiment). Examples of the tenant include entities that have made the contract, such as a company, an organization, and an individual. Accordingly, a tenant may also be referred to as a user group. In one example, a user belongs to the tenant. In another example, a user may personally subscribe to the service. A user, an image capturing apparatus, a virtual room, and the like are registered in a tenant (user group).

The term "site" refers to a location where activity takes place. In this embodiment, a conference room is used as an example of a site. The conference room is a room to be used mainly for a conference. A conference is an event where people gather to discuss something and is also referred to as a meeting, a session, a gathering, an assembly, or the like.

The term "device" refers to an apparatus different from the communication terminal 30 for general purposes such as a PC or a smartphone. In an example, the device is an image capturing apparatus or an apparatus for viewing a wide-view image. In this embodiment, examples of the device include the image capturing apparatus 10, the smart glasses 88, and the VR goggles 89.

The term "point-of-view information" refers to parameter information that specifies which predetermined area in a wide-view image to be displayed on the display screen of the display is to be displayed on the display screen of the display. In this embodiment, in an example, the point-of-view information includes a radius vector, a polar angle, and an azimuth angle of the center of the wide-view image to be displayed on the display screen of the display. In another example, the point-of-view information may be specified by other parameter information such as the coordinates of diagonal vertices.

The term "wide-view image" refers to an image having a viewing angle in a wider range than a display range that can be displayed on the display screen (area where the wide-view image is to be displayed) of the display at a time in a predetermined display method. The wide-view image has a display range corresponding to a field of view up to 360 degrees (or 180 degrees) in the vertical direction and a field of view up to 360 degrees in the horizontal direction. In an example, the wide-view image is an image having a display range corresponding to a field of view of less than 360 degrees in the vertical and horizontal directions as long as the wide-view image has a viewing angle in a wider range than the display range that can be displayed on the display screen of the display at a time. In another example, the wide-view image is an image having a display range corresponding to a field of view of 160 degrees or more in the vertical and horizontal directions. Examples of the wide-view image include an image having a display range wider than a range that can be visually recognized at a time by a person looking at the range. Depending on the display method, an image that can be displayed on the display screen of the display at a time is also the wide-view image as long as the image has a viewing angle in a wide range in response to the display method being switched to a predetermined display method or changed. In this embodiment, a spherical image in equirectangular projection format is used as an example of a wide-view image. Other examples of the wide-view image include an omnidirectional image, a hemispherical image, a three-dimensional (3D) panoramic image, a two-dimensional (2D)) panoramic image, and a VR image. The wide-view image may be in cube mapping format or dome master format. The spherical image may be in format other than equirectangular projection format.

An image captured at a normal angle of view is not a wide-view image. In this embodiment, such an image is referred to as a non-wide-view image, that is, a planar image.

The term "communication group" refers to a group of users who share a wide-view image, that is, a group of users to whom a wide-view image is to be distributed. The communication group will be described with the term "virtual room" in the sense that in a typical space, the users in the same room can share a wide-view image. As used herein, the term "virtual" means being implemented by information processing via a network.

Users at respective sites perform remote communication across remote locations. The remote communication is a meeting, which is an online meeting, accessible from remote locations, or sites. The meeting means a gathering of people for consultation, discussion, or the like. Examples of the meeting include, but are not limited to, serving a customer, a conference, a gathering, an assembly, a study session, a class, a seminar, and a presentation. The remote communication is not necessarily bidirectional communication. Thus, the virtual room may be referred to as a virtual conference room.

Example Configuration of Communication System

Figure 2:
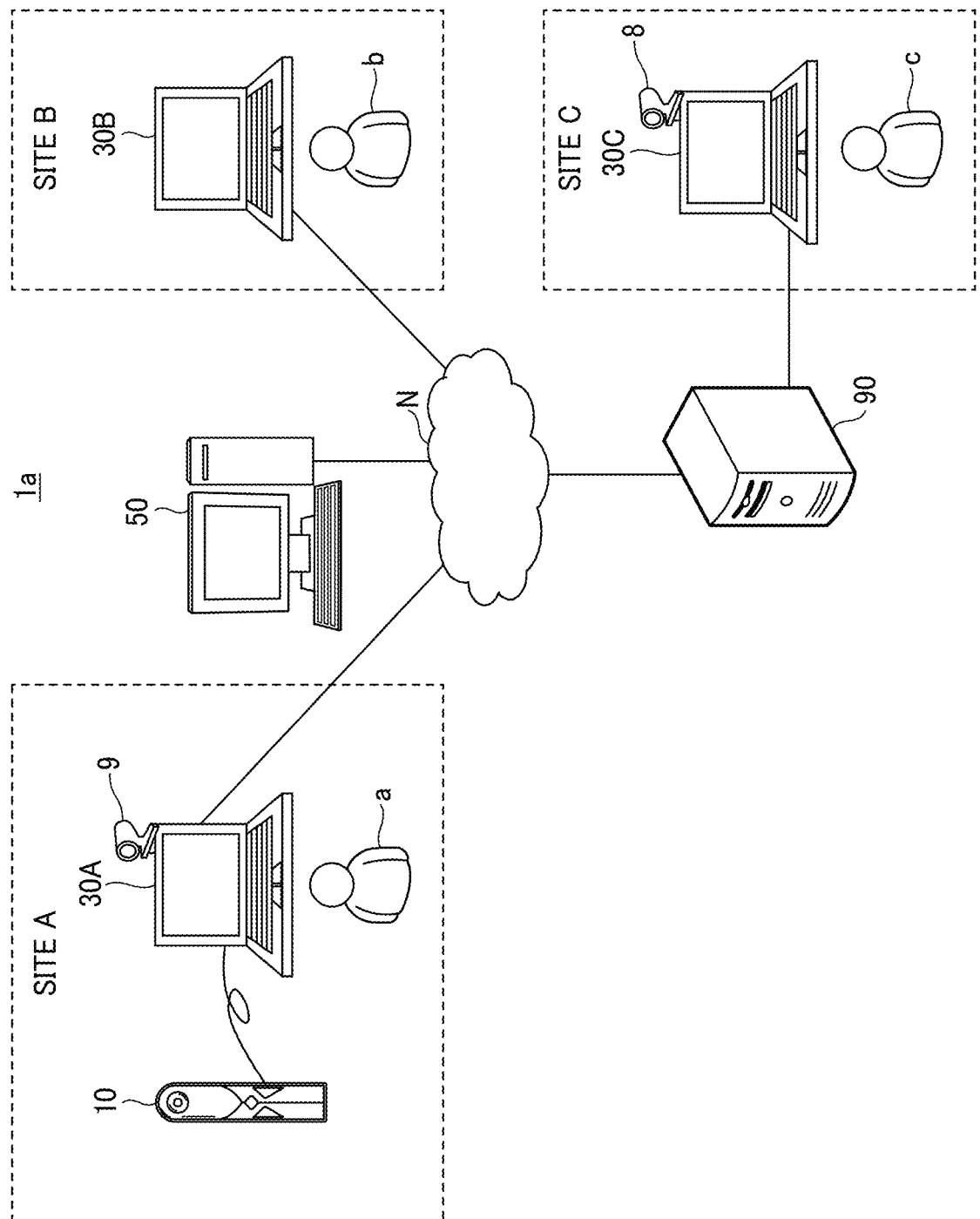
FIG. 2 is a diagram illustrating an example schematic configuration of a communication system.

FIG. 2 is a diagram illustrating an example schematic configuration of the communication system 1*a*. In FIG. 1, in an example, the communication system 1*a* illustrated in FIG. 2 is applied to remote communication with a construction site. The communication system 1*a* is a system for transmitting and receiving a wide-view image captured by the image capturing apparatus 10 or an image having a normal angle of view bidirectionally among a plurality of sites. In the communication system 1*a*, an image distributed from one of the sites is displayed at the other sites and is viewable by users at the other sites. In an example, a spherical image captured by the image capturing apparatus 10 is distributed as the wide-view image. In the communication system 1a, for example, a wide-view image captured at a predetermined site is remotely viewable at another site.

In the communication system 1a, as illustrated in FIG. 2, the image capturing apparatus 10 and the communication terminal 30A placed at the site A, the information processing system 50, and the communication terminals 30B and 30C placed at a plurality of sites, namely, the sites B and C, respectively, are communicably connected to each other.

In a case where the image capturing apparatus 10 has a communication function capable of directly connecting to a communication network N, the communication terminal 30A serving as a relay device (e.g., a router) is not used. In this case, the image capturing apparatus 10 is connected to the communication network N without the use of the communication terminal 30A. In a case where the communication terminal 30A is placed at the site A, the communication terminal 30A also functions as a relay device, and the user a can view a wide-view image in a manner similar to that of the communication terminals 30B and 30C. The image capturing apparatus 10 may additionally be placed at a site other than the site A, or a plurality of image capturing apparatuses 10 may be placed at the site A.

Each communication terminal 30 and the information processing system 50 can communicate with each other via the communication network N. The communication network N includes the Internet, a mobile communication network, and a local area network (LAN), for example. The communication network N may include a wired communication network and a wireless communication network. The wireless communication network may be based on a wireless communication standard such as third generation (3G), fourth generation (4G), fifth generation (5G), Wireless Fidelity (Wi-Fi®), Worldwide Interoperability for Microwave Access (WiMAX), or Long Term Evolution (LTE).

The image capturing apparatus 10 is a digital camera that can capture an image of an object or surroundings such as scenery to obtain two hemispherical images, from which a spherical image is generated, as described below. The wide-view image obtained by the image capturing apparatus 10 may be a moving image or a still image, or may include both of a moving image and a still image. Further, the captured image may be video including audio together with an image.

The communication terminal 30 is a computer such as a PC to be operated by a user at each site. The communication terminal 30 displays an image obtained by imaging an object at the site where the communication terminal 30 is placed, and a wide-view image (still image and/or moving image) and an image having a normal angle of view, which are distributed from other sites. For example, the communication terminal 30 acquires a wide-view image, which is captured by the image capturing apparatus 10, via the communication network N. The communication terminal 30 has installed therein software for executing image processing, such as Open Graphics Library for Embedded Systems (OpenGL ES), and can display an image based on point-of-view information that specifies a partial area in the wide-view image. OpenGL ES is an example of software for executing image processing. Any other software may be used. In an example, the communication terminal 30 does not have installed therein software for executing image processing, and executes image processing by using software received from the outside or receives a result of image processing executed by external software to display an image. That is, the communication terminal 30 can display a predetermined area, which is part of the wide-view image.

The communication terminal 30 can change the point of view for the display range of the wide-view image, as desired, in response to the user's operation. The communication terminal 30 shifts the virtual point of view in response to a user operation input (such as key input, dragging, or scrolling) on a touch panel, a direction button, a mouse, a keyboard, a touch pad, or the like to change and display a visual field range (predetermined area) based on point-of-view information corresponding to the shifted point of view. In an example, the communication terminal 30 is a communication terminal to be worn by the user, such as VR goggles. In response to a change in the movement of the user wearing the communication terminal 30, position information of the communication terminal 30 is changed. In response to detection of the change in the position information, the virtual point of view is shifted in accordance with the detected position information to change a visual field range (predetermined area), based on point-of-view information corresponding to the shifted point of view, and the changed visual field range (predetermined area) is displayed.

The communication terminal 30A acquires a wide-view image from the image capturing apparatus 10 via a wired cable such as a Universal Serial Bus (USB) cable connected to an input/output interface (I/F) 116 described below. The communication terminal 30A distributes the acquired wide-view image to the communication terminal 30 at another site via the information processing system 50. The connection between the image capturing apparatus 10 and the communication terminal 30A may be either a wired connection using a wired cable or a wireless connection using short-range wireless communication, for example. A plurality of communication terminals 30A may be placed at the site A.

In an example, the user a at the site A wears the smart glasses 88, and the smart glasses 88 are connected to the communication network N. An image captured by the smart glasses 88 is transmitted to the information processing system 50 via the communication network N, and the information processing system 50 can distribute the image to the communication terminal 30 at each site.

The communication terminal 30B is placed at the site B where the user b is located, and the communication terminal 30C is placed at the site C where the user c is located. A plurality of communication terminals 30B may be placed at the site B, and a plurality of communication terminals 30C may be placed at the site C. The users b and c may carry the communication terminals 30B and 30C, respectively.

Each of the communication terminals 30A to 30C at the sites A to C can be internally or externally provided with the camera 8 or 9. The cameras 8 and 9 are examples of an imaging device. Each of the communication terminals 30A to 30C can distribute an image of the corresponding one of the sites A to C, which is captured by the camera 8 or 9 thereof, to the other sites. Any device may be placed at each of the sites A to C.

The arrangement of the terminals and apparatus (i.e., the communication terminals 30 and the image capturing apparatus 10) and the users a to c illustrated in FIG. 2 is an example. Any other arrangement may be used. The communication terminal 30 is not limited to a PC and may be, for example, a tablet terminal, a smartphone, a PDA, a wearable terminal (including smart glasses or VR goggles), a projector (PJ), an Interactive White Board (IWB), which is an electronic whiteboard with mutual communication capability, a telepresence robot, or the like. The communication terminal 30 is any computer on which a web browser or an application dedicated to an image distribution service operates.

In an example, the image capturing apparatus 10 includes a display and displays an image distributed from another site on the display.

The information processing system 50 includes one or more information processing apparatuses. The information processing system 50 manages and controls communication among the image capturing apparatus 10 and the communication terminals 30 at the respective sites and manages a wide-view image to be transmitted and received. The information processing system 50 provides a platform on which a function of providing an image distribution service for distributing a wide-view image is available. The platform may be made available to a person, a company, or any other service provider that desires to provide an image distribution service, under contract. A service provider that provides an image distribution service to a user by using a contracted platform is hereinafter referred to as a platform contractor to distinguish the service provider from a tenant who receives the image distribution service.

The information processing system 50 may publish an application programming interface (API) as a platform, and the platform contractor may use the API to provide various image distribution services. The platform contractor mainly develops software such as an application for calling the API or the screen to be displayed on the communication terminal 30. That is, the functions to be provided by the API, such as image distribution, do not have to be developed from scratch.

The information processing system 50 may be implemented by a single computer or a plurality of computers such that the components (functions or means) of the information processing system 50 are divided into and assigned to the plurality of computers as appropriate. All or some of the functions of the information processing system 50 may be implemented by a server computer residing in a cloud environment or a server computer residing in an on-premise environment.

The storage 90 is a storage device that stores data such as a wide-view image. In an example, the storage 90 is an external storage separate from the information processing system 50. The external storage may be a cloud or on-premise storage. In another example, the storage 90 is a storage included in the information processing system 50.

Example Hardware Configuration

Next, the hardware configurations of each apparatus or terminal included in the communication system 1a according to this embodiment will be described with reference to FIGS. 3 and 4. In the hardware configurations illustrated in FIGS. 3 and 4, certain hardware elements may be added or deleted as appropriate.

Hardware Configuration of Image Capturing Apparatus

First, the hardware configuration of the image capturing apparatus 10 will be described with reference to FIG. 3. FIG. 3 is a diagram illustrating an example hardware configuration of the image capturing apparatus 10. In the following description, the image capturing apparatus 10 is a spherical (omnidirectional) image capturing apparatus including two imaging elements. However, the image capturing apparatus 10 may include one imaging element or three or more imaging elements. In one example, the image capturing apparatus 10 is not dedicated to omnidirectional image capturing, and an external omnidirectional image capturing unit is attached to a general-purpose digital camera or a smartphone to implement functions that are substantially the same as those of the image capturing apparatus 10.

Figure 3:
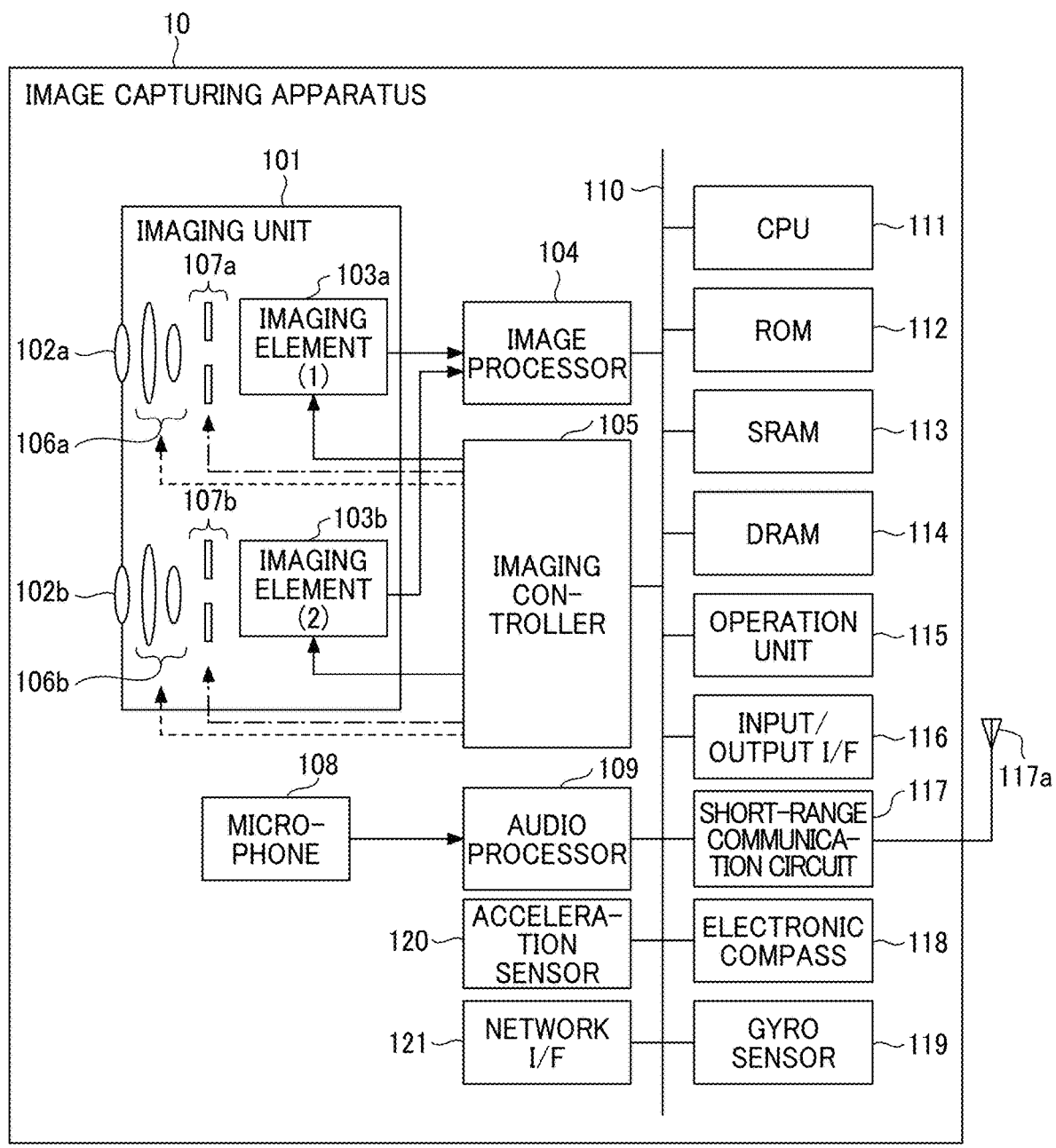
FIG. 3 is a diagram illustrating an example hardware configuration of an image capturing apparatus.

As illustrated in FIG. 3, the image capturing apparatus 10 includes an imaging unit 101, an image processor 104, an imaging controller 105, a microphone 108, an audio processor 109, a central processing unit (CPU) 111, a read only memory (ROM) 112, a static random access memory (SRAM) 113, a dynamic random access memory (DRAM) 114, an operation unit 115, an input/output interface (I/F) 116, a short-range communication circuit 117, an antenna 117a for the short-range communication circuit 117, an electronic compass 118, a gyro sensor 119, an acceleration sensor 120, and a network I/F 121.

The imaging unit 101 includes two wide-angle lens covers 102a and 102b (collectively referred to as lens covers 102 unless distinguished) and two imaging elements 103a and 103b corresponding to the lens covers 102a and 102b respectively. The configuration of the imaging unit 101 captures images with an angle of view of equal to or greater than 180 degrees to form two hemispherical images. The imaging unit 101 further includes lens units 106a and 106b and mechanical shutters 107a and 107b. The lens units 106a and 106b and the mechanical shutters 107a and 107b are disposed more inward than the lens covers 102a and 102b, respectively, and arranged in this order from the lens covers 102a and 102b to the imaging elements 103a and 103b, respectively. The imaging unit 101 having the configuration described above can adjust the shutter speed, the focus, and the like. In an example, the imaging unit 101 may include electronic shutters in place of the mechanical shutters 107a and 107b.

Each of the imaging elements 103a and 103b includes an image sensor such as a complementary metal oxide semiconductor (CMOS) sensor or a charge-coupled device (CCD) sensor, a timing generation circuit, and a group of registers. The image sensor converts an optical image formed by the lens unit 106a or 106b and the like into an electric signal and outputs image data. The timing generation circuit generates horizontal or vertical synchronization signals, pixel clocks, and the like for the image sensor. In the group of registers, various commands, parameters, and the like for an operation of the imaging element 103a or 103b are set. As a non-limiting example, the imaging unit 101 includes two wide-angle lenses. The imaging unit 101 may include one wide-angle lens or three or more wide-angle lenses.

Each of the imaging elements 103a and 103b of the imaging unit 101 is connected to the image processor 104 via a parallel I/F bus. Further, each of the imaging elements 103a and 103b of the imaging unit 101 is connected to the imaging controller 105 via a serial I/F bus such as an inter-integrated circuit (I2C) bus.

The image processor 104, the imaging controller 105, and the audio processor 109 are connected to the CPU 111 via a bus 110. The ROM 112, the SRAM 113, the DRAM 114, the operation unit 115, the input/output I/F 116, the short-range communication circuit 117, the electronic compass 118, the gyro sensor 119, the acceleration sensor 120, and the network I/F 121 are also connected to the bus 110.

The image processor 104 acquires respective items of image data output from the imaging elements 103a and 103b via the parallel I/F buses and performs predetermined processing on the items of image data. Thereafter, the image processor 104 combines the items of image data to generate data of an equirectangular projection image (an example of a wide-view image) described below.

The imaging controller 105 usually functions as a master device while each of the imaging elements 103a and 103b usually functions as a slave device. The imaging controller 105 sets commands and the like in the group of registers of each of the imaging elements 103a and 103b via the I2C bus. The imaging controller 105 receives various commands from the CPU 111. Further, the imaging controller 105 controls driving of the lens units 106a and 106b and the mechanical shutters 107a and 107b (electronic shutters). Further, the imaging controller 105 acquires status data and the like of the group of registers of each of the imaging elements 103a and 103b via the I2C bus. The imaging controller 105 sends the obtained status data and the like to the CPU 111.

The imaging controller 105 instructs the imaging elements 103a and 103b to output the image data at the time when a shutter button of the operation unit 115 is pressed. In one example, the image capturing apparatus 10 displays a preview image or a moving image (movie) on a display. Examples of the display include a display of a smartphone or any other external terminal that performs short-range communication with the image capturing apparatus 10 through the short-range communication circuit 117. In the case of displaying movie, image data are continuously output from the imaging elements 103a and 103b at a predetermined frame rate (frames per minute).

The imaging controller 105 operates in cooperation with the CPU 111 to synchronize the time when the imaging element 103a outputs image data and the time when the imaging element 103b outputs the image data. In this embodiment, the image capturing apparatus 10 does not include a display unit (or display). In some embodiments, the image capturing apparatus 10 may include a display unit. The microphone 108 converts sound to audio data (signal). The audio processor 109 acquires the audio data output from the microphone 108 via an I/F bus and performs predetermined processing on the audio data.

The CPU 111 controls entire operation of the image capturing apparatus 10 and performs predetermined processing. The ROM 112 stores various programs for execution by the CPU 111. Each of the SRAM 113 and the DRAM 114 operates as a work memory to store programs to be executed by the CPU 111 or data being currently processed. More specifically, in one example, the DRAM 114 stores image data currently processed by the image processor 104 and data of the equirectangular projection image on which processing has been performed.

The operation unit 115 collectively refers to various operation keys, a power switch, a shutter button, a touch panel having both the display and operation functions, and the like. The user operates the operation unit 115 to input various image capturing modes or image capturing conditions.

The input/output I/F 116 collectively refers to an interface circuit such as a USB I/F that allows the image capturing apparatus 10 to communicate with an external medium such as a Secure Digital (SD) card or an external personal computer. The input/output I/F 116 may be either wired or wireless. The data of the equirectangular projection image, which is stored in the DRAM 114, is stored in the external medium via the input/output I/F 116 or transmitted to an external terminal (apparatus) via the input/output I/F 116, as desired.

The short-range communication circuit 117 communicates with the external terminal (apparatus) via the antenna 117a of the image capturing apparatus 10 by short-range wireless communication technology such as near field communication (NFC), Bluetooth®, or Wi-Fi®. The short-range communication circuit 117 can transmit the data of the equirectangular projection image to the external terminal (apparatus).

The electronic compass 118 calculates an orientation of the image capturing apparatus 10 from the Earth's magnetism and outputs orientation information. The orientation information is an example of related information (metadata) in compliance with exchangeable image file format (Exif). The orientation information is used for image processing such as image correction of a captured image. The related information also includes data of a date and time when the image was captured, and data of a data size of image data.

The gyro sensor 119 detects a change in tilt (roll, pitch, and yaw) of the image capturing apparatus 10 with movement of the image capturing apparatus 10. The change in tilt is one example of related information (metadata) in compliance with Exif. This information is used for image processing such as image correction of a captured image.

The acceleration sensor 120 detects acceleration in three axial directions. The image capturing apparatus 10 calculates the position of the image capturing apparatus 10 (e.g., the tilt of the image capturing apparatus 10 relative to the direction of gravity), based on the acceleration detected by the acceleration sensor 120. The gyro sensor 119 and the acceleration sensor 120 of the image capturing apparatus 10 improve the accuracy of image correction.

The network I/F 121 is an interface for performing data communication using the communication network N, such as the Internet, via a router or the like. The hardware elements of the image capturing apparatus 10 are not limited to the illustrated ones as long as the functional configuration of the image capturing apparatus 10 can be implemented. At least some of the hardware elements described above may reside on the communication network N.

Hardware Configuration of Communication Terminal

Figure 4:
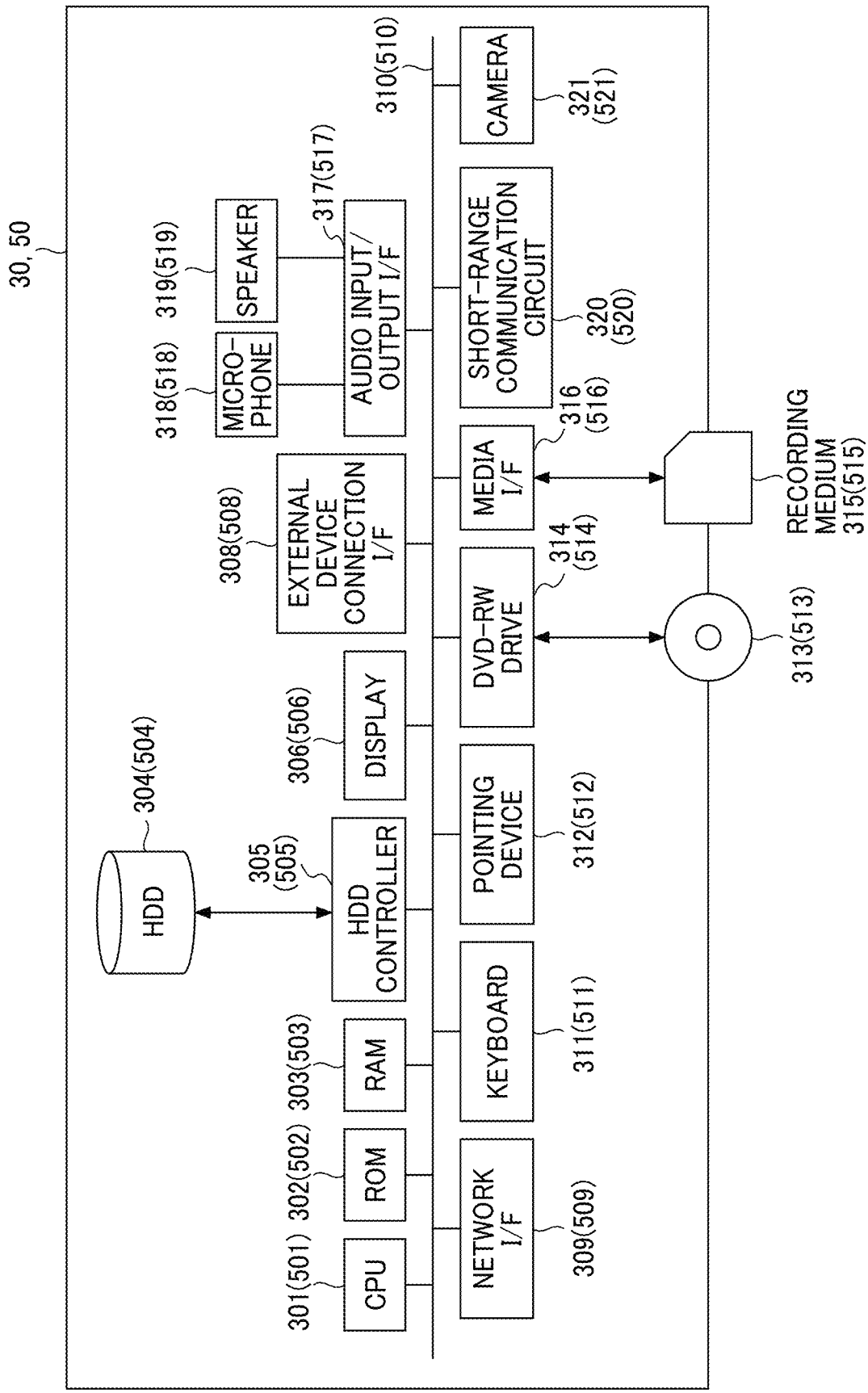
FIG. 4 is a diagram illustrating an example hardware configuration of a communication terminal and an information processing system.

FIG. 4 is a diagram illustrating an example hardware configuration of the communication terminal 30 and the information processing system 50. First, the communication terminal 30 will be described. Each hardware element of the communication terminal 30 is denoted by a reference numeral in 300 series. The communication terminal 30 is implemented by one or more computers. As illustrated in FIG. 4, the communication terminal 30 includes a CPU 301, a ROM 302, a RAM 303, a hard disk drive (HDD) 304, an HDD controller 305, a display 306, an external device connection I/F 308, a network I/F 309, a bus line 310, a keyboard 311, a pointing device 312, a digital versatile disc rewritable (DVD-RW) drive 314, a media I/F 316, an audio input/output I/F 317, a microphone 318, a speaker 319, a short-range communication circuit 320, and a camera 321.

The CPU 301 controls entire operation of the communication terminal 30. The ROM 302 stores a control program such as an initial program loader (IPL) for driving the CPU 301. The RAM 303 is used as a work area for the CPU 301. The HDD 304 stores a program and various data. The HDD controller 305 controls reading or writing of various data from or to the HDD 304 under control of the CPU 301. The display 306 displays various kinds of information such as a cursor, a menu, a window, characters, and an image. The display 306 is an example of a display unit. In one example, the display 306 is a touch panel display provided with an input means. The external device connection I/F 308 is an interface for connecting to various external devices. The external devices include, but are not limited to, a USB memory and a printer. The network I/F 309 is an interface for performing data communication using the communication network N. The bus line 310 is an address bus or a data bus for electrically connecting the hardware elements illustrated in FIG. 4, such as the CPU 301, to each other. The HDD 304 and the HDD controller 305 are each an example of a storage that stores a program, data, and the like, and may be a solid state drive (SSD) and an SSD controller, respectively.

The keyboard 311 is an example of an input means including a plurality of keys for inputting characters, numerical values, various instructions, and the like. The pointing device 312 is an example of an input means used for selecting or executing various instructions, selecting a target for processing, or moving a cursor being displayed. The input means are not limited to the keyboard 311 and the pointing device 312 and may be a touch panel, a voice input device, or the like. The DVD-RW drive 314 controls reading or writing of various data from or to a DVD-RW 313, which is an example of a removable recording medium. A digital versatile disc recordable (DVD-R) disc, a Blu-ray Disc®, or any other recording medium may be used instead of the DVD-RW 313. The media I/F 316 controls reading or writing (storing) of data from or to a recording medium 315 such as a flash memory. The microphone 318 is an example of a built-in sound collecting means for receiving input sounds. The audio input/output I/F 317 is a circuit for controlling input and output of audio signals between the microphone 318 and the speaker 319 under control of the CPU 301. The short-range communication circuit 320 communicates with the external terminal (apparatus) by short-range wireless communication technology such as NFC, Bluetooth®, or Wi-Fi®. The camera 321 is an example of a built-in image capturing means for capturing an image of an object to obtain image data. In one example, the microphone 318, the speaker 319, and the camera 321 are devices external to the communication terminal 30 in alternative to built-in devices.

The hardware elements of the communication terminal 30 are not limited to the illustrated ones as long as the functional configuration of the communication terminal 30 can be implemented. At least some of the hardware elements described above may reside on the communication network N.

Hardware Configuration of Information Processing System

As illustrated in FIG. 4, each hardware element of the information processing system 50 is denoted by a reference numeral in 500 series in parentheses. The information processing system 50 is implemented by one or more computers and has substantially the same configuration as that of the communication terminal 30 illustrated in FIG. 4, and thus the description of the hardware configuration of the information processing system 50 will be omitted.

The hardware elements of the information processing system 50 are not limited to the illustrated ones as long as the functional configuration of the information processing system 50 can be implemented. At least some of the hardware elements described above may reside on the communication network N.

Each of the programs described above may be recorded as a file in a format installable or executable on a computer-readable recording medium for distribution. Examples of the recording medium include a compact disc recordable (CD-R), a digital versatile disc (DVD), a Blu-ray Disc®, an SD card, and a USB memory. The recording medium may be provided in the form of a program product to users within a certain country or outside that country. For example, in the communication terminal 30, a program according to an embodiment of the present disclosure is executed to implement an image display method according to an embodiment of the present disclosure.

Wide-View Image and Point-of-View Information

A method for generating a wide-view image (spherical image) will be described hereinafter with reference to FIGS. 5A to 12.

First, the external appearance of the image capturing apparatus 10 will be described with reference to FIGS. 5A to 5C. The image capturing apparatus 10 is a digital camera for capturing images from which a 360-degree spherical image is generated. FIG. 5A is a left side view of the image capturing apparatus 10. FIG. 5B is a front view of the image capturing apparatus 10. FIG. 5C is a plan view of the image capturing apparatus 10. The illustrated external view of the image capturing apparatus 10 is merely an example. The image capturing apparatus 10 may have any other external appearance.

As illustrated in FIG. 5A, the image capturing apparatus 10 has a size such that a person can hold the image capturing apparatus 10 with one hand. The illustrated shape of the image capturing apparatus 10 is an example. The image capturing apparatus 10 may have any other shape. As illustrated in FIGS. 5A, 5B, and 5C, the imaging element 103a and the imaging element 103b are disposed in an upper portion of the image capturing apparatus 10 such that the imaging element 103a is disposed on the front side and the imaging element 103b is disposed on the back side. The imaging elements (image sensors) 103a and 103b are used in combination with optical members (e.g., the lens units 106a and 106b described above), each being configured to capture a hemispherical image having an angle of view of equal to or greater than 180 degrees. As illustrated in FIG. 5B, the operation unit 115, such as a shutter button, is disposed on the back surface of the image capturing apparatus 10. As described above, the image capturing apparatus 10 may include one imaging element or three or more imaging elements.

Figure 6:
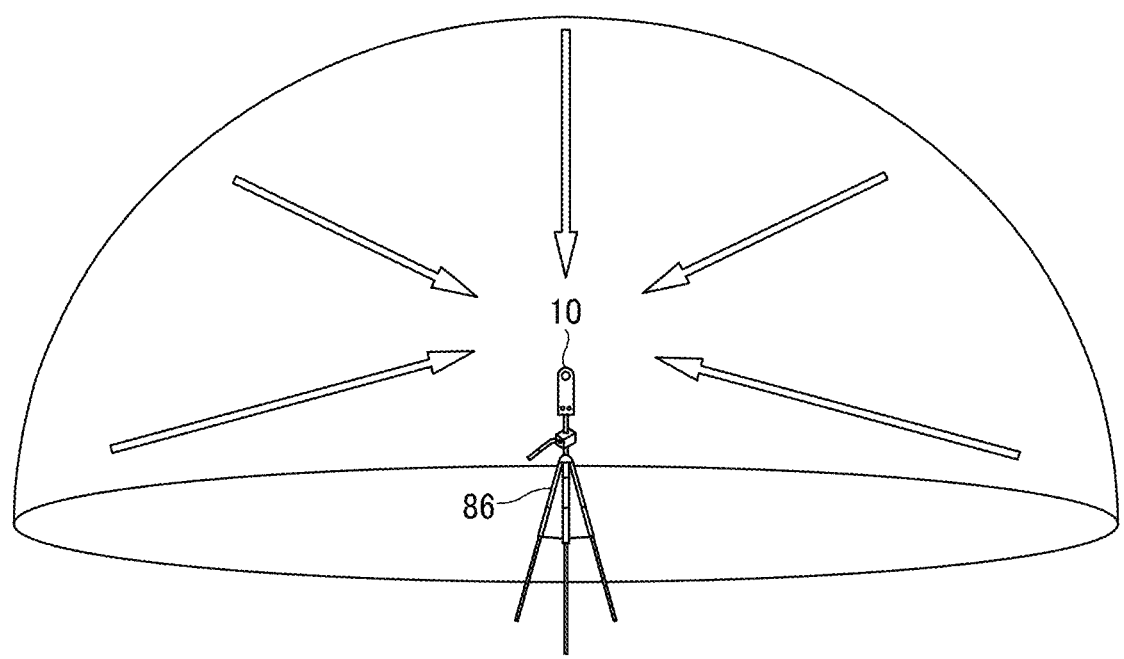
FIG. 6 is an illustration for explaining how a user uses the image capturing apparatus, according to an embodiment of the present disclosure.

Next, a situation where the image capturing apparatus 10 is used will be described with reference to FIG. 6. FIG. 6 is an illustration for explaining how a user uses the image capturing apparatus 10. As illustrated in FIG. 6, for example, the image capturing apparatus 10 is used for capturing an image of objects surrounding the image capturing apparatus 10. Each of the imaging elements 103a and 103b illustrated in FIGS. 5A to 5C captures an image of the objects surrounding the image capturing apparatus 10. As a result, two hemispherical images are obtained.

Figure 7A:
FIGS. 7A, 7B, and 7C are views illustrating a hemispherical image (front side) captured by the image capturing apparatus, a hemispherical image (back side) captured by the image capturing apparatus, and an image in equirectangular projection, respectively, according to an embodiment of the present disclosure.
Figure 7B:
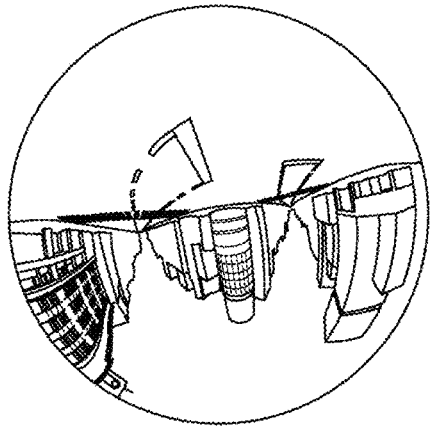
Figure 7C:
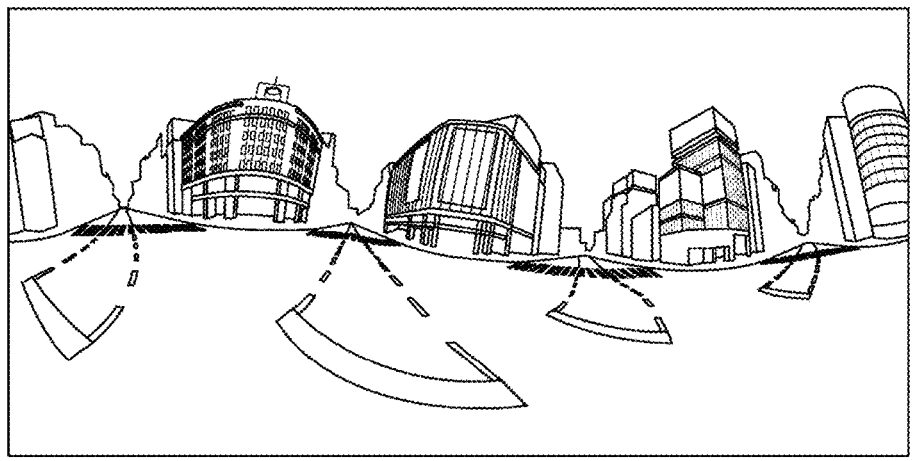

Next, an overview of a process for generating a spherical image from the images captured by the image capturing apparatus 10 will be described with reference to FIGS. 7A to 7C and FIGS. 8A and 8B. FIG. 7A is a view illustrating a hemispherical image (front side) captured by the image capturing apparatus 10. FIG. 7B is a view illustrating a hemispherical image (back side) captured by the image capturing apparatus 10. FIG. 7C is a view illustrating an image in equirectangular projection (hereinafter referred to as an "equirectangular projection image" or an "equidistant cylindrical projection image"). FIG. 8A is a conceptual diagram illustrating how the equirectangular projection image is mapped to a surface of a sphere. FIG. 8B is a view illustrating a spherical image. The term "equirectangular projection image" refers to a spherical image in equirectangular projection format, which is an example of the wide-view image described above.

As illustrated in FIG. 7A, an image obtained by the imaging element 103a is a curved hemispherical image (front side) captured through the lens unit 106a described above. As illustrated in FIG. 7B, an image captured by the imaging element 103b is a curved hemispherical image (back side) captured through the lens unit 106b described above. The image capturing apparatus 10 combines the hemispherical image (front side) and the hemispherical image (back side), which are flipped by 180 degrees, to create an equirectangular projection image EC as illustrated in FIG. 7C.

The image capturing apparatus 10 uses software such as OpenGL ES to map the equirectangular projection image EC so as to cover a surface of a sphere as illustrated in FIG. 8A, to generate a spherical image (or spherical panoramic image) CE as illustrated in FIG. 8B. That is, the spherical image CE is represented as the equirectangular projection image EC, which corresponds to a surface facing the center of the sphere. OpenGL ES is a graphics library used for visualizing 2D and 3D data. OpenGL ES is an example of software for executing image processing. Any other software may be used to create the spherical image CE. The spherical image CE may be either a still image or a moving image. As a non-limiting example, the image capturing apparatus 10 generates a spherical image. In another example, the information processing system 50 or the communication terminal 30 executes similar image processing or some steps of the image processing.

Since the spherical image CE is an image mapped so as to cover the surface of the sphere, part of the image may look distorted when viewed by a user, providing a strange feeling. To overcome the strange feeling, the image capturing apparatus 10 or the communication terminal 30 displays an image of a predetermined area T, which is part of the spherical image CE, as a flat image having fewer curves to make the user feel comfortable when viewing the image. The image of the predetermined area T is referred to as a "predetermined-area image". The display of the predetermined-area image will be described with reference to FIGS. 9 and 10A to 10D.

Figure 9:
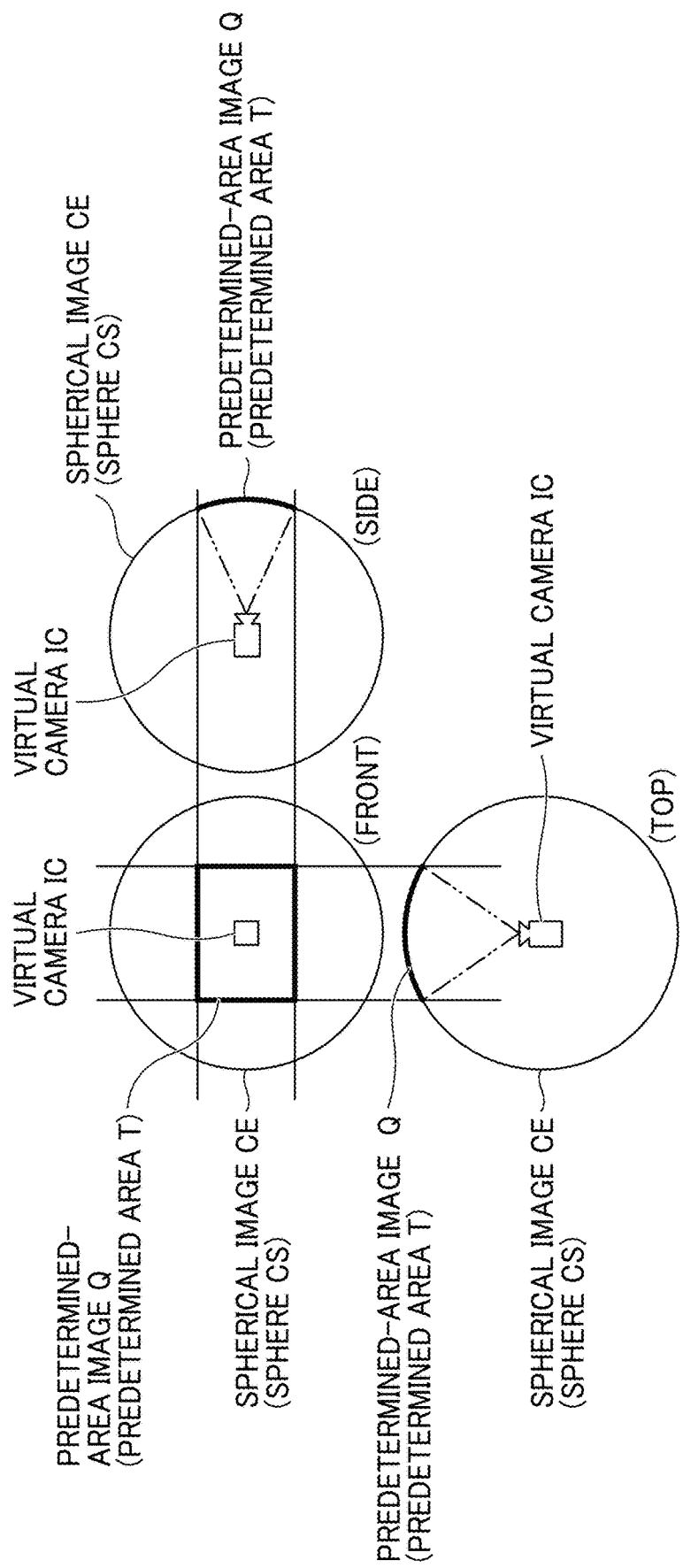
FIG. 9 is a view illustrating positions of a virtual camera and a predetermined area in a case where the spherical image is of a three-dimensional sphere according to an embodiment of the present disclosure.
Figure 10A:
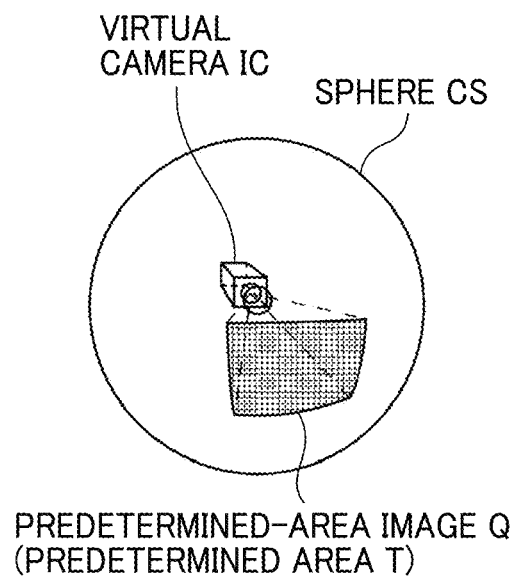
FIG. 10A is a perspective view of the virtual camera and the predetermined area illustrated in FIG. 9 according to an embodiment of the present disclosure.
Figure 10B:
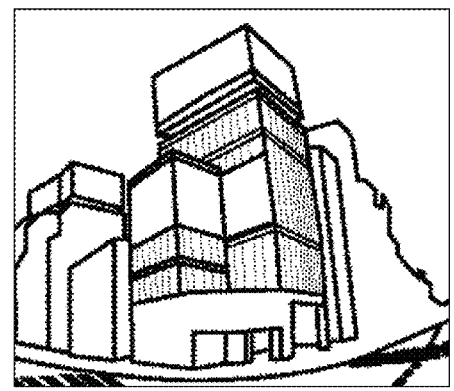
FIG. 10B is a view illustrating a predetermined-area image obtained in the state illustrated in FIG. 10A and displayed on a display according to an embodiment of the present disclosure.
Figure 10C:
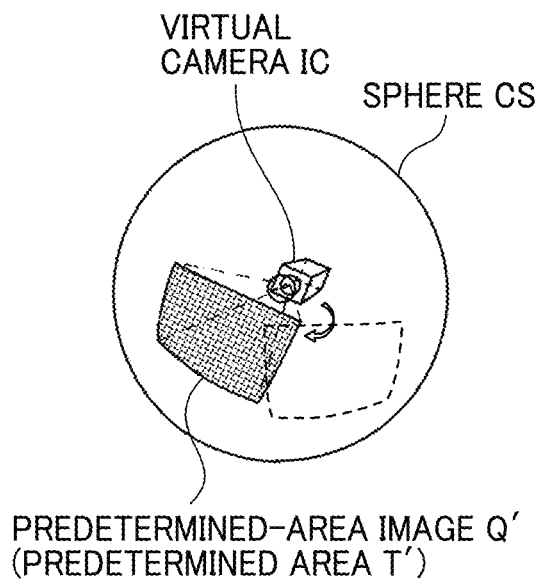
FIG. 10C is a view of a predetermined area obtained by changing the point of view of the virtual camera illustrated in FIG. 10A according to an embodiment of the present disclosure.
Figure 10D:
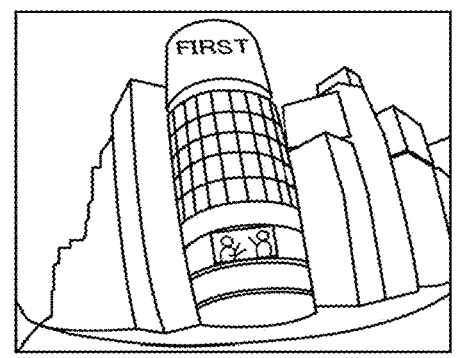
FIG. 10D is a view illustrating a predetermined-area image obtained in the state illustrated in FIG. 10C and displayed on the display according to an embodiment of the present disclosure.

FIG. 9 is a view illustrating the position of a virtual camera IC and the position of the predetermined area T in a case where the spherical image CE is of a three-dimensional sphere CS. The position of the virtual camera IC corresponds to the position of a virtual point of view of a user who is viewing the spherical image CE represented as a surface area of the three-dimensional sphere CS. FIG. 10A is a perspective view of the virtual camera IC and the predetermined area T illustrated in FIG. 9. FIG. 10B is a view illustrating a predetermined-area image obtained in the state illustrated in FIG. 10A and displayed on a display. FIG. 10C is a view of a predetermined area obtained by changing the point of view of the virtual camera IC illustrated in FIG. 10A. FIG. 10D is a view illustrating a predetermined-area image obtained in the state illustrated in FIG. 10C and displayed on the display.

Assuming that the spherical image CE generated in the way described above is a surface area of the sphere CS, the virtual camera IC is inside the spherical image CE as illustrated in FIG. 9. The predetermined area T in the spherical image CE is an imaging area of the virtual camera IC. Specifically, the predetermined area T is specified by predetermined-area information indicating an imaging direction and an angle of view of the virtual camera IC in a three-dimensional virtual space containing the spherical image CE. Zooming in or out of the predetermined area T can be implemented by bringing the virtual camera IC closer to or farther away from the spherical image CE. A predetermined-area image Q is the image of the predetermined area T in the spherical image CE. The predetermined area T is defined by an angle of view a of the virtual camera IC and a distance f from the virtual camera IC to the spherical image CE (see FIG. 11).

The predetermined-area image Q illustrated in FIG. 10A is displayed on a predetermined display as an image of the imaging area of the virtual camera IC, as illustrated in FIG. 10B. The image illustrated in FIG. 10B is a predetermined-area image represented by predetermined-area information that is set by default. A description will be made using the imaging direction (ea, aa) and the angle of view (a) of the virtual camera IC. In another example, the predetermined area T is not defined by the angle of view a and the distance f, and the imaging area of the virtual camera IC, which is the predetermined area T, is identified by position coordinates (X, Y, Z).

As illustrated in FIG. 10C, in response to the movement (also referred to as "shift") of the point of view of the virtual camera IC to the right (i.e., to the left from the viewer's perspective) from the state illustrated in FIG. 10A, the predetermined area T in the spherical image CE is moved to a predetermined area T'. Accordingly, the predetermined-area image Q displayed on the predetermined display is changed to a predetermined-area image Q'. As a result, the display displays the image illustrated in FIG. 10D instead of the image illustrated in FIG. 10B.

Figure 11:
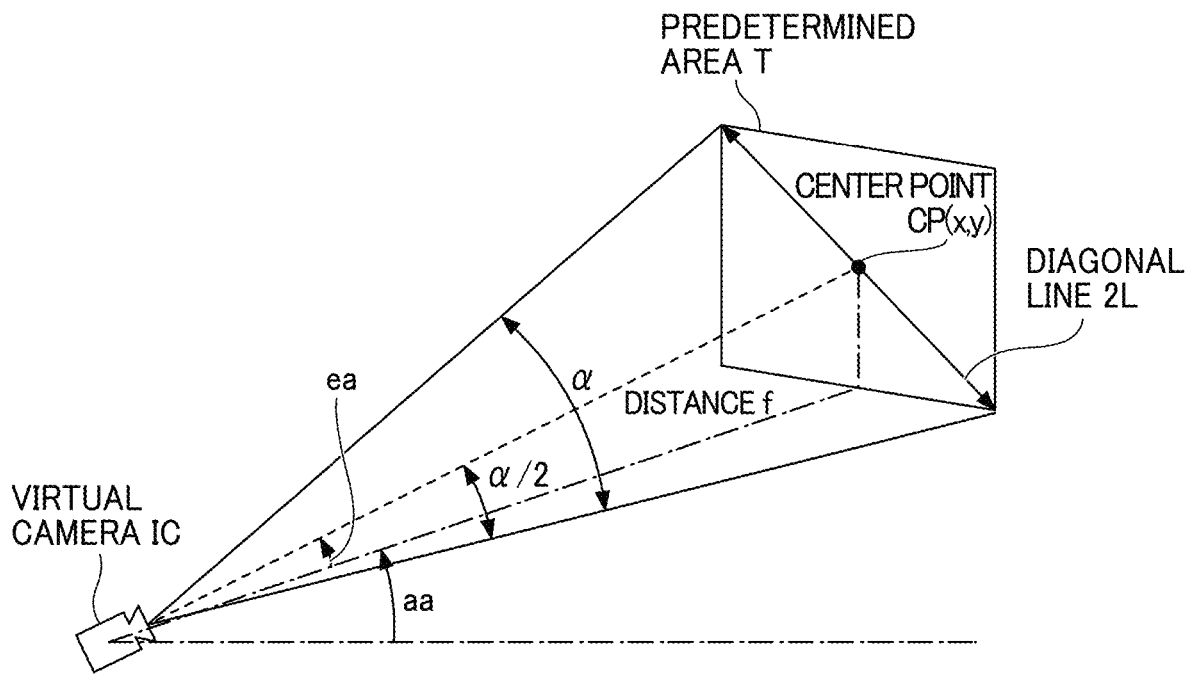
FIG. 11 is a view illustrating a relationship between predetermined-area information and an image of the predetermined area according to an embodiment of the present disclosure.

Next, a relationship between the predetermined-area information and the image of the predetermined area T will be described with reference to FIG. 11. FIG. 11 is a view illustrating a relationship between the predetermined-area information and the image of the predetermined area T. As illustrated in FIG. 11, "ea" denotes an elevation angle, "aa" denotes an azimuth angle, and "α" denotes an angle of view of the virtual camera IC. The position of the virtual camera IC is adjusted such that the point of gaze of the virtual camera IC, indicated by the imaging direction (ea, aa), matches a center point CP (x,y) of the predetermined area T serving as the imaging area of the virtual camera IC. As illustrated in FIG. 11, the center point CP (x,y) of the predetermined area T, whose diagonal angle of view is represented by the angle of view a of the virtual camera IC and is denoted by a, is used as a parameter (x,y) of the predetermined-area information. The predetermined-area image Q is the image of the predetermined area T in the spherical image CE. The distance f is a distance from the virtual camera IC to the center point CP (x,y) of the predetermined area T. The distance between the center point CP (x,y) and a given vertex of the predetermined area T is denoted by "L" (2L is a diagonal line). In FIG. 11, a trigonometric function generally expressed by Equation (1) below holds.

$$L/f = \tan\left(\frac{\alpha}{2}\right) \quad (1)$$

The image capturing apparatus 10 described above is an example of an image capturing apparatus that can acquire a wide-view image. The spherical image CE is an example of a wide-view image. The wide-view image is generally an image taken with a wide-angle lens such as a lens capable of taking a range wider than a range that the human eye can perceive.

Figure 12:
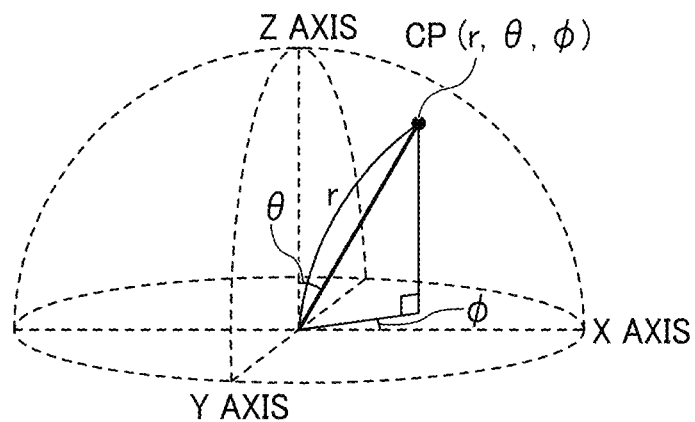
FIG. 12 is a view illustrating a point in a three-dimensional Euclidean space defined in spherical coordinates, according to an embodiment of the present disclosure.

FIG. 12 is a view illustrating the relationship illustrated in FIG. 11 using a point in a three-dimensional Euclidean space defined in spherical coordinates. The center point CP illustrated in FIG. 11 is represented by a spherical polar coordinate system to obtain position coordinates (r, θ, φ). The position coordinates (r, θ, φ) represent a radius vector, a polar angle, and an azimuth angle. The radius vector r is a distance from the origin of the three-dimensional virtual space including the spherical image CE to the center point CP. Accordingly, the radius vector r is equal to the distance f illustrated in FIG. 11. FIG. 12 illustrates the relationship illustrated in FIG. 11. In the following description, the position coordinates (r, θ, φ) of the virtual camera IC are used as an example of point-of-view information. As described above, the point-of-view information is any parameter information that can define the predetermined area T (the predetermined-area image Q) displayed on the predetermined display illustrated in FIG. 10A as the image of the imaging area of the virtual camera IC. The point-of-view information includes the coordinates of the diagonal vertices of the predetermined area T. In an example, the point-of-view information includes information indicating the angle of view a of the virtual camera IC and information indicating the center point CP (x,y), which have been described with reference to FIG. 11. In another example, the point-of-view information includes information indicating the angle of view a of the virtual camera IC and information indicating the azimuth angle aa, which have been described with reference to FIG. 11. Examples of the point-of-view information include position coordinate information in the form of spherical coordinates, position coordinate information in the form of orthogonal coordinates, and a difference value between the predetermined-area information that is set by default and the coordinates. Other examples of the point-of-view information include information other than coordinate information, such as an angle and a distance, as illustrated in FIG. 11. In FIGS. 11 and 12, the center point CP of the predetermined area T is used as a reference. In another example, the predetermined area T may be defined by parameter information with any one of the vertices of the predetermined area T as a reference. In the foregoing description of the point-of-view information, as a non-limiting example, the wide-view image is a spherical image. In any other wide-view image, information that defines the predetermined area T in the other wide-view image is point-of-view information.

The point-of-view information may include parameter information such as the height and width of the predetermined area T or parameter information such as the magnification factor of the virtual camera IC by zooming in or out. In an example, the point-of-view information is parameter information such as the direction and the angle of view of the virtual camera IC in a case where the position of each pixel in the equirectangular projection image EC illustrated in FIG. 7C is associated with the coordinates of the corresponding position on the surface of the sphere (e.g., coordinates on two axes, namely, latitude and longitude). In another example, the point-of-view information includes information such as latitude and longitude. As described above, the point-of-view information is not limited to information indicating a point.

Functions

Figure 13:
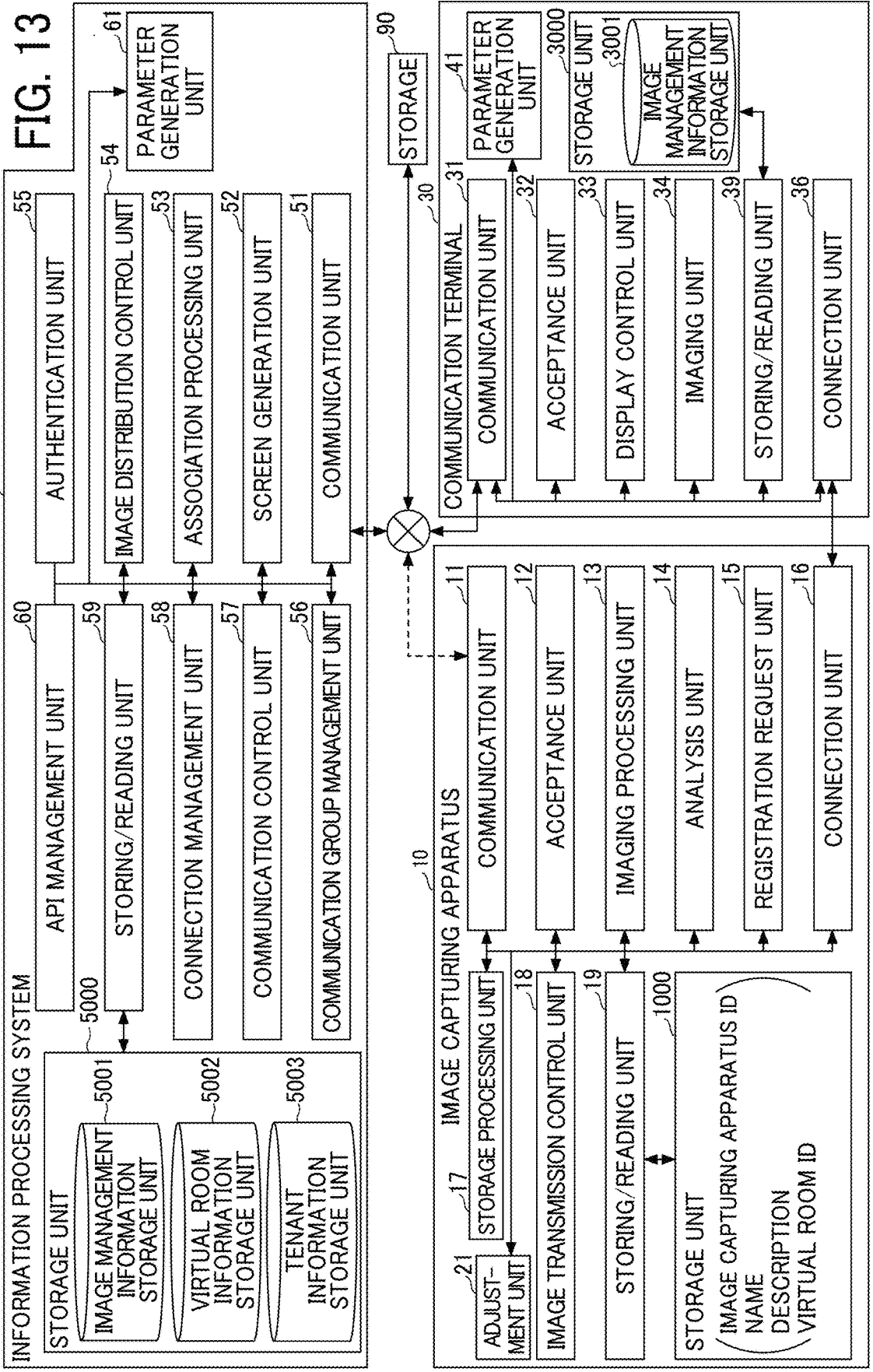
FIG. 13 is a diagram illustrating an example functional configuration of the communication system.

Next, the functional configuration of the communication system 1a according to this embodiment will be described with reference to FIG. 13. FIG. 13 is a diagram illustrating an example functional configuration of the communication system 1a according to this embodiment. FIG. 13 illustrates functions, related to processes or operations described below, of the terminals, the apparatus, and the server illustrated in FIG. 1.

Functional Configuration of Image Capturing Apparatus

First, the functional configuration of the image capturing apparatus 10 will be described with reference to FIG. 13. The image capturing apparatus 10 includes a communication unit 11, an acceptance unit 12, an imaging processing unit 13, an analysis unit 14, a registration request unit 15, a connection unit 16, a storage processing unit 17, an image transmission control unit 18, a storing/reading unit 19, and an adjustment unit 21. Each of these units is a function or means that is implemented by any one of the hardware elements illustrated in FIG. 3 operating in accordance with instructions from the CPU 111 according to the program loaded onto the SRAM 113 or the DRAM 114. The image capturing apparatus 10 further includes a storage unit 1000. The storage unit 1000 is implemented by the ROM 112 and the like illustrated in FIG. 3.

The communication unit 11 is mainly implemented by the short-range communication circuit 117 operating in accordance with instructions from the CPU 111. The communication unit 11 is a function of connecting to the communication network N by using wireless communication technology such as Wi-Fi® to transmit and receive various data or information to and from another apparatus. In this embodiment, the connection unit 16 transmits a wide-view image acquired by the imaging processing unit 13 to the information processing system 50. In some embodiments, the communication unit 11 may transmit the wide-view image to the information processing system 50.

The acceptance unit 12 is mainly implemented by the operation unit 115 operating in accordance with instructions from the CPU 111. The acceptance unit 12 is a function of accepting an operation input to the image capturing apparatus 10 from the user. The acceptance unit 12 accepts the operation of turning on or off the power, turning on or off a shutter button (start or stop of transmission of the wide-view image), an operation input to a touch panel, a button, or the like from the user.

The imaging processing unit 13 is mainly implemented by the image processor 104 operating in accordance with instructions from the CPU 111. The imaging processing unit 13 captures an image of an object or surroundings such as scenery and acquires (generates) a captured image. The captured image acquired by the imaging processing unit 13 may be either or both of a moving image and a still image. In another example, the captured image may include an image and audio. Further, for example, the imaging processing unit 13 captures an image of a two-dimensional code (see FIG. 19B) displayed on the display 306 of the communication terminal 30. The imaging processing unit 13 may execute the image processing described with reference to FIGS. 7A to 8B on the captured image to generate a wide-view image.

The analysis unit 14 is mainly implemented in accordance with instructions from the CPU 111. The analysis unit 14 analyzes the two-dimensional code, of which the image is captured by the imaging processing unit 13, to extract information included in the two-dimensional code. The extracted information includes a URL for registering the image capturing apparatus 10 in the tenant, a temporary ID, and a password.

The registration request unit 15 is mainly implemented in accordance with instructions from the CPU 111. The registration request unit 15 transmits a request to the information processing system 50 via the communication unit 11 to register the image capturing apparatus 10 in the tenant in the information processing system 50, by using the information included in the two-dimensional code read by the analysis unit 14.

The connection unit 16 is mainly implemented by the input/output I/F 116 operating in accordance with instructions from the CPU 111. The connection unit 16 is a function of receiving a supply of power from the communication terminal 30A and performing data communication.

The storage processing unit 17 is mainly implemented in accordance with instructions from the CPU 111. The storage processing unit 17 performs a process of storing a wide-view image captured in response to an image capturing request from any site in a URL (e.g., a URL that specifies the storage 90) transmitted from the information processing system 50.

The image transmission control unit 18 is mainly implemented in accordance with instructions from the CPU 111. The image transmission control unit 18 is a function of controlling transmission of the wide-view image to the information processing system 50. For example, the image transmission control unit 18 transmits a captured image acquired by the imaging processing unit 13 to the information processing system 50 periodically or in response to a user operation when the captured image is a still image, or at a predetermined frame per second (FPS) when the captured image is a moving image. The image transmission control unit 18 also performs switching between the communication unit 11 and the connection unit 16.

The adjustment unit 21 is mainly implemented in accordance with instructions from the CPU 111. The adjustment unit 21 adjusts the quality of the wide-view image by using one or more image capturing parameters of the image capturing apparatus, which are related to various image capturing functions. Specifically, the quality of the wide-view image may be adjusted by adjusting, for example, exposure, white balance, International Organization for Standardization (ISO) sensitivity, shutter speed, focus, noise reduction, dynamic range (DR) correction, or high dynamic range (HDR) rendering, of the image capturing apparatus.

The storing/reading unit 19 is mainly implemented in accordance with instructions from the CPU 111. The storing/reading unit 19 is a function of storing various data in the storage unit 1000 or reading various data from the storage unit 1000. The storage unit 1000 stores captured image data acquired by the imaging processing unit 13, an image capturing apparatus ID, and the like. In an example, the captured image data stored in the storage unit 1000 may be deleted when a predetermined amount of time has elapsed after the captured image data was acquired by the imaging processing unit 13. In another example, the data transmitted to the information processing system 50 may be deleted.

The image capturing apparatus 10 has installed therein an application (also referred to as a plug-in) for supporting the communication system 1a. The application is used to associate the image capturing apparatus 10 with the virtual room or to accept external control. Some of the functions illustrated in FIG. 13, for example, the registration request unit 15, are implemented by the application. The application for supporting the communication system 1a may reside on the communication network N, and a web browser or the like included in the image capturing apparatus 10 may access the application to implement similar functions.

Functional Configuration of Communication Terminal

Next, the functional configuration of the communication terminal 30 will be described with reference to FIG. 13. The communication terminal 30 includes a communication unit 31, an acceptance unit 32, a display control unit 33, an imaging unit 34, a connection unit 36, a storing/reading unit 39, and a parameter generation unit 41. Each of these units is a function or means that is implemented by any one of the hardware elements illustrated in FIG. 4 operating in accordance with instructions from the CPU 301 according to the program (either the web browser or a dedicated application) loaded onto the RAM 303. The communication terminal 30 further includes a storage unit 3000. The storage unit 3000 is implemented by the ROM 302 or the recording medium 315 illustrated in FIG. 4.

The communication unit 31 is implemented by the network I/F 309 operating in accordance with instructions from the CPU 301. The communication unit 31 is a function of connecting to the communication network N and transmitting or receiving various data or information to or from any other device.

The acceptance unit 32 is mainly implemented by the keyboard 311 and the pointing device 312 operating in accordance with instructions from the CPU 301. The acceptance unit 32 is a function of accepting various selection or operation inputs to the communication terminal 30. The display control unit 33 is a function of displaying a wide-view image, an image having a normal angle of view, and various screens on the display 306 of the communication terminal 30.

The display control unit 33 is mainly implemented in accordance with instructions from the CPU 301. For example, the display control unit 33 causes the display 306 to display a two-dimensional code transmitted from the information processing system 50. In an example, the two-dimensional code is QR Code®, DataMatrix (DataCode), MaxiCode, or Portable Document Format (PDF). In another example, the two-dimensional code is a barcode.

The imaging unit 34 is implemented by the camera 321 operating in accordance with instructions from the CPU 301. The imaging unit 34 captures an image of an object and surroundings.

The connection unit 36 is mainly implemented by the short-range communication circuit 320 operating in accordance with instructions from the CPU 301. The connection unit 36 is a function of supplying power to the image capturing apparatus 10 and performing data communication.

The parameter generation unit 41 is mainly implemented in accordance with instructions from the CPU 301. The parameter generation unit 41 determines whether the quality of a predetermined-area image displayed on the display 306 (an example of a display unit) is adequate, and generates image capturing parameters for making the quality of the predetermined-area image adequate if the quality of the predetermined-area image is not adequate. In an example, the communication terminal 30 does not include the parameter generation unit 41 if the information processing system 50 includes a parameter generation unit 61. For example, information regarding various image capturing functions representing the adequate image quality may be previously determined, and stored in any desired memory to be used for determination of whether the quality of the predetermined-area image is adequate. In this disclosure, in one example, the adequate quality may be set such that an optimum image quality is achieved.

The storing/reading unit 39 is mainly implemented in accordance with instructions from the CPU 301. The storing/reading unit 39 is a function of storing various data in the storage unit 3000 or reading various data from the storage unit 3000. The storage unit 3000 includes an image management information storage unit 3001. The image management information storage unit 3001 will be described in the description of the information processing system 50.

Functional Configuration of Information Processing System

Next, the functional configuration of the information processing system 50 will be described. The information processing system 50 includes a communication unit 51, a screen generation unit 52, an association processing unit 53, an image distribution control unit 54, an authentication unit 55, a communication group management unit 56, a communication control unit 57, a connection management unit 58, a storing/reading unit 59, an API management unit 60, and a parameter generation unit 61. Each of these units is a function or means that is implemented by any one of the hardware elements illustrated in FIG. 4 operating in accordance with instructions from the CPU 501 according to the program loaded onto the RAM 503. The information processing system 50 further includes a storage unit 5000. The storage unit 5000 is implemented by the ROM 502, the HDD 504, or the recording medium 515 illustrated in FIG. 4.

The communication unit 51 is mainly implemented by the network I/F 509 operating in accordance with instructions from the CPU 501. The communication unit 51 is a function of transmitting or receiving various data or information to or from any other device via the communication network N.

The screen generation unit 52 is mainly implemented in accordance with instructions from the CPU 501. The screen generation unit 52 generates screen information to be displayed on the communication terminal 30. The screen information is created by Hypertext Markup Language (HTML), Extensible Markup Language (XML), Cascade Style Sheet (CSS), JavaScript® (registered trademark), or any other language for a web application to be executed by the communication terminal 30. For a native application to be executed by the communication terminal 30, the screen information is held by the communication terminal 30, and the information to be displayed is transmitted in XML or the like. The screen generation unit 52 generates screen information in which a wide-view image or the like to be distributed by the image distribution control unit 54 through the communication unit 51 is arranged.

The association processing unit 53 is mainly implemented in accordance with instructions from the CPU 501. The association processing unit 53 performs control related to association and sharing of the point-of-view information of the wide-view image. In response to receipt of point-of-view information and an image capturing request from the communication terminal 30, the association processing unit 53 performs a process of associating the point-of-view information with a wide-view image acquired from the image capturing apparatus 10 in response to an image capturing request. The wide-view image and point-of-view information, which are associated with each other, are stored in an image management information storage unit 5001 by the storing/reading unit 59. Further, the association processing unit 53 transmits storage location information (e.g., URLs) to the communication terminal 30 as information indicating storage locations where the associated wide-view image and point-of-view information are to be stored. In an example, the information processing system 50 does not simultaneously receive the point-of-view information and the image capturing request from the communication terminal 30. The information processing system 50 separately receives the point-of-view information and the image capturing request and performs association processing. The URL is an example of storage location information indicating a storage location. The storage location information may be in any other format such as a uniform resource identifier (URI).

The image distribution control unit 54 is mainly implemented in accordance with instructions from the CPU 501. The image distribution control unit 54 distributes, to the communication terminal 30 operated by a user who is in the virtual room, an image such as a wide-view image transmitted from the image capturing apparatus 10 associated with the same virtual room, through the communication unit 51. An image having a normal angle of view captured by a camera included in the communication terminal 30 or the camera 8 or 9 connected to the communication terminal 30 is also distributed in a similar manner. The image to be distributed includes streaming video, a moving image, and a still image.

The authentication unit 55 is mainly implemented in accordance with instructions from the CPU 501. The authentication unit 55 is a function of authenticating a request source in response to an authentication request received by the communication unit 51. For example, the authentication unit 55 determines whether authentication information (a user ID and a password) included in the authentication request received by the communication unit 51 matches authentication information held in advance to perform user authentication. The authentication information may be the card number of an integrated circuit (IC) card, biometric authentication information such as a face, a fingerprint, or a voiceprint, a device ID, a passcode, an access token, a security key, or a ticket. The authentication unit 55 may perform authentication using an external authentication system or an authentication method such as Open Authorization (Oauth). The authentication unit 55 may authenticate a device such as an image capturing apparatus, instead of a user.

The communication group management unit 56 is mainly implemented in accordance with instructions from the CPU 501. The communication group management unit 56 manages the entry of the communication terminal 30 or the user into the virtual room, association between the virtual room and a device, and the like. Upon successful authentication of the user by the authentication unit 55, the communication group management unit 56 registers the user ID and the Internet protocol (IP) address of the communication terminal 30 in a virtual room information storage unit 5002 or associates the image capturing apparatus 10 with the virtual room.

The communication control unit 57 is mainly implemented in accordance with instructions from the CPU 501. The communication control unit 57 manages the start, establishment, and end of communication with the image capturing apparatus 10 associated with each virtual room. The communication control unit 57 also manages the start, establishment, and end of communication for distributing a wide-view image or audio in response to the communication terminal 30 entering or leaving the virtual room.

The connection management unit 58 is mainly implemented in accordance with instructions from the CPU 501. The connection management unit 58 manages communication (connection) established with the information processing system 50 by the communication terminal 30 and the image capturing apparatus 10 in association with the virtual room.

The API management unit 60 is mainly implemented in accordance with instructions from the CPU 501. The API management unit 60 manages an API to be used by a platform contractor to provide an image distribution service of a wide-view image. In the use of the API, the platform contractor develops software for calling the API. The software to be developed may operate on a server or may operate on a client such as a communication terminal. Any of the functions of the information processing system 50, such as the image distribution control unit 54, the association processing unit 53, and the communication control unit 57, can be provided as an API. Any function added to the information processing system 50 later may be provided as an API. To determine whether to provide a function as an API, a communication terminal operated by the platform provider accesses the information processing system 50 and accepts the public settings of the API. As a result, the API management unit 60 can control the API based on the public settings. The API management unit 60 may perform an authentication process for checking whether software operating on a request source that makes a request to call the API is software developed by an authorized platform contractor. The authentication process can be performed by comparing information registered and stored in advance in the storage unit 5000 as information on the platform contractor with information transmitted from the software operating on the request source.

In a specific example of the authentication process, the information processing system 50 receives, from the software operating on the request source, an application ID issued to the software developed by the platform contractor in advance by the API management unit 60. If the API management unit 60 determines that the application ID matches an application ID stored in the storage unit 5000, the API management unit 60 performs control to give permission to provide an API since the software developed by the platform contractor is determined as being valid. If the software developed by the platform contractor is not determined as being valid, the API management unit 60 performs control not to give permission to provide an API.

The application ID is an example of authentication information for determining validity. The API management unit 60 may use authentication information issued in advance by the API management unit 60 of the information processing system 50 or by an external system to check the validity of the request source. Examples of such authentication information include an access token, a ticket, a security key, a password, and a personal identification (PIN) code. In this embodiment, while the use of a function of the information processing system 50 as an API is not described, the same process flow is performed, except that software such as an application developed by a platform contractor uses a function of the information processing system 50 through a determination made by the API management unit 60.

The parameter generation unit 61 is mainly implemented in accordance with instructions from the CPU 501. The parameter generation unit 61 determines whether the quality of a predetermined-area image displayed on the display 306 (an example of a display unit) of the communication terminal 30 is adequate, and generates image capturing parameters for making the quality of the predetermined-area image adequate if the quality of the predetermined-area image is not adequate. To recognize a predetermined area in the wide-view image, which is the predetermined-area image displayed on the display 306 of the communication terminal 30, the parameter generation unit 61 acquires, from the communication terminal 30, point-of-view information (predetermined-area information) for identifying the predetermined area as the predetermined-area image. In an example, the information processing system 50 does not include the parameter generation unit 61 if the communication terminal 30 includes the parameter generation unit 41.

The storing/reading unit 59 is mainly implemented in accordance with instructions from the CPU 501. The storing/reading unit 59 is a function of storing various data in the storage unit 5000 or reading various data from the storage unit 5000.

Image Management Information Storage Unit 5001

The storage unit 5000 includes an image management information storage unit 5001. FIG. 14A is a table illustrating image management information stored in the image management information storage unit 5001. The image management information storage unit 5001 stores image management information as illustrated in FIG. 14A. The image management information is information for managing wide-view images captured in response to image capturing requests. In response to a user transmitting an image capturing request from the communication terminal 30, image management information for one record is generated. The items contained in the image management information will be described.

The item "data ID" of a wide-view image is identification information that identifies image data of the wide-view image. The information processing system 50 numbers each data ID. ID is an abbreviation for identification and means an identifier or identification information. ID is any one or a combination of two or more of a name, a symbol, a character string, and a numerical value that are used for uniquely identifying a specific object from among a plurality of objects. Each data ID may be associated with a wide-view image or an image captured at a normal angle of view by the image capturing apparatus 10 associated with the virtual room.

The item "data name" is the name of a wide-view image set by the user of the communication terminal 30. Each data name may be set by the user or automatically.

The item "imaging date and time information" is information that specifies the imaging date and time of a captured image such as a wide-view image. Examples of the imaging date and time include the date and time when the user input an image capturing request to the communication terminal 30, and the date and time when the image capturing apparatus 10 captured an image such as a wide-view image. The imaging date and time information may be time stamp information of a captured image such as a wide-view image.

The item "imaging operator information" is identification information (including a user ID and a user name) of a user (imaging operator) who has input an image capturing request to the communication terminal 30. Since a user inputs an image capturing request to the communication terminal 30 after entering the virtual room, a user registered in the imaging operator information is identified by authentication to the information processing system 50 or the virtual room. The imaging operator information is transmitted to the information processing system 50 together with an image capturing request. In an example, an image capturing request and imaging operator information are not transmitted to the information processing system 50 at the same time, and are transmitted to the information processing system 50 at different timings.

The item "image capturing apparatus information" is identification information (image capturing apparatus ID) of the image capturing apparatus 10 that has captured an image to generate a wide-view image. The information processing system 50 numbers each image capturing apparatus ID and shares the image capturing apparatus ID with the image capturing apparatus 10. The image capturing apparatus ID may be information unique to the image capturing apparatus 10, such as a media access control (MAC) address or a serial number. The image capturing apparatus ID is transmitted to the information processing system 50 together with the associated wide-view image. In an example, the image capturing apparatus ID and the associated wide-view image are not transmitted to the information processing system 50 at the same time, and are transmitted to the information processing system 50 at different timings.

The item "imaging operator's point-of-view information" is point-of-view information designated for the communication terminal 30 of each imaging operator. In an example, point-of-view information indicates the coordinates of the center (center point illustrated in FIG. 11) of a wide-view image currently displayed on the communication terminal 30. The point-of-view information is parameter information used for identifying a predetermined area T (see FIGS. 9 and 10A to 10D) in a wide-view image to be displayed on the communication terminal 30. In the illustrated example, the radius vector (r), the polar angle (θ), and the azimuth angle (φ) are given as the parameter information. Alternatively, any other parameter information described with reference to FIGS. 10A to 12 may be used. The point-of-view information is transmitted from the communication terminal 30 that makes an image capturing request. The point-of-view information may include information designating the width and height of the display range of the predetermined area T. Alternatively, the point-of-view information may be the width and height of the display range.

The item "imaging-time virtual room ID" is identification information of a virtual room associated with the image capturing apparatus 10.

The item "data storage location information" (storage destination information) of a wide-view image is information indicating a location where the wide-view image is stored. The data storage location information is represented by a URL, a file path, or the like. In an example, the storage location identified by the storage location information may be information indicating a predetermined folder. The folder may be a folder associated with a virtual room at an imaging time. The folder may be a folder associated with identification information (additional information such as a name) indicating any one or a combination of two or more of categories such as the imaging date and time, the image capturing apparatus, the imaging operator, and the imaging-time virtual room ID. In another example, the data storage location information may be used in combination with information such as a data ID and a data name to identify a data storage location.

FIG. 14B is a table illustrating image management information as a modification of the image management information illustrated in FIG. 14A. In FIG. 14B, wide-view images having the same imaging-time virtual room ID are stored. In this manner, image management information may be classified in units of virtual rooms.

Virtual Room Information Storage Unit 5002

The storage unit 5000 includes the virtual room information storage unit 5002. FIG. 15A is a table illustrating virtual room information stored in the virtual room information storage unit 5002. The virtual room information storage unit 5002 stores virtual room information as illustrated in FIG. 15A. The virtual room information is information related to a virtual room. The virtual room information is held for each virtual room. The items contained in the virtual room information will be described. In an example, the virtual room is registered in a tenant. In another example, the virtual room is not registered in a tenant, and information on a temporarily created virtual room or a virtual room to be shared for use is also stored in the virtual room information storage unit 5002.

The item "virtual room ID" is identification information that identifies the virtual room. In this embodiment, each virtual room can be created by a user as appropriate.

The item "virtual room name" is a name for the user to identify the virtual room. Each virtual room name can be set by a user as appropriate. The virtual room ID and the virtual room name may be the same information.

The item "device information" is identification information (device ID) of a device including the image capturing apparatus 10 associated with the virtual room.

The item "user in virtual room" is the user ID of a user who has entered and is currently in the virtual room. The user is a user authorized to view an image such as a wide-view image distributed to persons present in the virtual room. The method for entering a virtual room will be described below. The user ID may be associated with the IP address of the communication terminal 30 operated by the user. The user ID may be stored in association with a user name.

Tenant Information Storage Unit 5003

The storage unit 5000 includes a tenant information storage unit 5003. FIG. 15B is a table illustrating tenant information stored in the tenant information storage unit 5003. The tenant information storage unit 5003 stores tenant information as illustrated in FIG. 15B. The tenant information is information related to a tenant (user group). The tenant information is held for each tenant. The items contained in the tenant information will be described. The tenant information includes various kinds of information other than that illustrated in FIG. 15B, such as user information. FIG. 15B illustrates part of the tenant information.

The item "tenant ID" is identification information that identifies the tenant.

The item "tenant name" is a name for the user to identify the tenant. The tenant ID and the tenant name may be the same information.

The item "tenant-registered virtual room ID" is identification information of a virtual room registered in the tenant.

The item "tenant-registered device" is information related to a device registered in the tenant.

The tenant information storage unit, the tenant ID, the tenant name, the tenant-registered virtual room ID, and the tenant-registered device may also be referred to as a user group information storage unit, a user group ID, a user group name, a user-group-registered virtual room ID, and a user-group-registered device, respectively.

Entry of Communication Terminal into Virtual Room

Next, a process in which the user b enters the virtual room will be described with reference to FIGS. 16A, 16B, and 17. In the illustrated example, the image capturing apparatus 10 has already been associated with a virtual room, and the communication terminal 30A has transmitted a wide-view image and an image having a normal angle of view to the information processing system 50. The association of the image capturing apparatus 10 with the virtual room and the like will be described with reference to FIG. 18 and the subsequent figures. In the following description, no distinction is made between the entry of the user b into the virtual room and the entry of the communication terminal 30B, which is operated by the user b, into the virtual room.

Figure 16A:
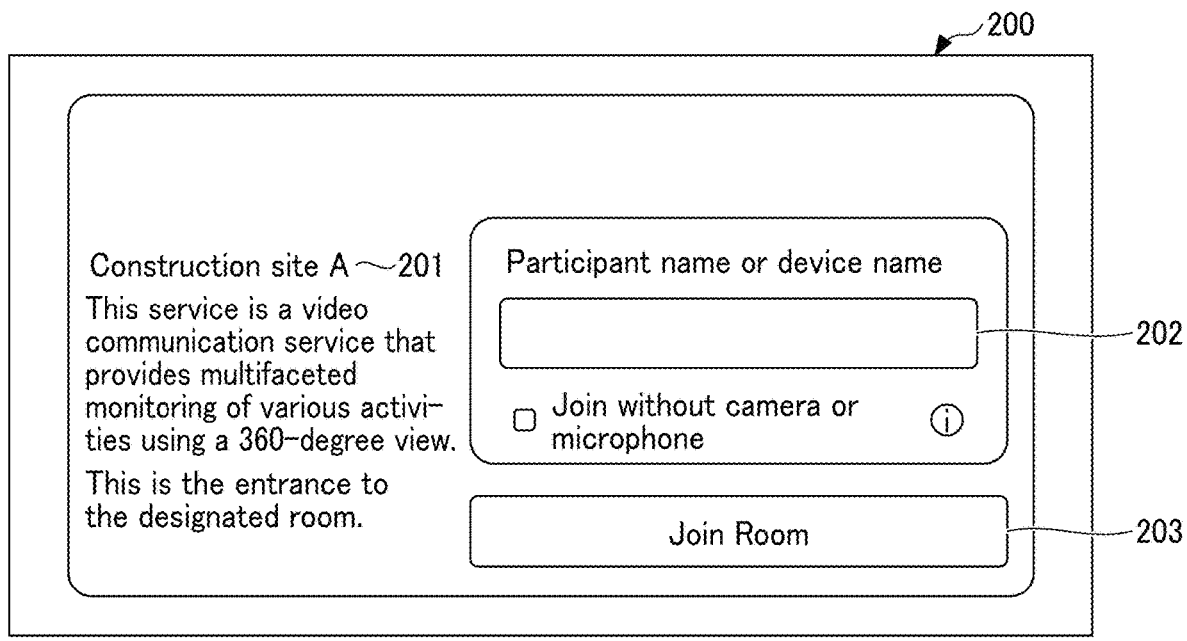
FIG. 16A is a view illustrating an example of a room entry screen.
Figure 16B:
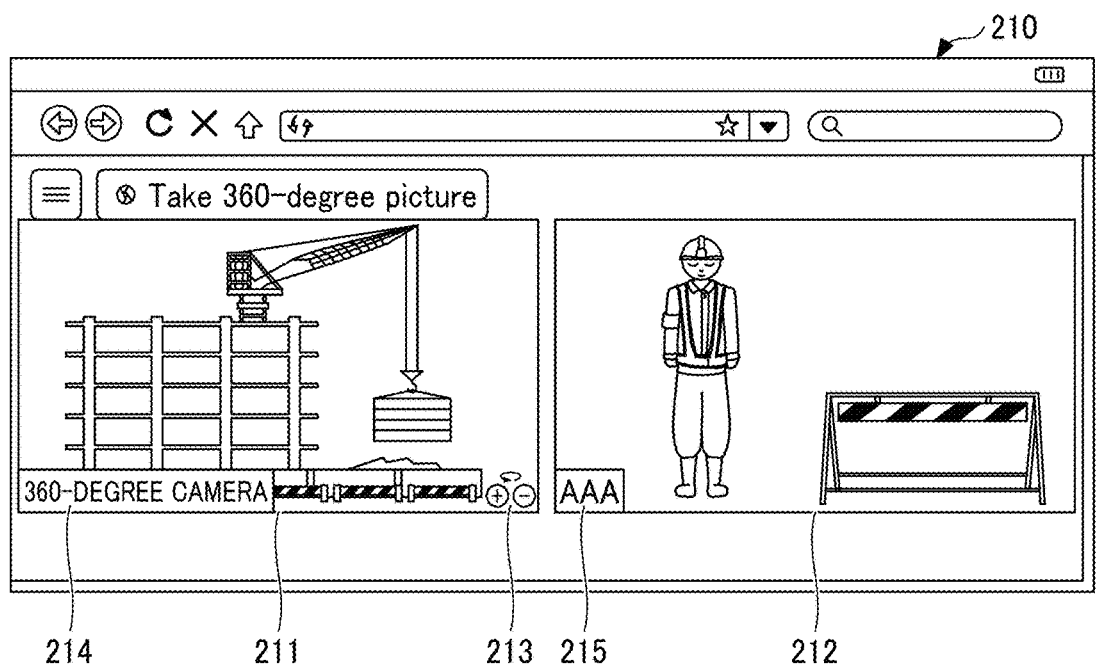
FIG. 16B is a view illustrating an example of an image viewing screen displayed on the communication terminal in response to a user entering a virtual room.

FIGS. 16A and 16B illustrate examples of a screen displayed on the communication terminal 30B when the user b is to enter the virtual room. FIG. 16A illustrates an example of a room entry screen 200. Prior to the display of the room entry screen 200, the user b logs into the information processing system 50. Upon the login of the user b, the tenant to which the user b belongs is identified. Virtual rooms are associated with the tenant. A list of virtual rooms associated with the tenant is displayed on the communication terminal 30B (see FIG. 21), and the user b selects a virtual room that the user b is to enter from the list. FIG. 16A illustrates the room entry screen 200 for the virtual room selected by the user b. A temporarily created virtual room or a shared virtual room, which is not associated with the tenant, may be displayed on the screen illustrated in FIG. 16A.

Alternatively, the creator of the virtual room may request the information processing system 50 to issue a URL corresponding to the virtual room, and the URL may be transmitted to the user b via email or any other suitable means. In response to the user b clicking on the URL displayed on the communication terminal 30B, the communication terminal 30B displays the room entry screen 200 illustrated in FIG. 16A.

The room entry screen 200 includes a virtual room name 201, a participant name input field 202, and a room entry button 203. The virtual room name 201 is the same as that stored in the virtual room information storage unit 5002. The participant name input field 202 is a field for entering a user name to be displayed in the virtual room. The user name may be a name such as a nickname of the user b. Upon the login of the user b, a user name associated with the user ID of the user b may be identified. The identified user name may be automatically displayed. The room entry button 203 is a button for the user b to send a request to enter the virtual room.

At the time of entry into the virtual room, authentication for entering the virtual room may be requested separately from the login to the tenant.

FIG. 16B illustrates an image viewing screen 210 displayed on the communication terminal 30B upon the user b entering the virtual room. The image viewing screen 210 illustrated in FIG. 16B indicates that the image capturing apparatus 10 has already started distributing a wide-view image via the information processing system 50 and that the communication terminal 30A has already started distributing an image having a normal angle of view. The image viewing screen 210 includes a first image field 211 and a second image field 212. The first image field 211 displays the wide-view image, and the second image field 212 displays the image having a normal angle of view. In an example, images are transmitted from three or more sites. The image viewing screen 210 is divided into a number of portions corresponding to the number of sites from which images are transmitted.

The first image field 211 displays a wide-view image mark 213. The wide-view image mark 213 is set by the screen generation unit 52 of the information processing system 50 upon determination that the image to be displayed in the first image field 211 is a wide-view image. The determination may be made by the communication terminal 30B, and the communication terminal 30B may display the wide-view image mark 213. The wide-view image mark 213 allows the user b to know that a wide-view image for which the point of view can be changed has been distributed. The first image field 211 also displays a device name 214. The device name 214 is transmitted from the image capturing apparatus 10 together with the wide-view image. The device name 214 is information set by the user a or the like (see FIGS. 19A and 19B), as described below.

The second image field 212 displays a participant name 215. The participant name 215 is a user name. The participant name of a user who has already entered the virtual room is displayed in the participant name input field 202. In the illustrated example, since the user a has already entered the virtual room, "AAA", which is entered by the user a in the participant name input field 202, is displayed in the participant name input field 202.

FIG. 17 is a sequence diagram illustrating a process in which the user b (or the communication terminal 30B) enters the virtual room.

S1: First, the user b at the site B performs an operation of displaying a virtual room list screen. The communication terminal 30B accesses the information processing system 50 in advance in response to an operation performed by the user b, and receives, from the information processing system 50, information on the virtual rooms stored in the virtual room information storage unit 5002 to display a virtual room list screen. At this time, the communication terminal 30B may transmit authentication information used for login or the like to the information processing system 50 and may be authenticated by the authentication unit 55 of the information processing system 50. The authentication information may be authentication information associated with the user b or authentication information associated with the communication terminal 30B. The virtual rooms displayed in the virtual room list screen may be virtual rooms registered in the tenant associated with the user b or virtual rooms registered in the tenant associated with the communication terminal 30B. In response to the acceptance unit 32 accepting the operation of displaying the virtual room list screen, the display control unit 33 of the communication terminal 30B causes the display 306 to display a selection screen.

S2: In response to the user b selecting a selection button for one of the virtual rooms, the acceptance unit 32 of the communication terminal 30B accepts the selection of the virtual room. The display control unit 33 of the communication terminal 30B causes the display 306 to display the room entry screen 200 illustrated in FIG. 16A.

S3: The user b completes the items and then presses the room entry button 203. In response to the acceptance unit 32 accepting the pressing of the room entry button 203, the communication unit 31 of the communication terminal 30B transmits a request to the information processing system 50 to enter the virtual room. The request for entering the virtual room includes information such as a virtual room ID indicating the virtual room selected in step S2, the user ID of the user b authenticated by login or the like, and the IP address of the communication terminal 30B from which the request is transmitted. Then, the communication unit 51 of the information processing system 50 receives the request for entering the virtual room.

S4: The communication group management unit 56 registers the IP address and the user ID authenticated by login or the like in the virtual room information identified by the virtual room ID in the virtual room information storage unit 5002.

S5: The communication unit 51 of the information processing system 50 transmits, to the communication terminal 30B, a response indicating that the communication terminal 30B has already entered the virtual room. Then, the communication unit 31 of the communication terminal 30B receives the response indicating that the communication terminal 30B has already entered the virtual room. After step S5, the display control unit 33 of the communication terminal 30B receives information on a screen generated by the screen generation unit 52 of the information processing system 50 and information on the image distributed by the image distribution control unit 54, and causes the image viewing screen 210 illustrated in FIG. 16B to be displayed based on the received information.

Association of Image Capturing Apparatus with Room

Next, an association of the image capturing apparatus 10 with a virtual room will be described with reference to FIGS. 18 to 25. In an example, the user a at the site A associates the image capturing apparatus 10 with a virtual room. In another example, a system administrator, a tenant administrator, or the like associates the image capturing apparatus 10 with a virtual room.

FIG. 18 illustrates an example of a device registration screen 220 displayed on the communication terminal 30A. The user a has been authenticated by the information processing system 50 by login or the like. Upon the login of the user a, the tenant to which the user a belongs is identified. The user a requests the information processing system 50 to display the device registration screen 220. The communication terminal 30A displays the device registration screen 220 received from the information processing system 50. First, a device is registered in the tenant on the device registration screen 220.

The device registration screen 220 includes an image capturing apparatus registration button 221, a VR goggles registration button 222, and a smart glasses registration button 223. Buttons are provided for the respective types of devices because the devices are different in the presence or absence of a camera, information used for registration, or the like. Since devices are registered on a per-type basis, the information processing system 50 can also grasp the types of the devices.

The image capturing apparatus registration button 221 is a button for the user a to register the image capturing apparatus 10. The VR goggles registration button 222 is a button for the user a to register the VR goggles 89. The smart glasses registration button 223 is a button for the user a to register the smart glasses 88.

FIGS. 19A and 19B illustrate an example of screens displayed in response to the pressing of the image capturing apparatus registration button 221. FIG. 19A illustrates an image capturing apparatus registration dialog 230. The image capturing apparatus registration dialog 230 includes a name field 231 for the image capturing apparatus 10, a description field 232 for the image capturing apparatus 10, and a next button 233. The user a sets any name in the name field 231 for the image capturing apparatus 10 and sets a description in the description field 232 for the image capturing apparatus 10 such that the image capturing apparatus 10 to be registered can be identified.

In response to the user a pressing the next button 233, the communication terminal 30A requests a two-dimensional code from the information processing system 50. The communication terminal 30A displays the two-dimensional code.

FIG. 19B illustrates an example of a two-dimensional code screen 240 displayed on the communication terminal 30A. The two-dimensional code screen 240 includes a message 241 and a two-dimensional code 242. The message 241 indicates "Scan the two-dimensional code below to register the device named xxx (xxx is the name entered in the name field 231)". The user a captures an image of the two-dimensional code 242 with the image capturing apparatus 10 to be registered. The two-dimensional code 242 includes a URL to which the image capturing apparatus 10 connects to register the image capturing apparatus 10, and authentication information used for registration, such as a temporary ID and a password.

In response to the user a capturing the two-dimensional code 242 with the image capturing apparatus 10, the image capturing apparatus 10 connects to the URL and is authenticated using the temporary ID and the password. If the authentication is successful, the temporary ID is replaced with a formal image capturing apparatus ID, and the name, the description, and the image capturing apparatus ID of the image capturing apparatus 10 are registered in the tenant. The image capturing apparatus 10 also holds the image capturing apparatus ID, the name, and the description. The image capturing apparatus 10 registered in the tenant is associated with the virtual room in response to an operation performed by the user a described below. The two-dimensional code 242 is an example of code information and has embedded therein similar authentication information. In another example, the two-dimensional code 242 is any other form of code such as a barcode.

Next, an example method for registering a communication terminal such as the VR goggles 89 or the smart glasses 88 in a tenant will be described with reference to FIG. 20. FIG. 20 illustrates an example of a VR goggles registration screen 250 displayed in response to the pressing of the VR goggles registration button 222. The VR goggles registration screen 250 includes a temporary code input field 251 and a secret input field 252.

Without a camera, it is difficult for the VR goggles 89 to capture an image of a two-dimensional code. A temporary code (temporary ID) and a secret (password) may be output from (displayed on) the VR goggles 89, and the user a may enter the temporary code and the secret to the temporary code input field 251 and the secret input field 252, respectively. The communication terminal 30A transmits the temporary code and the secret to the information processing system 50 to register the VR goggles 89 in the tenant. The VR goggles 89 connect to the information processing system 50 and transmit the temporary code and the secret. As a result, the VR goggles 89 are authenticated by the information processing system 50. If the authentication is successful, the temporary code is replaced with a formal VR goggles ID, and the VR goggles ID is registered in the tenant. The VR goggles 89 also hold the VR goggles ID. The VR goggles 89 registered in the tenant are associated with a virtual room in response to an operation performed by the user a described below. The smart glasses 88 can also be registered by the user a in a manner similar to that for the image capturing apparatus 10 or the VR goggles 89, which will be described in detail. The temporary code and the secret are an example of authentication information. Other information may be used as authentication information. The image capturing apparatus ID, the VR goggles ID, and the smart glasses ID are each an example of a device ID and may also be referred to as device IDs. A device other than the image capturing apparatus 10, VR goggles, and smart glasses may be registered by using a device ID for associating the device with a virtual room or a tenant in a similar procedure. The device ID may be identification information associated with the owner of the device.

Figure 21:
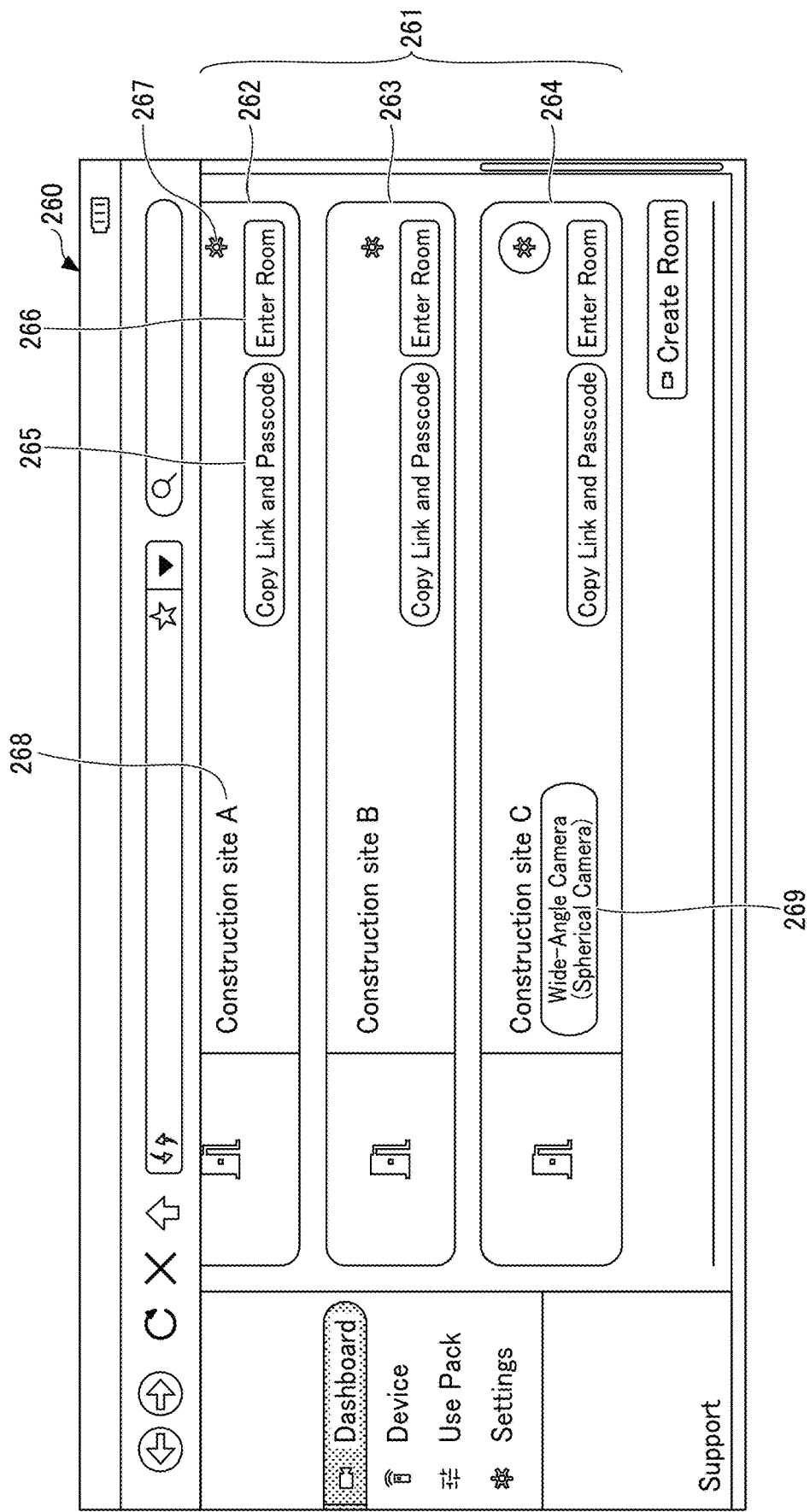
FIG. 21 is a view illustrating an example of a virtual room association screen for associating an image capturing apparatus with a virtual room.

FIG. 21 illustrates an example of a virtual room association screen 260 for associating the image capturing apparatus 10 with a virtual room. The same screen configuration may be used for the VR goggles 89 and the smart glasses 88. The virtual room association screen 260 includes a virtual room list 261. The virtual room list 261 displays individual virtual room fields 262, 263, and 264, based on virtual rooms created in the tenant. Each of the individual virtual room fields 262 to 264 includes a link issuance button 265, a room entry button 266, a settings button 267, and a virtual room name 268. The link issuance button 265 is a button for issuing a link (a URL for invitation) to the corresponding virtual room and a passcode. The room entry button 266 is a button for the user a to enter the virtual room. The settings button 267 is a button for associating the image capturing apparatus 10 with the virtual room. The virtual room name 268 is the same as that stored in the virtual room information storage unit 5002. The user a presses the settings button 267. In response to the pressing of the settings button 267, the communication terminal 30A displays a virtual room association screen 270.

If a device has already been associated with the virtual room, a name 269 of the device is displayed in the individual virtual room field (in FIG. 21, the individual virtual room field 264).

Figure 22:
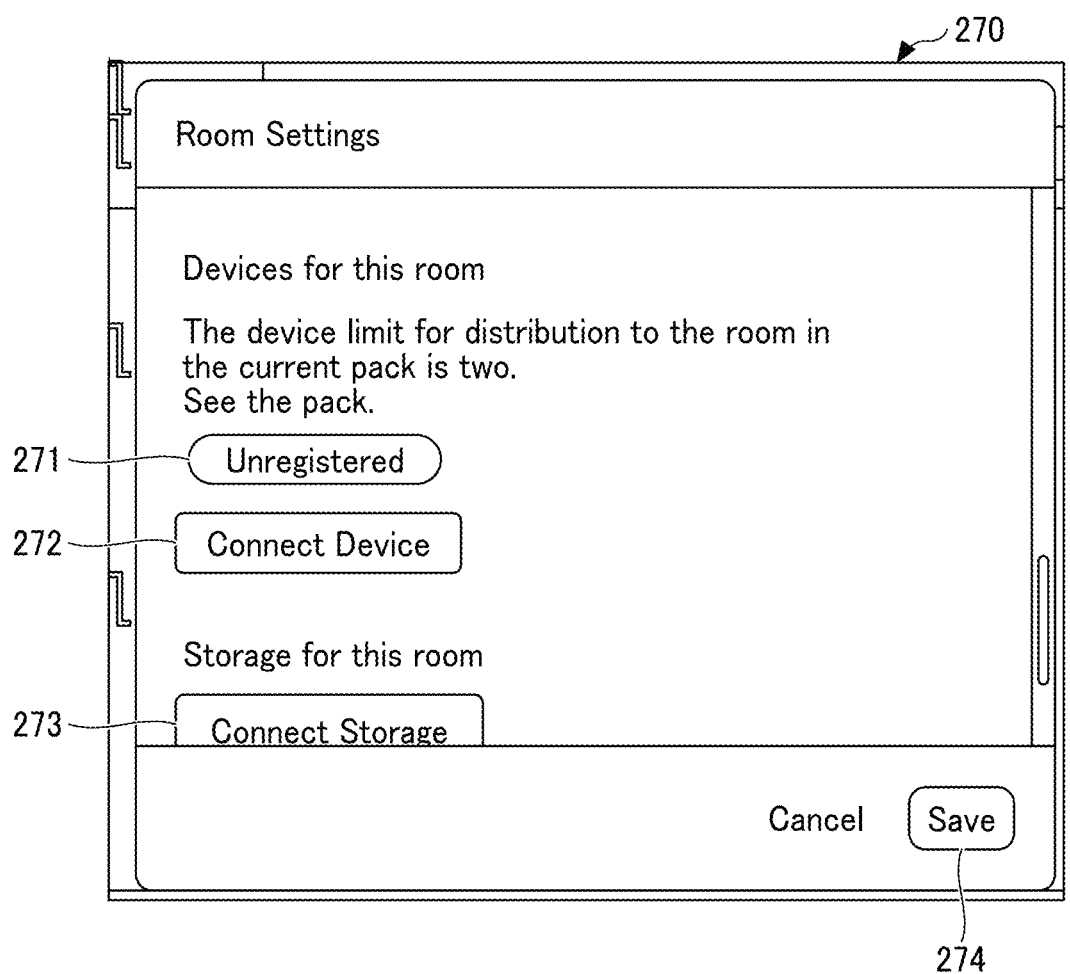
FIG. 22 is a view illustrating an example of a virtual room association screen.

FIG. 22 illustrates an example of the virtual room association screen 270. The virtual room association screen 270 is displayed as a pop-up on the virtual room association screen 260. In an example, the screen transition from the virtual room association screen 260 to the virtual room association screen 270 is not made through the information processing system 50. In another example, the screen transition from the virtual room association screen 260 to the virtual room association screen 270 is made through the information processing system 50.

The virtual room association screen 270 includes a name 271 of the image capturing apparatus 10 that is currently (or has already been) associated with the virtual room, a connection button 272, a storage button 273, and a Save button 274. In FIG. 22, the name 271 is set unregistered because the image capturing apparatus 10 is not registered yet. The connection button 272 is a button for displaying a list of devices registered in the tenant as candidates to be associated with the virtual room to associate a device with the virtual room. The storage button 273 is a button for displaying a list of storages 90 to store an image having a normal angle of view or a wide-view image captured by the image capturing apparatus 10 associated with the virtual room. Examples of the list of storages 90 may include a list of storages 90 to be associated with the virtual room and a list of specific storage locations such as folders in the storages 90. The user a selects a predetermined storage 90 or a specific storage location such as a folder in the storage 90 to associate the storage 90 with the virtual room. Information on the storage 90 associated with the virtual room in the way described above can be stored in the virtual room information storage unit 5002 in association with the virtual room ID. Examples of the information on the storage 90 include address information for accessing the storage 90 and a storage location such as a folder in the storage 90. In response to the pressing of the connection button 272, the communication terminal 30A displays a virtual room association screen 280.

The communication terminal 30A transmits a virtual room ID to the information processing system 50 and acquires the name (or ID) of a device registered in the tenant for which the virtual room is generated and the name (or ID) of a device associated with the virtual room.

Figure 23:
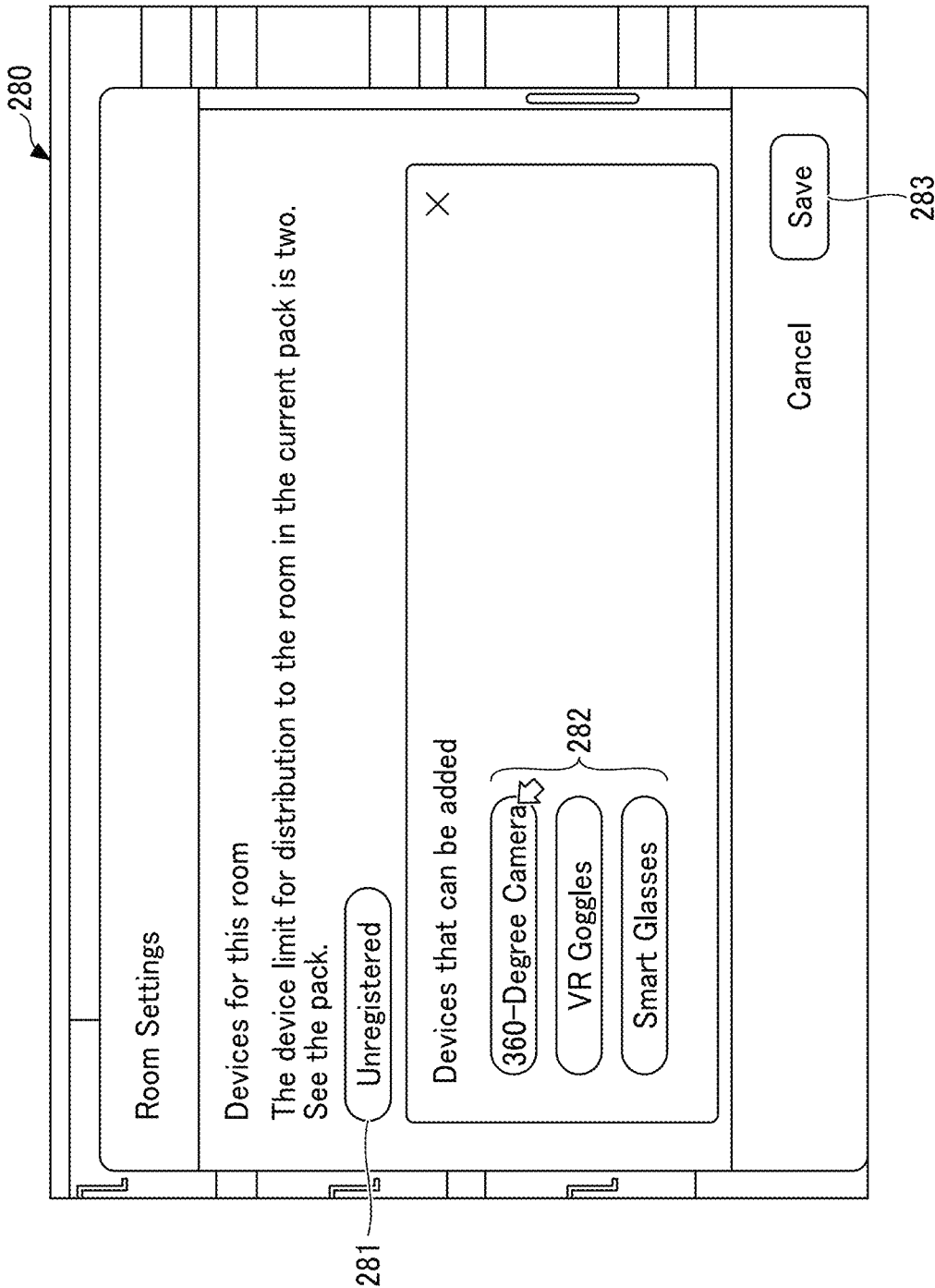
FIG. 23 is a view illustrating an example of a virtual room association screen.

FIG. 23 illustrates an example of the virtual room association screen 280. The virtual room association screen 280 includes a name 281 of the image capturing apparatus 10 that is currently (or has already been) associated with the virtual room, a list of devices 282 that can be added, and a save button 283. The user a selects a device to be additionally associated with the virtual room from the list of devices 282 that can be added and then presses the save button 283. As a result, the selected device is associated with the virtual room. That is, a device ID such as an image capturing apparatus ID is registered in the virtual room information storage unit 5002. As illustrated in FIG. 23, the number of image capturing apparatuses to be associated with the virtual room may be limited. In an example, the upper limit is two. In this case, the number of image capturing apparatus IDs that have already been registered in the virtual room information storage unit 5002 may be referred to, and the remaining number of devices that can be additionally registered may be displayed on the virtual room association screen 280.

Process for Starting Transmitting Wide-View Image to Image Capturing Apparatus

In the way described above, a device such as the image capturing apparatus 10 is associated with the virtual room. The user a operates the device to start transmitting an image.

For the VR goggles 89 and the smart glasses 88, the user a operates the device main body to turn on or off the transmission of an image. This is because no application dedicated to the communication system 1a is currently operating on the VR goggles 89 or the smart glasses 88. If an application dedicated to the communication system 1a operates on the VR goggles 89 and the smart glasses 88, the user a can also remotely turn on or off the transmission of an image.

For the image capturing apparatus 10, when the application is enabled, the user a can turn on or off the transmission of the wide-view image from the menu of the application after entering the virtual room.

Figure 24A:
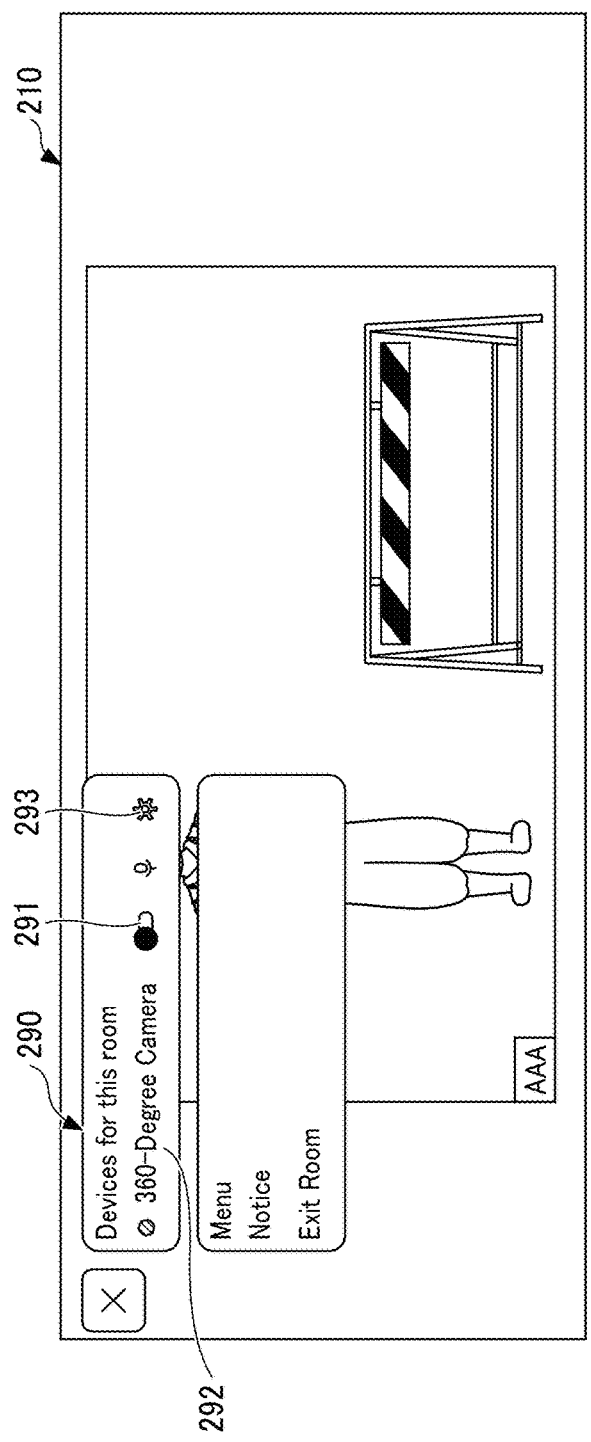
FIGS. 24A and 24B are views illustrating examples of a wide-view image transmission control dialog displayed on the communication terminal.
Figure 24B:
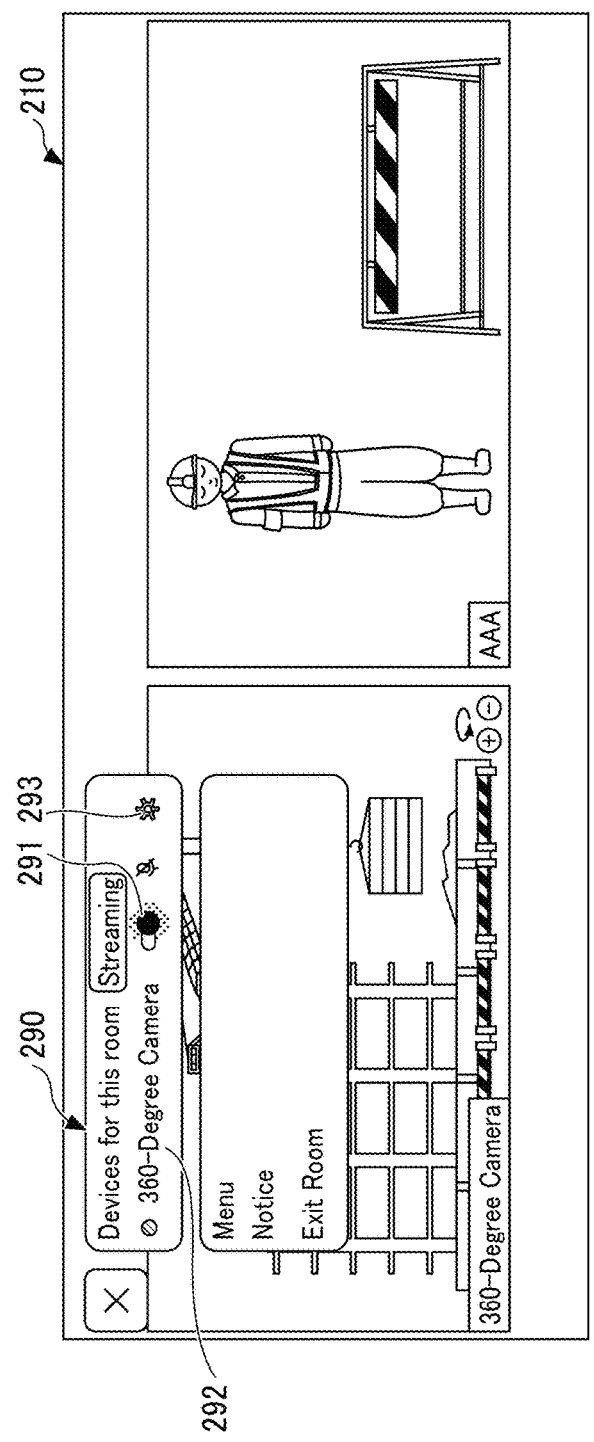

FIGS. 24A and 24B illustrate examples of a wide-view image transmission control dialog 290 displayed on the communication terminal 30A. The wide-view image transmission control dialog 290 is displayed as a pop-up on the image viewing screen 210. In the illustrated example, the user a has operated the communication terminal 30A and entered a virtual room associated with the image capturing apparatus 10. The wide-view image transmission control dialog 290 displays a name 292 of the image capturing apparatus 10 associated with the virtual room. A toggle button 291 is displayed near the name 292. The user a can operate the toggle button 291 to set the transmission of the wide-view image captured by the image capturing apparatus 10 to on (start of transmission) or off (stop of transmission). The setting of on or off using a toggle button is an example. The start or stop of transmission of the wide-view image may be set in accordance with an input of a user operation. In an example, the start or stop of transmission of the wide-view image may be set in response to selection of a radio button or a predetermined icon or in response to a menu operation. In another example, the transmission of the wide-view image is started automatically, without the user's operation, after the image capturing apparatus 10 enters the room. In another example, a predetermined condition such as the date and time, the number of users who have entered the room, or the participation of a specific user is determined in advance, and the transmission of the wide-view image is started in response to a determination that the predetermined condition is satisfied.

Figure 27:
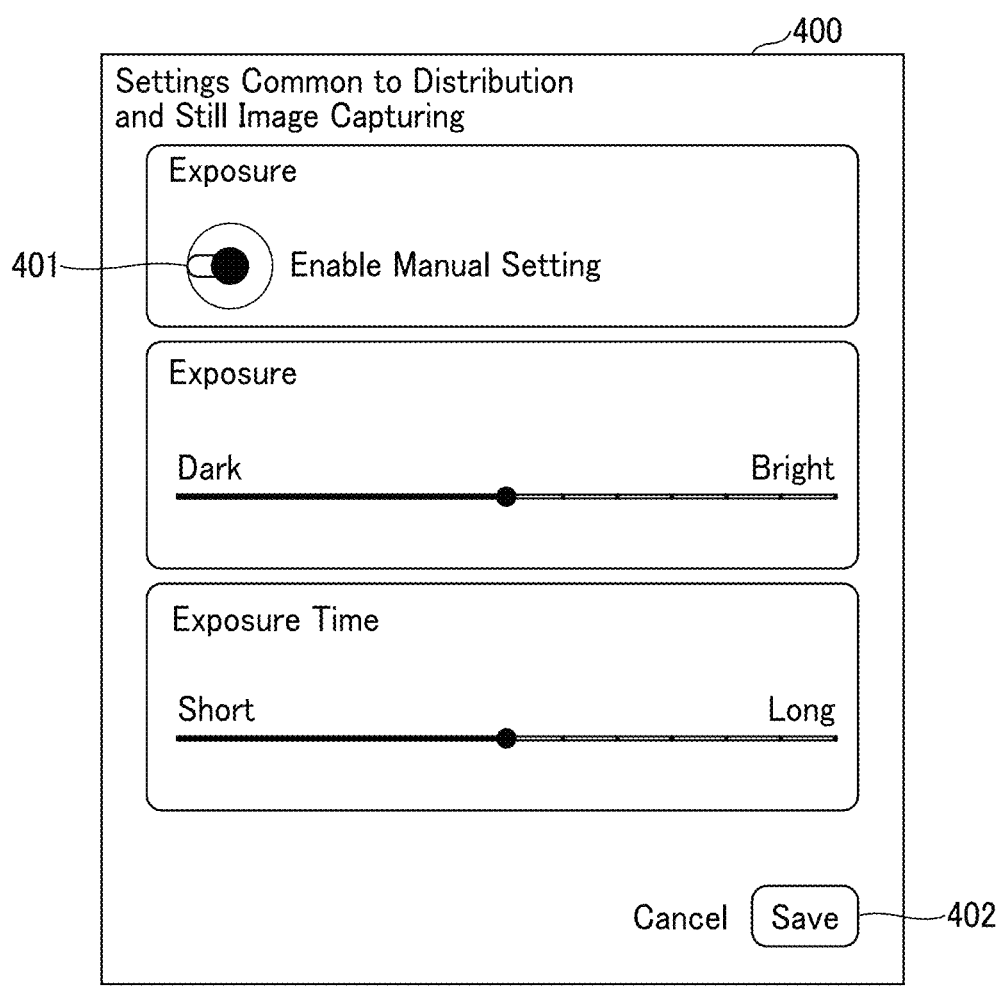
FIG. 27 is a view illustrating an example of an image capturing function setting screen.

The wide-view image transmission control dialog 290 further displays a setting button 293 for setting various image capturing functions of the image capturing apparatus 10. In response to pressing of the setting button 293, an image capturing function setting screen 400 illustrated in FIG. 27 is displayed. FIG. 27 is a view illustrating an example of the image capturing function setting screen 400. The image capturing function setting screen 400 displays a toggle button 401 for switching between a manual setting mode and an automatic setting mode. In the manual setting mode, a user manually performs setting such as adjustment for exposure. In the automatic setting mode, the image capturing apparatus 10 automatically performs setting such as adjustment for exposure.

The automatic setting mode is a mode in which the image capturing parameters are transmitted to the image capturing apparatus 10 from an extraneous source, such as the display terminal or the information processing system in this example, and the image capturing apparatus 10 adjusts exposure and other settings based on the image capturing parameters. The automatic setting mode is a so-called forced automatic setting mode. In the manual setting mode, the image capturing parameters are not transmitted to the image capturing apparatus 10 from the extraneous source. The image capturing apparatus 10 is directly operated by a nearby user or a user makes a setting using a remote control to switch between the automatic setting mode ("auto" mode) and the manual setting mode ("manual" mode). At a time when the communication terminal 30 switches between the automatic setting mode and the manual setting mode, the communication terminal 30 notifies the image capturing apparatus 10 of the automatic setting mode or the manual setting mode via the information processing system 50. The manual setting mode is set by default.

FIG. 27 illustrates an example of adjustment for exposure, for convenience of illustration. Adjustment for white balance, ISO sensitivity, shutter speed, focus, noise reduction, DR correction, or HDR rendering is also available. In response to the user pressing a "Save" button 402 at the bottom right, the settings are stored. In this embodiment, the following description will be given of a case where the automatic setting mode is set.

The communication terminal 30A transmits transmission control setting information, which is set in response to an operation of the toggle button 291, to the information processing system 50. The information processing system 50 transmits a transmission start request or a transmission stop request corresponding to the transmission control setting information to the image capturing apparatus 10.

FIG. 24A illustrates the "off" setting of the toggle button 291. In FIG. 24A, thus, the wide-view image is not displayed. By contrast, the image having a normal angle of view captured by the camera 9 of the communication terminal 30A is displayed in the image viewing screen 210 in FIG. 24A since the image having a normal angle of view has already been shared at the time of entry of the communication terminal 30A into the virtual room.

FIG. 24B illustrates the "on" setting of the toggle button 291. The information processing system 50 transmits a transmission start request to the image capturing apparatus 10 in response to the toggle button 291 being turned on, and the image capturing apparatus 10 starts transmitting the wide-view image. Since two images are shared in one virtual room, the image viewing screen 210 is divided into two areas. Upon the setting being changed from the "on" setting to the "off" setting, the communication terminal 30A transmits "off" setting information to the information processing system 50. The information processing system 50 transmits a transmission stop request to the image capturing apparatus 10 in response to receipt of the "off" setting information, and the image capturing apparatus 10 stops the transmission of the wide-view image.

As described with reference to FIG. 25, a user who is even on site can perform a simple operation such as capturing an image of code information with the image capturing apparatus 10 to associate the image capturing apparatus 10 with the virtual room. In some cases, a user who is on site does not carry a PC or the like. It is useful that such a user who is on site can perform the association process on-site by using the image capturing apparatus 10 and code information issued in advance. In an example, if the user performs the association process in advance, the user can connect the image capturing apparatus 10 to a predetermined virtual room without selecting the virtual room or performing any additional operation. In addition, the user can give an instruction to start or stop transmission from a remote site. This can reduce the burden on the user who desires to concentrate on work on-site. Accordingly, even in a preparation process, it is possible to provide a system that enables efficient communication between on-site and remote users.

Procedure for Registering Image Capturing Apparatus in Virtual Room

Next, a procedure for registering the image capturing apparatus 10 in the virtual room illustrated in the series of screen transitions in FIGS. 18 to 24B will be described with reference to FIG. 25. FIG. 25 is a sequence diagram illustrating an example procedure in which the user a registers the image capturing apparatus 10 in the virtual room.

S11: First, the user a connects the communication terminal 30A to the information processing system 50 and enters authentication information (such as a user ID and a password) to send a login request. The acceptance unit 32 of the communication terminal 30A accepts the operation.

S12: The communication unit 31 of the communication terminal 30A designates the authentication information and transmits the login request to the information processing system 50. The communication unit 51 of the information processing system 50 receives the login request, and the authentication unit 55 performs authentication based on the designated authentication information. It is assumed that the authentication is successful. At this time, the information processing system 50 refers to the tenant information storage unit 5003 to identify the tenant ID associated with the authenticated user ID.

S13: The screen generation unit 52 of the information processing system 50 generates the device registration screen 220 in response to the user operation, and the communication unit 51 transmits screen information of the device registration screen 220 to the communication terminal 30A.

S14: The communication unit 31 of the communication terminal 30A receives the screen information of the device registration screen 220, and the display control unit 33 displays the device registration screen 220 illustrated in FIG. 18. The user a selects the type of the device (in the illustrated example, the image capturing apparatus 10 (e.g., a spherical camera). Then, as illustrated in FIG. 19A, the user a enters the name and description of the image capturing apparatus 10. The acceptance unit 32 accepts the entered information.

S15: The communication unit 31 of the communication terminal 30A designates the name and description entered by the user a and transmits a request for code information (e.g., a two-dimensional code) to the information processing system 50.

S16: The communication unit 51 of the information processing system 50 receives the request for code information (e.g., a two-dimensional code). The communication group management unit 56 generates a URL (connection destination for registration) in association with the name and the description, and generates code information (e.g., a two-dimensional code) including the URL, a temporary ID, and a password. The communication unit 51 of the information processing system 50 transmits the code information (e.g., a two-dimensional code) to the communication terminal 30A. The communication unit 31 of the communication terminal 30A receives the code information (e.g., a two-dimensional code). Then, the display control unit 33 displays the code information (e.g., a two-dimensional code), as illustrated in FIG. 19B.

S17: The user a operates the image capturing apparatus 10 to be associated with the virtual room to capture an image of the code information (e.g., a two-dimensional code). The acceptance unit 12 of the image capturing apparatus 10 accepts the operation.

S18: The imaging processing unit 13 of the image capturing apparatus 10 performs an imaging process on an imaging target including the code information (e.g., a two-dimensional code) to generate image data, and the analysis unit 14 analyzes the image data to extract the URL, the temporary ID, and the password. Accordingly, the registration request unit 15 connects to the URL via the connection unit 16, designates the temporary ID and the password, and transmits a request for registering the image capturing apparatus 10 to the information processing system 50. In the registration method using the registration screen illustrated in FIG. 20, an image of the code information is not captured. Thus, the image capturing apparatus 10 is replaced with a communication terminal such as the VR goggles 89 or the smart glasses 88, and the steps S15 to S17 can be omitted.

S19: The communication unit 51 of the information processing system 50 receives the temporary ID and the password, and the authentication unit 55 determines whether the received temporary ID and password match the temporary ID and password associated with the connected URL. It is assumed that a match is found.

S20: Since a request for registering the image capturing apparatus 10 has been made, the communication group management unit 56 of the information processing system 50 generates an image capturing apparatus ID as an example of a device ID and registers the image capturing apparatus ID in the tenant corresponding to the tenant ID identified at the time of the login of the user a. The image capturing apparatus ID is associated with a name and a description. Specifically, the communication group management unit 56 refers to the tenant information storage unit 5003 and additionally registers the image capturing apparatus ID in the tenant-registered device associated with the identified tenant ID. In the illustrated example, the communication group management unit 56 generates and registers an image capturing apparatus ID. In another example, the communication group management unit 56 registers an image capturing apparatus ID received from the image capturing apparatus 10. In the registration of, instead of the image capturing apparatus 10, a communication terminal such as the VR goggles 89 or the smart glasses 88 in the tenant, a device ID corresponding to the communication terminal can be registered in the tenant information storage unit 5003 in a similar procedure.

S21: The communication unit 51 of the information processing system 50 transmits the image capturing apparatus ID to the image capturing apparatus 10. The connection unit 16 of the image capturing apparatus 10 receives the image capturing apparatus ID and stores the image capturing apparatus ID in the storage unit 1000.

S22: The communication terminal 30A is notified of the completion of the registration by the communication unit 51 of the information processing system 50, and the user a can start associating the image capturing apparatus 10 with the virtual room in response to the notification. The user a selects, from the virtual room association screen 260 displayed on the communication terminal 30A, a virtual room with which the user a desires to associate the image capturing apparatus 10 registered in the tenant. The acceptance unit 32 of the communication terminal 30A accepts an operation input indicating selection. Specifically, in response to the acceptance unit 32 of the communication terminal 30A accepting an operation input from the user a, the display control unit 33 causes the virtual room association screen 260 to be displayed. At this time, the communication unit 31 may transmit a screen update request to the communication unit 51 of the information processing system 50. In response to receipt of the screen update request, the information processing system 50 refers to the tenant information storage unit 5003 and identifies a virtual room ID registered in the tenant associated with the authenticated user ID. The information processing system 50 further refers to the virtual room information storage unit 5002 and acquires the virtual room name associated with the identified virtual room ID. The communication unit 51 of the information processing system 50 transmits information on the identified virtual room ID and a virtual room name corresponding to the identified virtual room ID (or information on a screen generated by the screen generation unit 52 based on such information) to the communication terminal 30A. The communication unit 31 of the communication terminal 30A receives the information on the virtual room ID and the virtual room name. The display control unit 33 can update and display the virtual room association screen 260 in accordance with the received information. Such information, which can be identified based on the user ID, may be received in step S13 after the authentication. The acceptance unit 32 accepts an operation input indicating selection from the user a on the displayed virtual room association screen 260. As a result, the communication terminal 30A can identify the virtual room ID that has been selected.

S23: The user a presses, on the virtual room association screen 270 displayed on the communication terminal 30A, the connection button 272 to additionally associate a device with the virtual room. The acceptance unit 32 of the communication terminal 30A accepts an operation input indicating the pressing of the connection button 272. Specifically, the display control unit 33 of the communication terminal 30A displays the virtual room association screen 270 corresponding to the selected virtual room ID identified in step S22. Further, the acceptance unit 32 accepts, from the user a, an instruction to additionally associate a device with the virtual room (the pressing of the connection button 272).

S24: In response to the operation input in step S23, the communication unit 31 of the communication terminal 30A requests the information processing system 50 to provide information on devices registered in the tenant, which are candidate devices to be associated with the virtual room, and devices that have already been associated with the virtual room ID selected in step S22.

S25: The communication unit 51 of the information processing system 50 receives the request for the information on the devices registered in the tenant and the devices associated with the selected virtual room ID, and the screen generation unit 52 generates the virtual room association screen 280 including the device IDs of the devices registered in the tenant and the devices associated with the selected virtual room ID. The communication unit 51 of the information processing system 50 transmits screen information of the virtual room association screen 280 to the communication terminal 30A.

S26: The communication unit 31 of the communication terminal 30A receives the screen information of the virtual room association screen 280, and the display control unit 33 causes the virtual room association screen 280 to be displayed. The user a selects a device to be associated with the virtual room. In an example, the user a selects the image capturing apparatus 10. The acceptance unit 32 of the communication terminal 30A accepts the selection, and the image capturing apparatus ID is identified as the device ID of the selected device.

S27: The communication unit 31 of the communication terminal 30A designates the virtual room ID selected in step S22 and the device ID (e.g., the image capturing apparatus ID) selected in step S26, and transmits an association request to the information processing system 50.

S28: The communication unit 51 of the information processing system 50 receives the association request, and the communication group management unit 56 registers the device (e.g., the image capturing apparatus 10) in the virtual room. That is, the communication group management unit 56 refers to the virtual room information storage unit 5002 and registers the device ID (e.g., the image capturing apparatus ID) in association with the virtual room ID designated in the request sent in step S27.

S29: Since the device ID (e.g., the image capturing apparatus ID) is associated with the virtual room, the communication unit 51 of the information processing system 50 transmits the virtual room ID, the name, and the description to the image capturing apparatus 10. The information processing system 50 may transmit the virtual room ID, the name, and the description to the image capturing apparatus 10 by using a push notification or by using polling, which is performed by the image capturing apparatus 10. The connection unit 16 of the image capturing apparatus 10 receives the virtual room ID, the name, and the description and stores the virtual room ID, the name, and the description in the storage unit 1000. Accordingly, the image capturing apparatus 10 can add the image capturing apparatus ID, the virtual room ID, the name, the description, and the like to a wide-view image to be transmitted. A device other than the image capturing apparatus 10 can also be associated with the virtual room in a similar procedure. Then, the communication unit 51 of the information processing system 50 may transmit a notification indicating completion of the association to the communication terminal 30A. After step S29, the device (the image capturing apparatus 10) registered in association with the virtual room can connect to the associated virtual room. In the illustrated example, the image capturing apparatus 10 designates the virtual room ID received in step S29 and transmits a virtual room connection request to the information processing system 50, thereby connecting to the virtual room. The timing at which the image capturing apparatus 10 connects to the virtual room can be changed in accordance with an operation performed by the user.

S30: The communication terminal 30A and the information processing system 50 perform the room entry process illustrated in FIG. 17 to allow the communication terminal 30A to enter the virtual room associated with the device (the image capturing apparatus 10). S31: After entry into the virtual room, the user a turns on the toggle button 291, on the image viewing screen 210, for the image capturing apparatus 10 associated with the virtual room. The acceptance unit 32 of the communication terminal 30A accepts the turn-on operation.

S32: The communication unit 31 of the communication terminal 30A designates the device ID (image capturing apparatus ID) and transmits, to the information processing system 50, a request for starting transmission of the wide-view image. The user a may directly operate a button of the image capturing apparatus 10 to start transmitting the wide-view image. In response to an operation performed by the user a, the communication unit 31 of the communication terminal 30A may transmit a transmission stop request to the information processing system 50.

S33: The communication unit 51 of the information processing system 50 receives the transmission start request and requests the image capturing apparatus 10 identified by the device ID (image capturing apparatus ID) to start transmission. The information processing system 50 may use a push notification or use polling, which is performed by the image capturing apparatus 10. The connection unit 16 of the image capturing apparatus 10 receives the transmission start request, and the imaging processing unit 13 starts capturing a wide-view image. The image transmission control unit 18 repeatedly transmits the wide-view image with a determined FPS or an FPS corresponding to a band via the connection unit 16. As a result, the communication terminal 30 that has entered the virtual room can display the state of the site A on the image viewing screen 210 in real time.

Distribution of Wide-View Image and Others

A process for sharing a wide-view image or an image having a normal angle of view will be described with reference to FIG. 26. FIG. 26 is a sequence diagram illustrating an example process for sharing a wide-view image. In FIG. 26, the communication terminals 30A and 30B have entered the virtual room by executing the room entry process described with reference to FIG. 17. The communication terminal 30A includes the camera 9 having a normal angle of view, and an image captured by the camera 9 is shared with the communication terminal 30B. An image captured by the smart glasses 88 associated with the virtual room, instead of the camera 9 of the communication terminal 30A, may be shared. In FIG. 26, the image capturing apparatus 10 has already been connected to the same virtual room in accordance with the registration procedure illustrated in FIG. 25.

S41: The imaging unit 34 of the communication terminal 30A captures an image, and the communication unit 31 designates the virtual room ID of the virtual room that the communication unit 31 is in and transmits video including the captured image and audio to the information processing system 50.

S42 and S43: In response to the communication unit 51 of the information processing system 50 receiving the video including the image and the audio, the image distribution control unit 54 acquires the IP addresses of the communication terminals 30A and 30B, which are in the same virtual room, from the virtual room information storage unit 5002, and transmits the video including the image and the audio via the communication unit 51. In FIG. 26, an image having a normal angle of view is received by the communication unit 31 of the communication terminal 30A from the information processing system 50 and is displayed. In another example, an image having a normal angle of view is not received from the information processing system 50, but an image having a normal angle of view is captured by the imaging unit 34 and is displayed.

S44: In response to a transmission start request based on the settings for starting transmission, the imaging processing unit 13 of the image capturing apparatus 10 captures a wide-view image, and the image transmission control unit 18 designates the virtual room ID of the virtual room in which the image capturing apparatus 10 is registered, the image capturing apparatus ID, and the name and the description of the image capturing apparatus 10 and transmits video including the wide-view image and audio to the information processing system 50 via the connection unit 16.

S45 and S46: In response to the communication unit 51 of the information processing system 50 receiving the video including the wide-view image and the audio, the image distribution control unit 54 acquires the IP addresses of the communication terminals 30A and 30B, which are in the same virtual room, from the virtual room information storage unit 5002, and transmits the video including the wide-view image and the audio via the communication unit 51.

S47: The communication terminal 30C including the camera 9 executes the room entry process illustrated in FIG. 17 and newly enters the virtual room.

S48: The communication unit 31 of the communication terminal 30C transmits video including an image having a normal angle of view and audio to the information processing system 50.

S49 to S51: The communication unit 51 of the information processing system 50 receives the video including the image having a normal angle of view and the audio from the communication terminal 30C, and the image distribution control unit 54 acquires the IP addresses of the communication terminals 30A to 30C, which are in the same virtual room, from the virtual room information storage unit 5002, and transmits the video including the image having a normal angle of view and the audio.

S52: The communication unit 51 of the information processing system 50 also transmits the video including the wide-view image and the audio to the communication terminal 30C, which is in the same virtual room.

As described above, the users a and b, who are in the same virtual room, can share, in real time, the video including the wide-view image captured by the image capturing apparatus 10 associated with the virtual room. The order of transmission of the images illustrated in FIG. 26 is an example. In another example, the wide-view image may be shared first, or the image having a normal angle of view may be shared first.

A supplementary description will now be given of the smart glasses 88 and the VR goggles 89. The smart glasses 88 have a camera having a normal angle of view and a display function. The camera of the smart glasses 88 captures an image having a normal angle of view, and the captured image having a normal angle of view is distributed in a manner similar to that for the cameras 8 and 9. The display function of the smart glasses 88 is implemented by a flat screen, like that of an ordinary display. Thus, part of the wide-view image is displayed from a point of view designated by the user. The VR goggles 89 have a display function. In an example, the VR goggles 89 may also include a camera having a normal angle of view. The display function of the VR goggles 89 projects a wide-view image with a point of view determined by the orientation of the head of the user wearing the VR goggles 89. Thus, the predetermined-area image Q of the predetermined area T in the wide-view image is displayed from a point of view corresponding to the orientation of the head of the user. While viewing a wide-view image with the smart glasses 88 or the VR goggles 89, the user can transmit, to the information processing system 50, an image capturing request that designates point-of-view information of the wide-view image being viewed.

Process for Automatically Adjusting Image Capturing Function

Figure 29A:
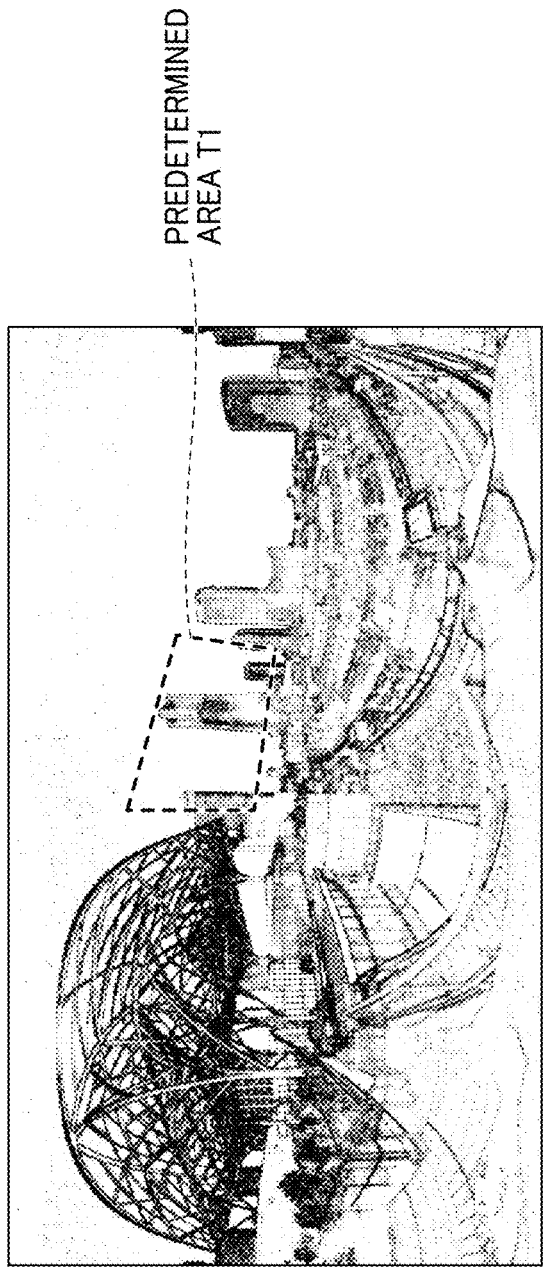
FIG. 29A is a view illustrating a wide-view image (spherical image) according to an embodiment of the present disclosure.
Figure 29C:
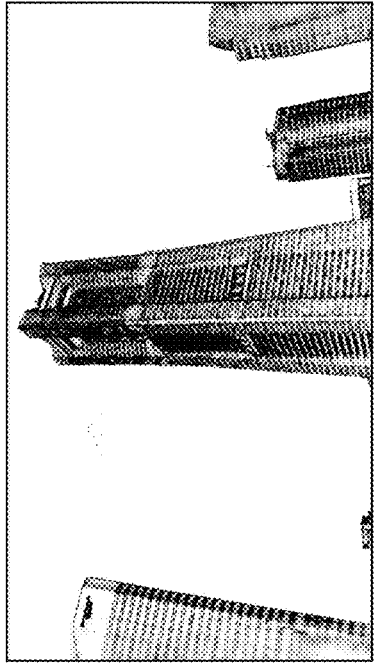
FIG. 29C is a view illustrating a predetermined-area image obtained after the image capturing function is adjusted according to an embodiment of the present disclosure.
Figure 29B:
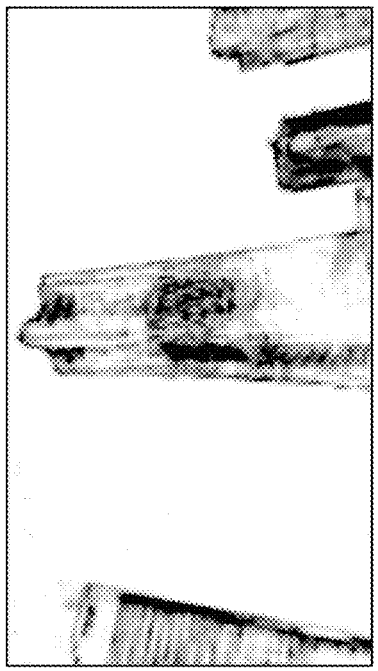
FIG. 29B is a view illustrating a predetermined-area image of a predetermined area in the wide-view image illustrated in FIG. 29A according to an embodiment of the present disclosure.

Next, a process for automatically adjusting the image capturing function will be described with reference to FIGS. 28 to 30. The process illustrated in FIGS. 28 to 30 is performed when the automatic setting mode is set in FIG. 27. FIG. 28 is a sequence diagram illustrating a first process for adjusting the image capturing function. FIG. 29A is a view illustrating a wide-view image (spherical image). FIG. 29B is a view illustrating a predetermined-area image of a predetermined area T1. FIG. 29C is a view illustrating a predetermined-area image obtained after the image capturing function is adjusted.

First Process for Adjusting Image Capturing Function

S201: A user performs a screen operation to move the virtual point of view while a predetermined-area image is displayed on the display 306 of the communication terminal 30 of the user. The predetermined-area image is a predetermined area in a wide-view image distributed from the image capturing apparatus 10 via the information processing system 50. The acceptance unit 32 accepts the movement of the point of view. The display control unit 33 causes the display 306 to display, for example, a predetermined-area image illustrated in FIG. 29B. The predetermined-area image is an image of the predetermined area T1 in the wide-view image illustrated in FIG. 29A. The predetermined-area image illustrated in FIG. 29B is blurred, and the quality thereof is not adequate.

S202: The parameter generation unit 41 of the communication terminal 30 determines whether the quality of the predetermined-area image being displayed on the display 306 is adequate, and generates the image capturing parameters described above for making the quality of the predetermined-area image adequate if the quality of the predetermined-area image is not adequate. The case where the quality of the predetermined-area image is not adequate will be described.

S203: The communication unit 31 of the communication terminal 30 transmits, to the information processing system 50, a request for adjusting the image capturing function of the image capturing apparatus 10. The request includes the image capturing parameters generated in step S202. Then, the communication unit 51 of the information processing system 50 receives the request for adjusting the image capturing function.

S204: The communication unit 51 of the information processing system 50 refers to the image management information stored in the image management information storage unit 5001 and transfers the request for adjusting the image capturing function to the image capturing apparatus 10 located in the virtual room in which the communication terminal 30 from which the request is received is also located. Then, the image capturing apparatus 10 receives the image capturing parameters and the request for adjusting the image capturing function.

S205: The adjustment unit 21 of the image capturing apparatus 10 uses the image capturing parameters received in step S204 to adjust the quality of the wide-view image that has been captured and is currently being transmitted to the information processing system 50. In this case, the adjustment unit 21 notifies the imaging controller 105 of the content of the adjustment. The adjustment unit 21 performs adjustment to make the quality of the predetermined-area image adequate. More specifically, the adjustment unit 21 performs adjustment on the entire wide-view image, not on the predetermined area in the wide-view image to be transmitted. Since the adjustment unit 21 performs adjustment on the wide-view image to make the quality of the predetermined-area image adequate, the image quality of an area other than the predetermined area in the wide-view image may degrade.

Accordingly, the wide-view image transmitted from the image capturing apparatus 10 after the adjustment of the quality of the wide-view image is distributed to the communication terminal 30 via the information processing system 50. In the communication terminal 30, the display control unit 33 can cause the display 306 to display a predetermined-area image whose quality is adequate, as illustrated in FIG. 29C.

Second Process for Adjusting Image Capturing Function

Next, a second process for adjusting the image capturing function, which is a modification of the process illustrated in FIG. 28, will be described with reference to FIG. 30.

S301: As in step S201 described above, a user performs a screen operation to move the virtual point of view while a predetermined-area image is displayed on the display 306 of the communication terminal 30 of the user. The predetermined-area image is a predetermined area in a wide-view image distributed from the image capturing apparatus 10 via the information processing system 50. The acceptance unit 32 accepts the movement of the point of view. The display control unit 33 causes the display 306 to display, for example, a predetermined-area image illustrated in FIG. 29B. The predetermined-area image is an image of the predetermined area T1 in the wide-view image illustrated in FIG. 29A. The predetermined-area image illustrated in FIG. 29B is blurred, and the quality thereof is not adequate.

S302: The communication unit 31 of the communication terminal 30 transmits, to the information processing system 50, point-of-view information for identifying a predetermined area that is a currently displayed predetermined-area image. In this case, the point-of-view information is displayed, regardless of whether the quality of the currently displayed predetermined-area image is adequate. Then, the communication unit 51 of the information processing system 50 receives the point-of-view information.

S303: In the information processing system 50, the parameter generation unit 61 determines whether the quality of the predetermined-area image indicated by the point-of-view information received in step S302 is adequate in the currently distributed wide-view image, and generates image capturing parameters for making the quality of the predetermined-area image adequate if the quality of the predetermined-area image is not adequate.

S304 and S305: The processing of steps S304 and S305 is similar to that of steps S204 and S205 described above, and the description thereof will thus be omitted.

Accordingly, the wide-view image transmitted from the image capturing apparatus 10 after the adjustment of the quality of the wide-view image is distributed to the communication terminal 30 via the information processing system 50. In the communication terminal 30, the display control unit 33 can cause the display 306 to display a predetermined-area image whose quality is adequate, as illustrated in FIG. 29C.

Application Example of Communication System in Telemedicine

Figure 31:
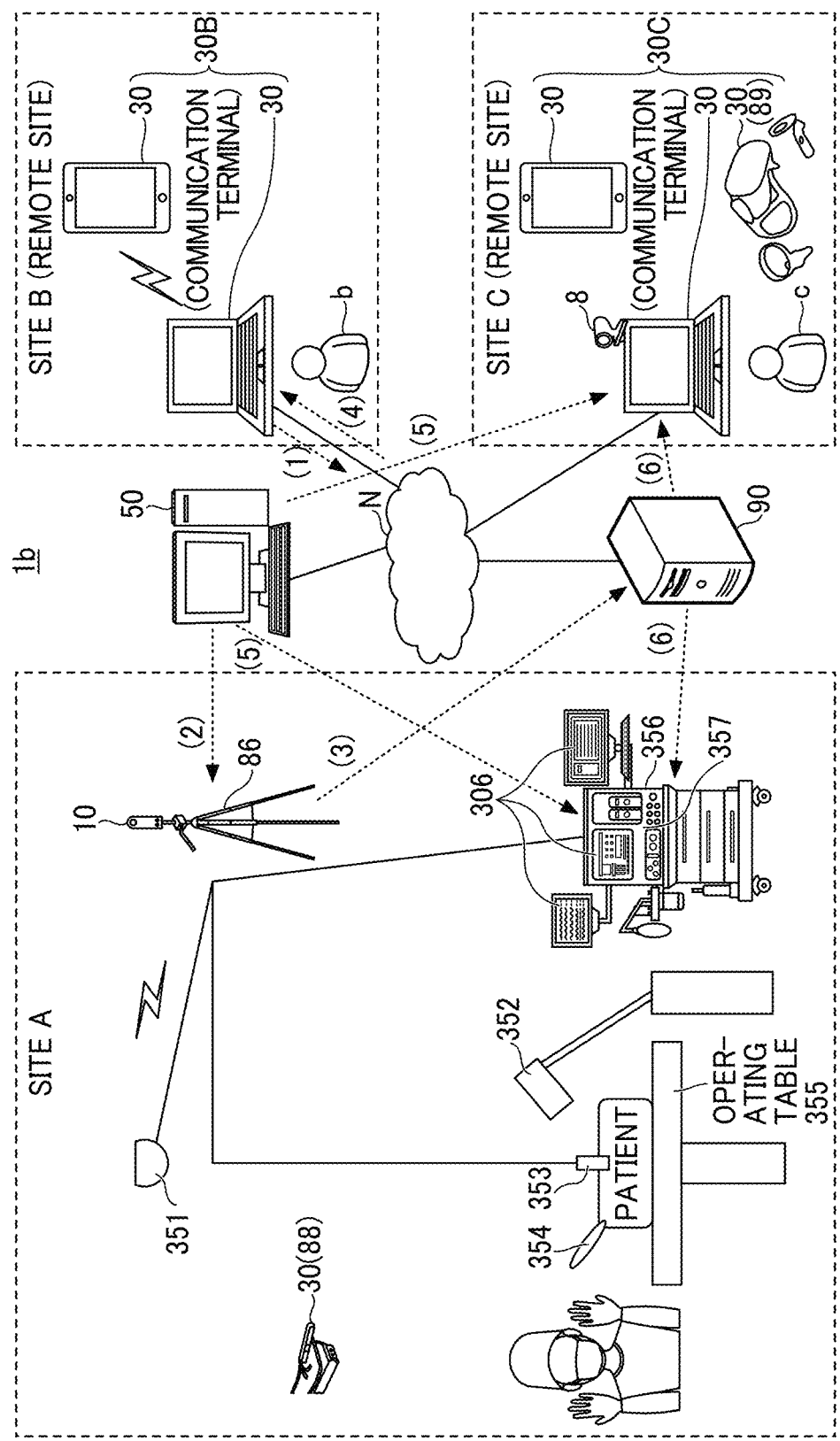
FIG. 31 is a diagram illustrating an example of remote communication in which the communication system is used in telemedicine.
Figure 32:
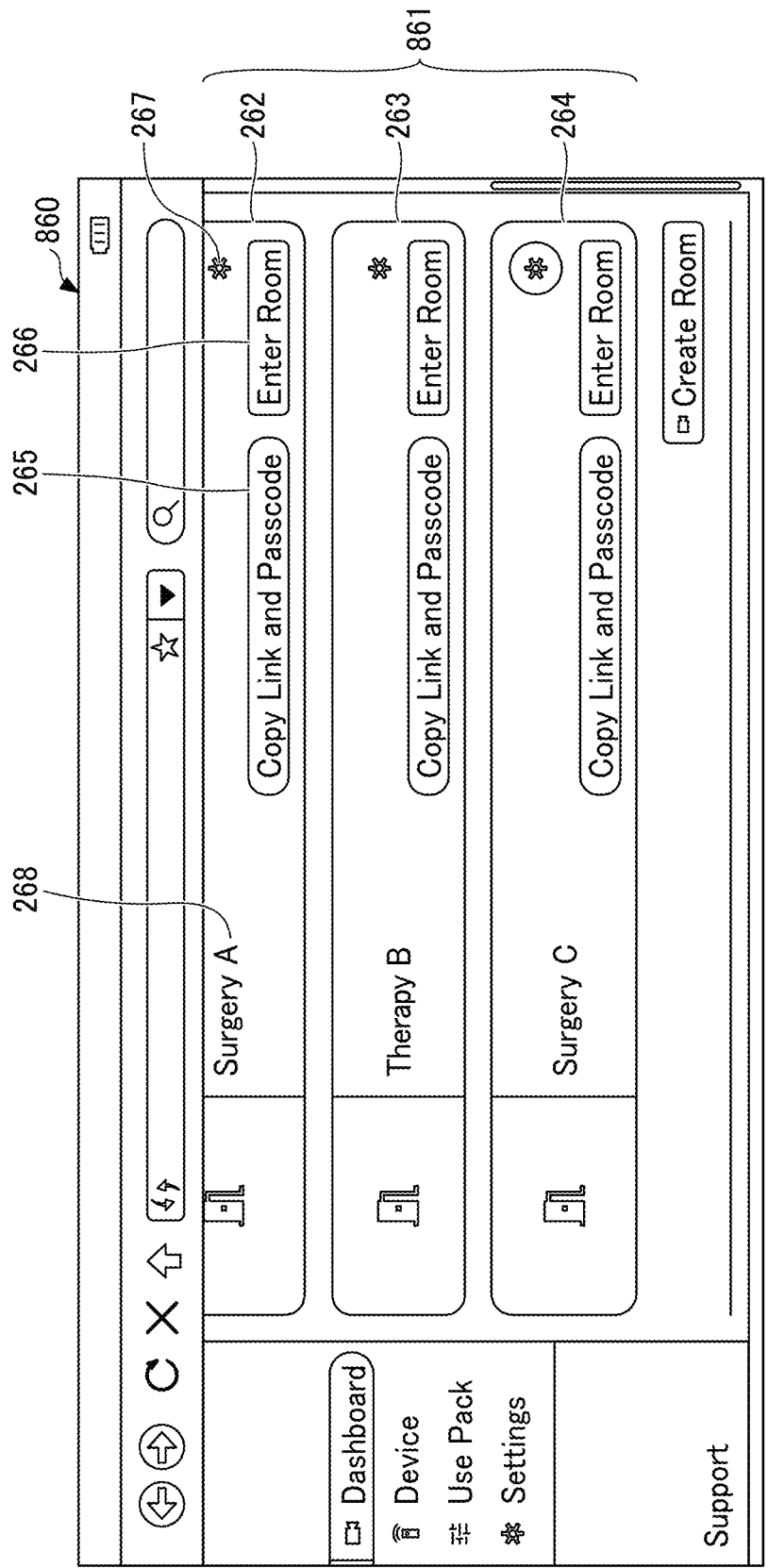
FIG. 32 is a view illustrating an example of a virtual room association screen for associating an image capturing apparatus with a virtual room for telemedicine.

FIG. 31 is a diagram illustrating an example of remote communication in which a communication system according to an embodiment of the present disclosure is used in telemedicine. FIG. 32 is a view illustrating an example of a virtual room association screen for associating an image capturing apparatus with a virtual room for telemedicine.

A communication system 1b according to an embodiment of the present disclosure will be described with reference to FIG. 31, with focus on differences from FIG. 1. In FIG. 31, the site A is an operating room. The processing steps (1) to (6) in FIG. 31 are similar to those in FIG. 1. In FIG. 31, a patient is placed on an operating table 355 and is subjected to surgery by a medical professional such as a surgeon. The medical professional (corresponding to the user) operates on the patient with various surgical tools 354 such as forceps and a scalpel. The medical professional may wear the smart glasses 88 and transmit an image of the surgical field for surgery performed by the medical professional to the communication network N. Various cameras are placed in the operating room. Examples of the cameras include a surgical camera 351, a surgical field camera 352, and an endoscope 353. All of the cameras in the operating room and the smart glasses 88 are associated with a virtual room.

A main unit 356 is installed in the operating room. The main unit 356 monitors the vitals of a patient, the operating state of medical devices, and the like. The main unit 356 corresponds to the communication terminal 30 according to this embodiment. The communication terminal 30 (i.e., the main unit 356) in the operating room may have a function of receiving video from the endoscope 353 or the surgical field camera 352 in addition to the functions illustrated in FIG. 1. The communication terminal 30 can display the received video on displays 306 and transmit the video to the information processing system 50 as the video of the site at which the communication terminal 30 is located. An operation panel 357 is an input interface that accepts various operations. In an example, a medical professional can operate a device in the operating room via the operation panel 357. The endoscope 353, the surgical camera 351, and the surgical field camera 352 may communicate with the information processing system 50 directly without the intervention of the communication terminal 30.

The communication terminal 30 may have the function of an electronic medical record system or the function of communicating with an electronic medical record system. The communication terminal 30 may display information on an electronic medical record on the display 306.

FIG. 32 is a view illustrating an example of a virtual room association screen 860 for associating an image capturing apparatus with a virtual room for telemedicine. In the description of FIG. 32, differences from FIG. 21 will mainly be described.

In telemedicine, in an example, the virtual room association screen 860 displays a list of virtual rooms 861 associated with remote surgery or medical therapy. The site A is associated with a medical camera including the image capturing apparatus 10, which is a spherical camera. Examples of the medical camera include an endoscope, a surgical field camera for use in capturing a surgical field image in an operating room, and a camera that captures a microscopic image.

As described above, in one or more embodiments, when displaying a predetermined-area image that is a predetermined area in a wide-view image, a communication system identifies a predetermined area by using point-of-view information to make the quality of the predetermined-area image adequate as much as possible.

The above-described embodiments are illustrative and do not limit the present disclosure. Thus, numerous additional modifications and variations are possible in light of the above teachings. For example, elements and/or features of different illustrative embodiments may be combined with each other and/or substituted for each other within the scope of the present disclosure. Any one of the above-described operations may be performed in various other ways, for example, in an order different from the one described above.

In the example configurations illustrated in FIG. 13 and the like, the information processing system 50, the image capturing apparatus 10, and the communication terminal 30 are each divided according to main functions to facilitate understanding of the processes performed by the information processing system 50, the image capturing apparatus 10, and the communication terminal 30. No limitation is intended by how the functions are divided by process or by the name of the functions. The processing of the information processing system 50, the image capturing apparatus 10, and the communication terminal 30 may be divided into more units of processing in accordance with the content of the processing. Further, the division may be made such that each unit of processing includes more processing operations.

Any one of the above-described operations may be performed in various other ways, for example, in an order different from the one described above.

Each of the functions of the described embodiments may be implemented by one or more processing circuits or circuitry. As used herein, the term "processing circuit or circuitry" includes a processor programmed to implement each function by software, such as a processor implemented by an electronic circuit, and devices designed to implement the functions described above, such as an application specific integrated circuit (ASIC), a digital signal processor (DSP), a field programmable gate array (FPGA), and existing circuit modules.

The apparatuses or devices described in one or more embodiments are just one example of plural computing environments that implement the one or more embodiments disclosed herein. In some embodiments, the information processing system 50 includes multiple computing devices, such as a server cluster. The multiple computing devices are configured to communicate with one another through any type of communication link, including a network, a shared memory, etc., and perform processes disclosed herein.

Figure 25:
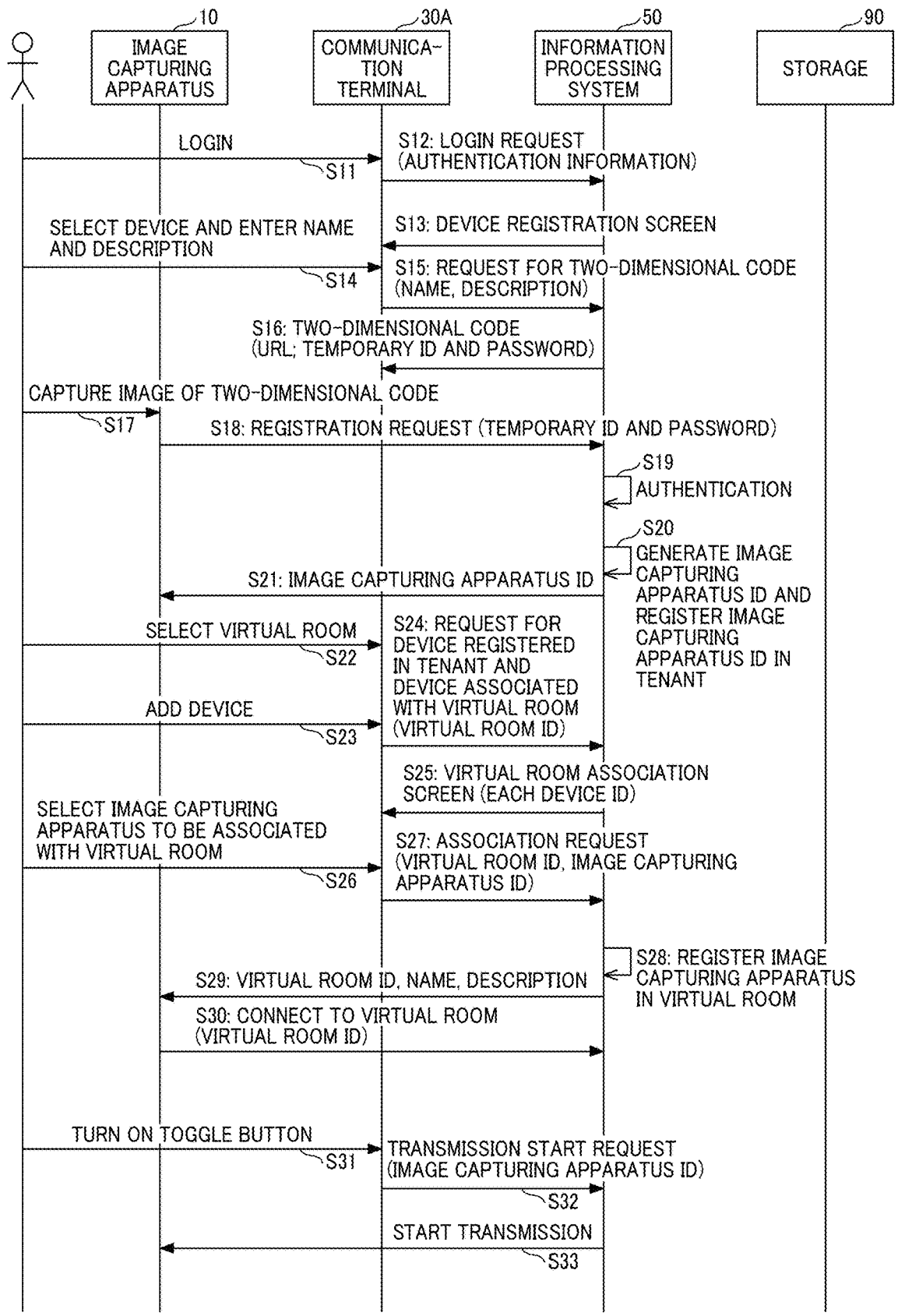
FIG. 25 is a sequence diagram illustrating an example procedure in which the user registers the image capturing apparatus in a virtual room.
Figure 26:
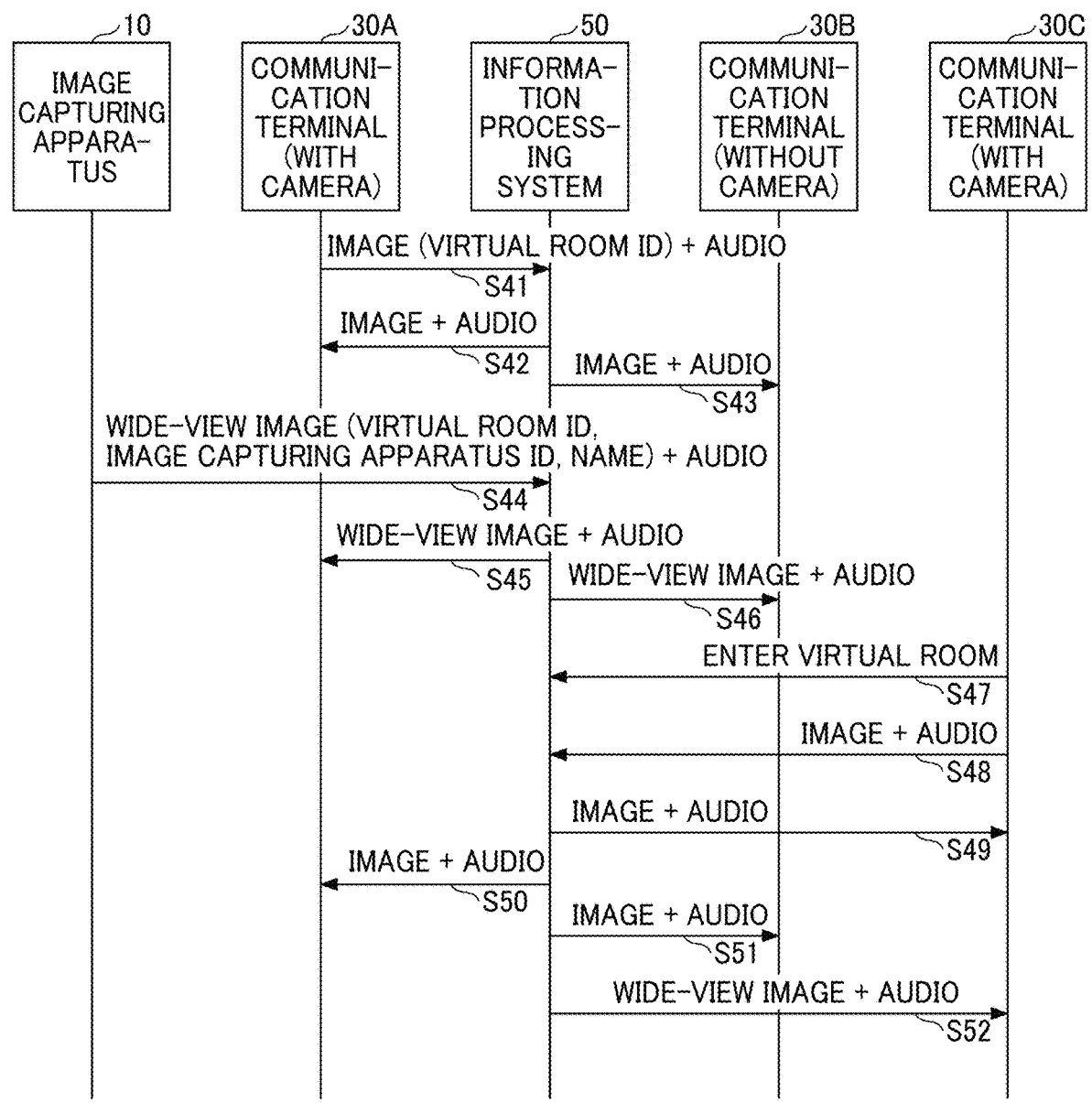
FIG. 26 is a sequence diagram illustrating an example process for sharing a wide-view image.

Further, the information processing system 50 can be configured to share the processing steps disclosed herein, for example, the processing steps illustrated in FIGS. 25 and 26 and so on in various combinations. For example, a process executed by a predetermined unit may be executed by a plurality of information processing apparatuses included in the information processing system 50. The components of the information processing system 50 may be integrated into one server apparatus or divided into a plurality of apparatuses.

According to Aspect 1, a display terminal is provided. The display terminal acquires a wide-view image captured by an image capturing apparatus and having a viewing angle in a wide range, and displays a predetermined-area image representing a predetermined area of the wide-view image. The display terminal includes: a display control unit that causes a display to display the predetermined-area image; and a parameter transmitting unit that transmits an image capturing parameter for making quality of the predetermined-area image being displayed on the display adequate, such that the image capturing parameter is receivable by the image capturing apparatus.

According to Aspect 2, in the display terminal according to aspect 1, the image capturing parameter includes a parameter for adjustment for exposure, white balance, International Standards Organization (ISO) sensitivity, shutter speed, focus, noise reduction, dynamic range (DR) correction, or high dynamic range (HDR) rendering of the image capturing apparatus.

According to Aspect 3, the display terminal according to aspect 1 or 2, further includes: a parameter generation unit that determines whether the quality of the predetermined-area image being displayed on the display is adequate and generates the image capturing parameter based on a determination that the quality of the predetermined-area image being displayed on the display is not adequate. The parameter transmitting unit transmits the generated image capturing parameter.

According to Aspect 4, a display method is performed by a display terminal that acquires a wide-view image captured by an image capturing apparatus and having a viewing angle in a wide range, and displays a predetermined-area image representing a predetermined area of the wide-view image. The display method includes, by the display terminal: causing a display to display the predetermined-area image; and transmitting an image capturing parameter for making quality of the predetermined-area image being displayed on the display adequate, such that the image capturing parameter is receivable by the image capturing apparatus.

According to Aspect 5, a non-transitory recording medium storing a plurality of instructions which, when executed by one or more processors, causes the processors to perform a display method with a display terminal is provided. The display terminal acquires a wide-view image captured by an image capturing apparatus and having a viewing angle in a wide range, and displays a predetermined-area image representing a predetermined area of the wide-view image. The display method includes, by the display terminal: causing a display to display the predetermined-area image; and transmitting an image capturing parameter for making quality of the predetermined-area image being displayed on the display adequate, such that the image capturing parameter is receivable by the image capturing apparatus.

According to Aspect 6, an image capturing apparatus is provided, which captures a wide-view image having a viewing angle in a wide range and transmits the captured wide-view image. The image capturing apparatus includes: an information receiving unit that receives an image capturing parameter transmitted from a display terminal that displays a predetermined-area image on a display, the predetermined-area image indicating a predetermined area of the transmitted wide-view image, the image capturing parameter being for making quality of the predetermined-area image being displayed on the display adequate; an adjustment unit that adjusts quality of the wide-view image by using the image capturing parameter; and an image transmitting unit that transmits the wide-view image whose quality is adjusted by the adjustment unit.

According to Aspect 7, in the image capturing apparatus according to aspect 6, the image capturing parameter includes a parameter for adjustment for exposure, white balance, International Standards Organization (ISO) sensitivity, shutter speed, focus, noise reduction, dynamic range (DR) correction, or high dynamic range (HDR) rendering, of the image capturing apparatus.

According to Aspect 8, in the image capturing apparatus according to aspect 6 or 7, the wide-view image includes a spherical image in equirectangular projection format, an omnidirectional image, a hemispherical image, a three-dimensional panoramic image, a two-dimensional panoramic image, or a virtual reality (VR) image.

According to Aspect 9, an image capturing method performed by an image capturing apparatus is provided. The image capturing apparatus captures a wide-view image having a viewing angle in a wide range and transmits the captured wide-view image. The image capturing method includes, by the image capturing apparatus: receiving an image capturing parameter transmitted from a display terminal that displays a predetermined-area image on a display, the predetermined-area image representing a predetermined area of the transmitted wide-view image, the image capturing parameter being for making quality of the predetermined-area image being displayed on the display adequate; adjusting quality of the wide-view image by using the image capturing parameter; and transmitting the wide-view image whose quality is adjusted.

According to Aspect 10, a non-transitory recording medium is provided, which stores a plurality of instructions which, when executed by one or more processors, causes the processors to perform an image capturing method with an image capturing apparatus. The image capturing apparatus captures a wide-view image having a viewing angle in a wide range and transmits the captured wide-view image. The image capturing method includes, by the image capturing apparatus: receiving an image capturing parameter transmitted from a display terminal that displays a predetermined-area image on a display, the predetermined-area image representing a predetermined area in the transmitted wide-view image, the image capturing parameter being for making quality of the predetermined-area image being displayed on the display adequate; adjusting quality of the wide-view image by using the image capturing parameter; and transmitting the wide-view image whose quality is adjusted.

According to Aspect 11, a communication system includes: an image capturing apparatus that captures a wide-view image having a viewing angle in a wide range and transmits the captured wide-view image; and a display terminal that acquires the wide-view image transmitted from the image capturing apparatus and displays a predetermined-area image representing a predetermined area of the wide-view image. The display terminal includes: a display control unit that causes a display to display the predetermined-area image; and a parameter transmitting unit that transmits an image capturing parameter for making quality of the predetermined-area image being displayed on the display adequate, such that the image capturing parameter is receivable by the image capturing apparatus. The image capturing apparatus includes: an adjustment unit that adjusts quality of the wide-view image by using the received image capturing parameter; and an image transmitting unit that transmits the wide-view image whose quality is adjusted by the adjustment unit.

According to Aspect 12, in the communication system according to aspect 11, wherein the image capturing parameter includes a parameter for adjustment for exposure, white balance, International Standards Organization (ISO) sensitivity, shutter speed, focus, noise reduction, dynamic range (DR) correction, or high dynamic range (HDR) rendering of, the image capturing apparatus.

According to Aspect 13, in the communication system according to aspect 11 or 12, the display terminal further includes a parameter generation unit that determines whether the quality of the predetermined-area image being displayed on the display is adequate and generates the image capturing parameter based on a determination that the quality of the predetermined-area image being displayed on the display is not adequate, and the parameter transmitting unit that transmits the generated image capturing parameter.

According to Aspect 14, the communication system according to aspect 11 or 12, further includes: an information processing system (may be referred to as the information processing server) that relays communication between the image capturing apparatus and the display terminal.

According to Aspect 15, a communication method performed by a communication system is provided. The communication system includes: an image capturing apparatus that captures a wide-view image having a viewing angle in a wide range and transmits the captured wide-view image; and a display terminal that acquires the wide-view image transmitted from the image capturing apparatus and displays a predetermined-area image representing a predetermined area of the wide-view image. The communication method includes: causing, by the display terminal, a display to display the predetermined-area image; transmitting, by the display terminal, an image capturing parameter for making quality of the predetermined-area image being displayed on the display adequate, such that the image capturing parameter is receivable by the image capturing apparatus; receiving, by the image capturing apparatus, the image capturing parameter; adjusting, by the image capturing apparatus, quality of the wide-view image by using the image capturing parameter; and transmitting, by the image capturing apparatus, the wide-view image whose quality is adjusted.

According to Aspect 16, an information processing system receives a wide-view image captured by an image capturing apparatus and having a viewing angle in a wide range, and distributes the wide-view image to a display terminal. The information processing system includes: an information receiving unit that receives point-of-view information transmitted from the display terminal, the point-of-view information indicating a predetermined area of the wide-view image being displayed on a display; and a parameter transmitting unit that transmits, to the image capturing apparatus, an image capturing parameter for making quality of the predetermined-area image adequate, representing the predetermined area of the wide-view image indicated by the point-of-view information.

According to Aspect 17, the information processing system according to aspect 16, further includes: a parameter generation unit that determines whether the quality of the predetermined-area image represented by the predetermined area of the wide-view image, indicated by the point-of-view information, is adequate, and generates the image capturing parameter based on a determination that the quality of the predetermined-area image is not adequate. The parameter transmitting unit transmits the generated image capturing parameter.

According to Aspect 18, an information processing method performed by an information processing system is provided. The information processing system receives a wide-view image captured by an image capturing apparatus and having a viewing angle in a wide range, and distributes the wide-view image to a display terminal. The information processing method includes, by the information processing system: receiving point-of-view information transmitted from the display terminal, the point-of-view information indicating a predetermined area of the wide-view image being displayed on a display; and transmitting, to the image capturing apparatus, an image capturing parameter for making quality of the predetermined-area image adequate, represented by the predetermined area of the wide-view image, indicated by the point-of-view information.

According to Aspect 19, a non-transitory recording medium is provided, which stores a plurality of instructions which, when executed by one or more processors, causes the processors to perform an information processing method with an information processing system. The information processing system receives a wide-view image captured by an image capturing apparatus and having a viewing angle in a wide range, and distributes the wide-view image to a display terminal. The information processing method includes, by the information processing system: receiving point-of-view information transmitted from the display terminal, the point-of-view information indicating a predetermined area of the wide-view image being displayed on a display; and transmitting, to the image capturing apparatus, an image capturing parameter for making quality of the predetermined-area image represented by the predetermined area of the wide-view image adequate, indicated by the point-of-view information.

According to Aspect 20, an image capturing apparatus captures a wide-view image having a viewing angle in a wide range and transmits the captured wide-view image, includes: an information receiving unit that receives an image capturing parameter transmitted from an information processing system. The image capturing parameter is for making quality of a predetermined-area image adequate, represented by a predetermined area of the wide-view image indicated by point-of-view information, based on the point-of-view information that is transmitted from a display terminal that displays the predetermined-area image on a display. The predetermined-area image represents the predetermined area of the wide-view image. The point-of-view information indicates the predetermined area of the wide-view image, which is displayed as the predetermined-area image on the display. The image capturing apparatus further includes: an adjustment unit that adjusts quality of the wide-view image by using the image capturing parameter; and an image transmitting unit that transmits the wide-view image whose quality is adjusted by the adjustment unit.

According to Aspect 21, an image capturing method performed by an image capturing apparatus that captures a wide-view image having a viewing angle in a wide range and transmits the captured wide-view image, is provided. The image capturing method includes, by the image capturing apparatus: receiving an image capturing parameter transmitted from an information processing system, the image capturing parameter being for making quality of a predetermined-area image representing a predetermined area of the wide-view image adequate, indicated by point-of-view information, based on the point-of-view information that is transmitted from a display terminal that displays the predetermined-area image on a display. The predetermined-area image represents the predetermined area of the wide-view image. The point-of-view information indicates the predetermined area of the wide-view image, which is the predetermined-area image being displayed on the display. The image capturing method further includes: adjusting quality of the wide-view image by using the image capturing parameter; and transmitting the wide-view image whose quality is adjusted.

According to Aspect 22, a non-transitory recording medium stores a plurality of instructions which, when executed by one or more processors, causes the processors to perform an image capturing method with an image capturing apparatus. The image capturing apparatus captures a wide-view image having a viewing angle in a wide range and transmits the captured wide-view image. The image capturing method includes, by the image capturing apparatus: receiving an image capturing parameter transmitted from an information processing system, the image capturing parameter being for making quality of a predetermined-area image representing a predetermined area of the wide-view image adequate, indicated by point-of-view information, based on the point-of-view information that is transmitted from a display terminal that displays the predetermined-area image on a display. The predetermined-area image represents the predetermined area of the wide-view image. The point-of-view information indicates the predetermined area of the wide-view image, which is the predetermined-area image being displayed on the display. The image capturing method further includes: adjusting quality of the wide-view image by using the image capturing parameter; and transmitting the wide-view image whose quality is adjusted.

According to Aspect 23, a communication system includes: an image capturing apparatus that captures a wide-view image having a viewing angle in a wide range and transmits the captured wide-view image; an information processing system that receives the wide-view image transmitted from the image capturing apparatus and distributes the wide-view image to a display terminal; and the display terminal that displays a predetermined-area image representing a predetermined area of the wide-view image distributed by the information processing system. The display terminal includes: a display control unit that causes a display to display the predetermined-area image; and an information transmitting unit that transmits, to the information processing system, point-of-view information for indicating the predetermined area of the wide-view image, represented by the predetermined-area image being displayed on the display. The information processing system includes: a parameter transmitting unit that transmits, to the image capturing apparatus, an image capturing parameter for making quality of the predetermined-area image representing the predetermined area of the wide-view image adequate, the predetermined area being indicated by the point-of-view information. The image capturing apparatus includes: an adjustment unit that adjusts quality of the wide-view image by using the received image capturing parameter; and an image transmitting unit that transmits, to the information processing system, the wide-view image whose quality is adjusted by the adjustment unit.

According to Aspect 24, a communication method performed by a communication system is provided. The communication system includes: an image capturing apparatus that captures a wide-view image having a viewing angle in a wide range and transmits the captured wide-view image; an information processing system that receives the wide-view image transmitted from the image capturing apparatus and distributes the wide-view image to a display terminal; and the display terminal that displays a predetermined-area image representing a predetermined area of the wide-view image distributed by the information processing system. The communication method includes: causing, by the display terminal, a display to display the predetermined-area image; transmitting, by the display terminal, to the information processing system, point-of-view information indicating the predetermined area of the wide-view image, represented by the predetermined-area image being displayed on the display; distributing, by the information processing system, to the image capturing apparatus, an image capturing parameter for making quality of the predetermined-area image adequate, the predetermined-area image being indicated by the point-of-view information of the wide-view image being distributed; adjusting, by the image capturing apparatus, quality of the wide-view image by using the received image capturing parameter; and transmitting, by the image capturing apparatus, to the information processing system, the wide-view image whose quality is adjusted.

The invention claimed is:
1. An information processing server comprising circuitry configured to:
   receive, from a display terminal, point-of-view information for identifying a predetermined area,
   determine whether a quality of a predetermined-area image indicated by the point-of-view information is adequate, generate an image capturing parameter for making the quality of the predetermined-area image adequate if the quality of the predetermined-area image is not adequate, transfer the image capturing parameter to an image capturing apparatus to cause the image capturing apparatus to adjust the quality of the predetermined-area image in accordance with the image capturing parameter, in response to switching to an automatic setting mode on the display terminal on which a setting mode is switchable between a manual setting mode and an automatic setting mode, the circuitry is configured to notify the image capturing apparatus that the mode is the automatic setting mode, and in the case that the mode is the automatic setting mode, the circuitry is configured to automatically execute the determination of the quality of the predetermined-area image, the generation of the image capturing parameter, and transfer of the image capturing parameter.

2. The information processing server according to claim 1, wherein the image capturing parameter adjusts at least one of exposure, white balance, International Standards Organization (ISO) sensitivity, shutter speed, focus, noise reduction, dynamic range (DR) correction, or high dynamic range (HDR) rendering, of the image capturing apparatus.

3. A system comprising:
a display terminal;
the information processing server according to claim 1; and
an image capturing apparatus configured to capture the wide-view image for display at the display terminal, the image capturing apparatus including circuitry configured to:
receive the image capturing parameter;
adjust quality of the wide-view image using the image capturing parameter; and
transmit the wide-view image having the adjusted quality for display at the display terminal.

4. The system of claim 3, wherein the information processing server includes circuitry configured to:
receive a request for adjusting an image capturing function of the image capturing apparatus from the display terminal, the request including the image capturing parameter; and
transmit the request for adjusting to the image capturing apparatus.

5. A displaying method comprising:
receiving, by an information processing server, point-of-view information for identifying a predetermined area, the point-of-view information being received from a display terminal;

determining, by the information processing server, whether a quality of a predetermined-area image indicated by the point-of-view information is adequate;

generating, by the information processing server, an image capturing parameter for making the quality of the predetermined-area image adequate if the quality of the predetermined-area image is not adequate;

transferring, by the information processing server, the image capturing parameter to an image capturing apparatus to cause the image capturing apparatus to adjust the quality of the predetermined-area image in accordance with the image capturing parameter;

in response to switching to an automatic setting mode on the display terminal on which a setting mode is switchable between a manual setting mode and an automatic setting mode notifying, by the information processing server, the image capturing apparatus that the mode is the automatic setting mode; and in the case that the mode is the automatic setting mode, automatically executing the determination of the quality of the predetermined-area image, the generation of the image capturing parameter, and transfer of the image capturing parameter.

6. A non-transitory recording medium of an information processing server storing a plurality of instructions which, when executed by one or more processors, causes the processors to perform a display method comprising:
receiving, from a display terminal, point-of-view information for identifying a predetermined area,
determining whether a quality of a predetermined-area image indicated by the point-of-view information is adequate,
generating an image capturing parameter for making the quality of the predetermined-area image adequate if the quality of the predetermined-area image is not adequate,
transferring the image capturing parameter to an image capturing apparatus to cause the image capturing apparatus to adjust the quality of the predetermined-area image in accordance with the image capturing parameter;
in response to switching to an automatic setting mode on the display terminal on which a setting mode is switchable between a manual setting mode and an automatic setting mode, notifying the image capturing apparatus that the mode is the automatic setting mode; and
in the case that the mode is the automatic setting mode, automatically executing the determination of the quality of the predetermined-area image, the generation of the image capturing parameter, and transfer of the image capturing parameter.

* * * * *